(12) United States Patent
Narayanan

(10) Patent No.: US 10,810,550 B1
(45) Date of Patent: Oct. 20, 2020

(54) SYSTEM FOR PROCESS COORDINATION AND INTEROPERABILITY ACROSS DIFFERENT SYSTEMS, PLATFORMS, AND/OR BUSINESSES

(71) Applicant: Krishnamurthy Narayanan, New York, NY (US)

(72) Inventor: Krishnamurthy Narayanan, New York, NY (US)

( * ) Notice: Subject to any disclaimer, the term of this patent is extended or adjusted under 35 U.S.C. 154(b) by 274 days.

(21) Appl. No.: 16/037,249

(22) Filed: Jul. 17, 2018

Related U.S. Application Data

(60) Provisional application No. 62/533,372, filed on Jul. 17, 2017.

(51) Int. Cl.
*G06Q 10/10* (2012.01)

(52) U.S. Cl.
CPC ................... *G06Q 10/103* (2013.01)

(58) Field of Classification Search
None
See application file for complete search history.

(56) References Cited

U.S. PATENT DOCUMENTS 8,355,926 B1 * 1/2013 Hinz ............... G16H 40/20
705/2

* cited by examiner

*Primary Examiner* — Paul Danneman
(74) *Attorney, Agent, or Firm* — Dentons US LLP

(57) ABSTRACT

A system for process coordination across different systems, platforms, and/or businesses that capture and permit analysis of and ultimately restructure process specific interactions for greater efficiency among all participants in a variety of business processes within a specific industry domain. The system includes: (1) a process specification language identifying terminology for the participant, resource, agent, and process step for the domain; (2) a specification repository storing information of the participant, resource, agent, and process step; (3) a process knowledge engine identifying and tracking the relevant process steps; and (4) an execution engine performing the process steps, managing the agent's credential, and updating the specification repository.

24 Claims, 23 Drawing Sheets

EXAMPLE OF SOME FUNCTIONS OF PIPCO SYSTEM

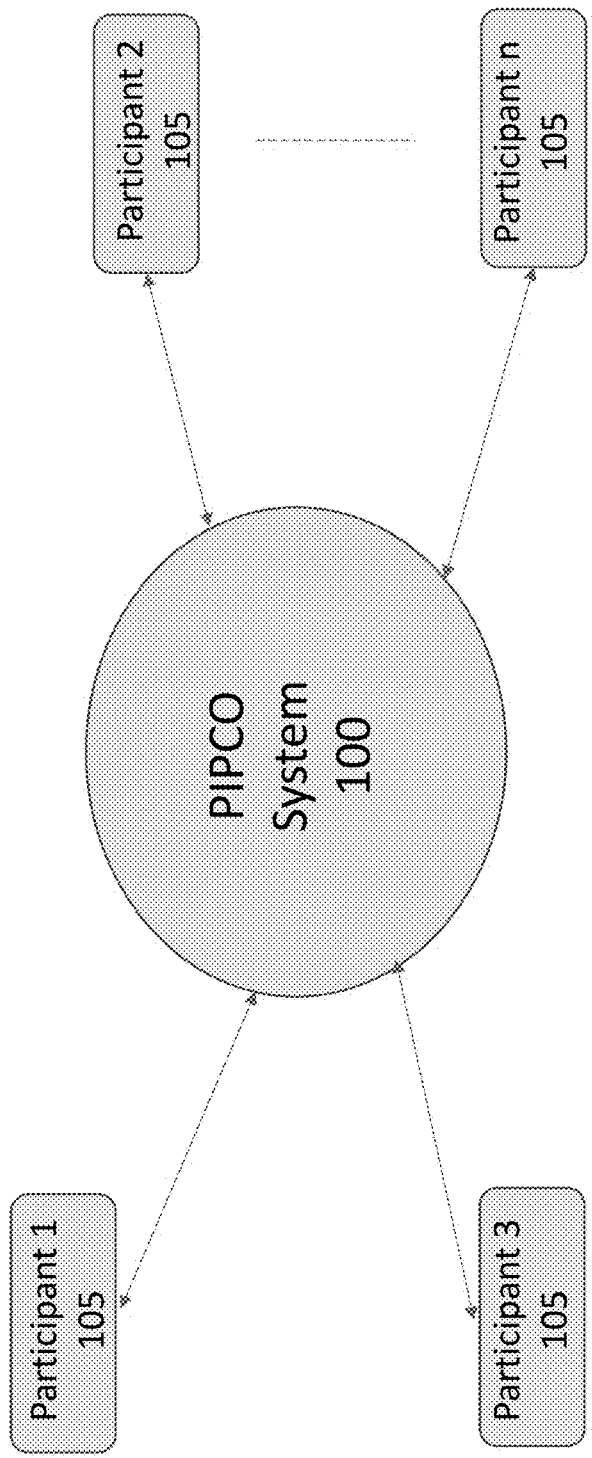
FIG. 1. PIPCO SYSTEM GENERAL OVERVIEW

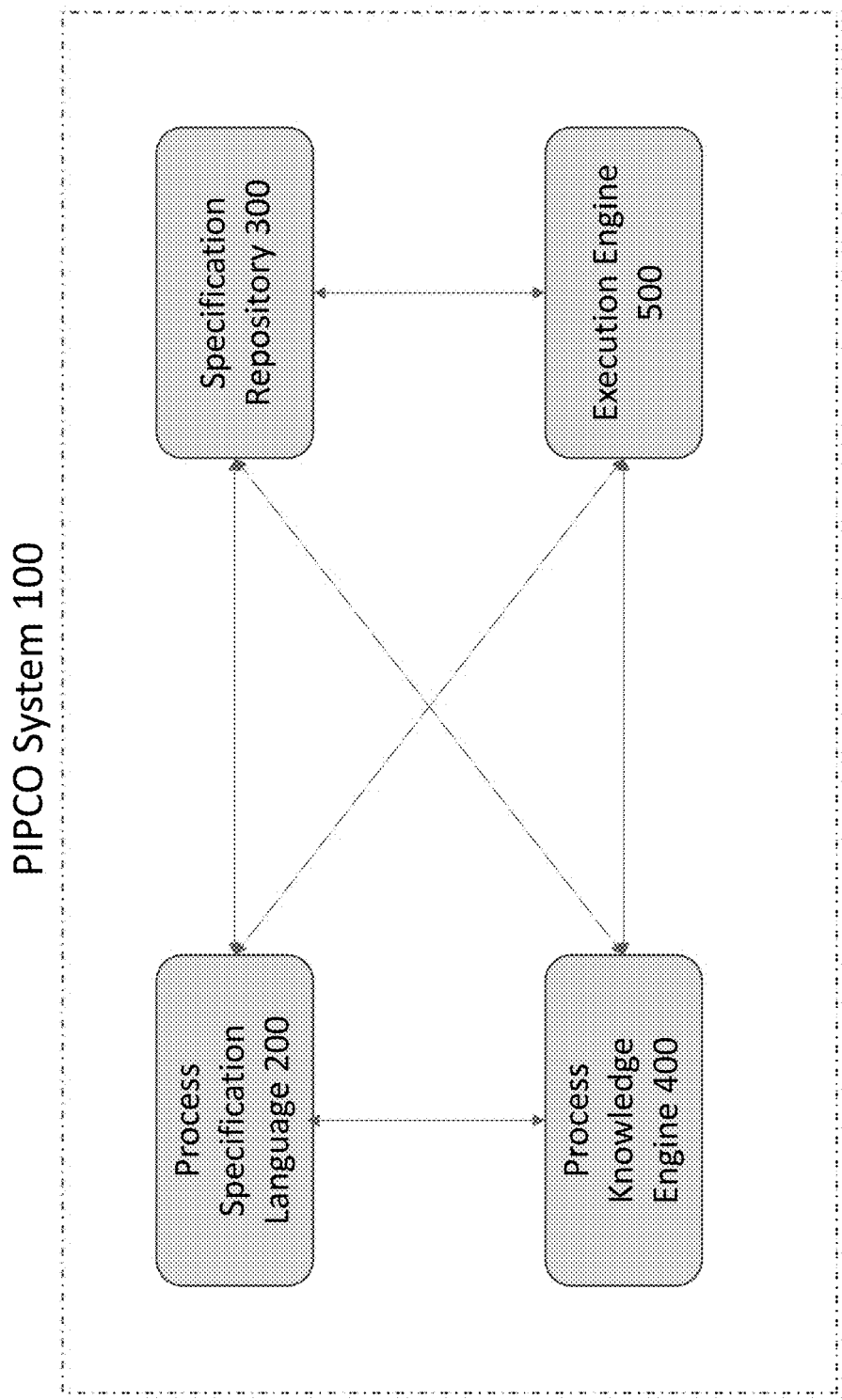
FIG. 2. MAIN COMPONENTS OF PIPCO SYSTEM

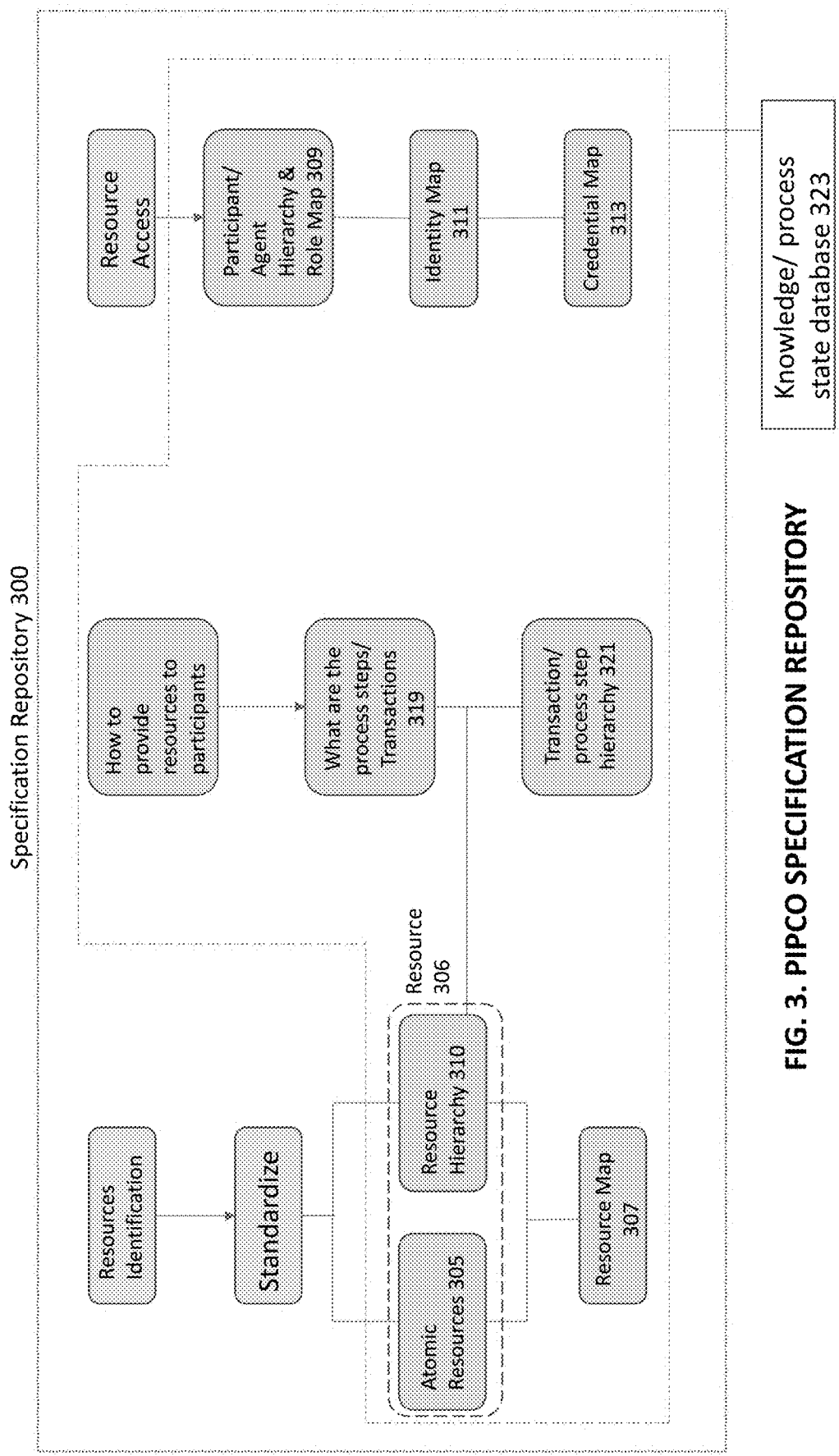
FIG. 3. PIPCO SPECIFICATION REPOSITORY

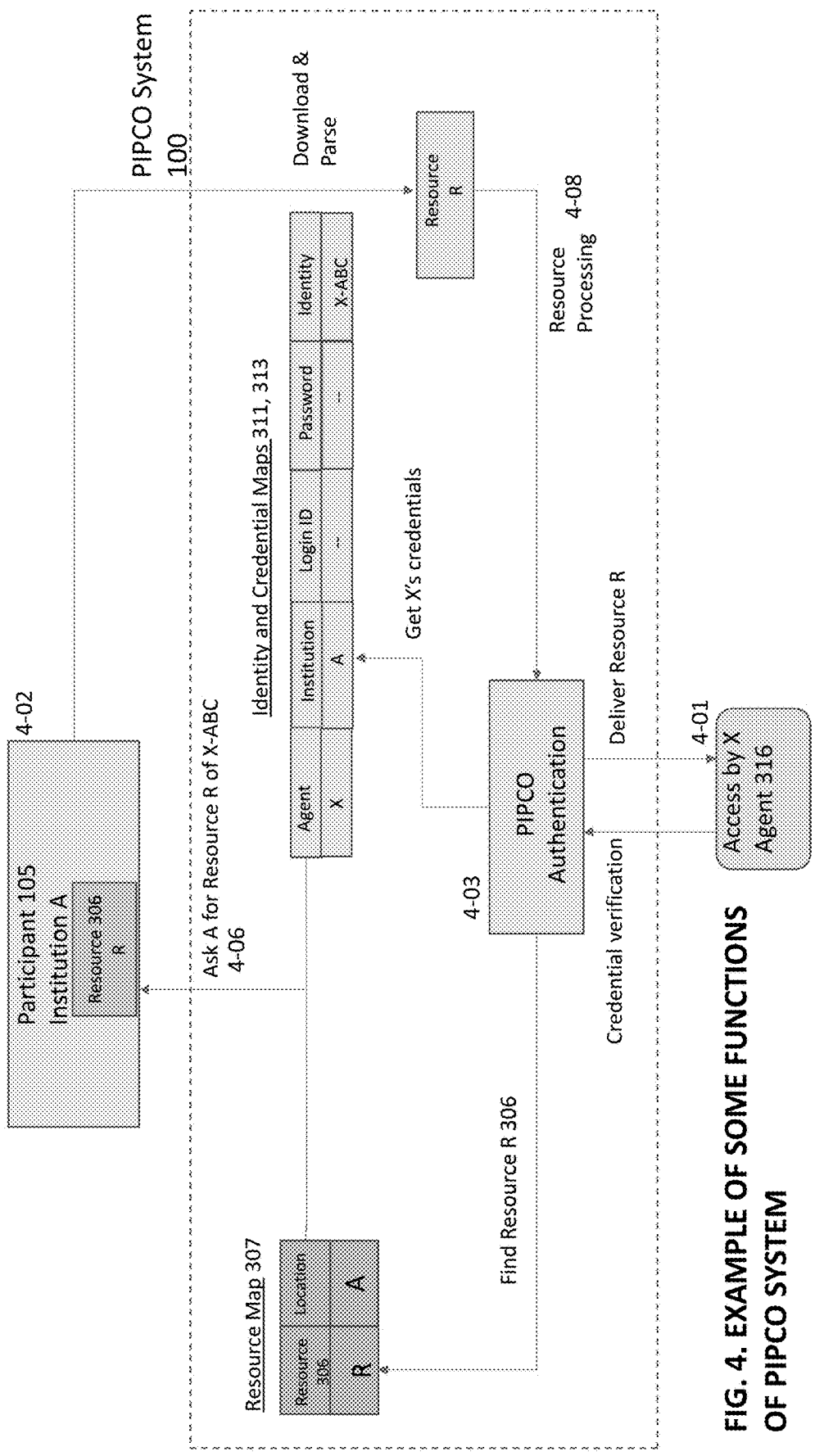
FIG. 4. EXAMPLE OF SOME FUNCTIONS OF PIPCO SYSTEM

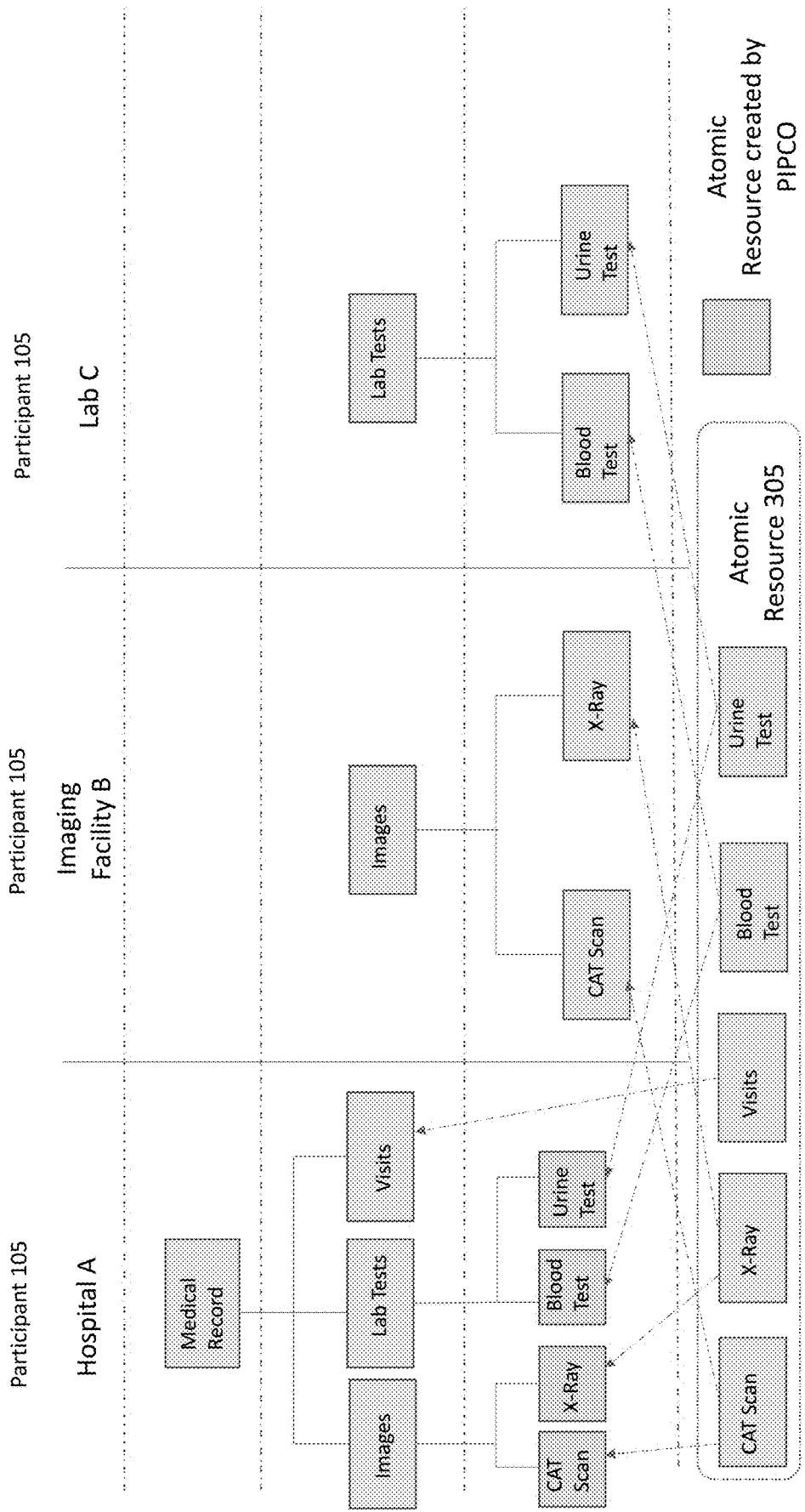
FIG. 5. EXAMPLE OF ATOMIC RESOURCE DEFINITIONS IN HEALTHCARE DOMAIN

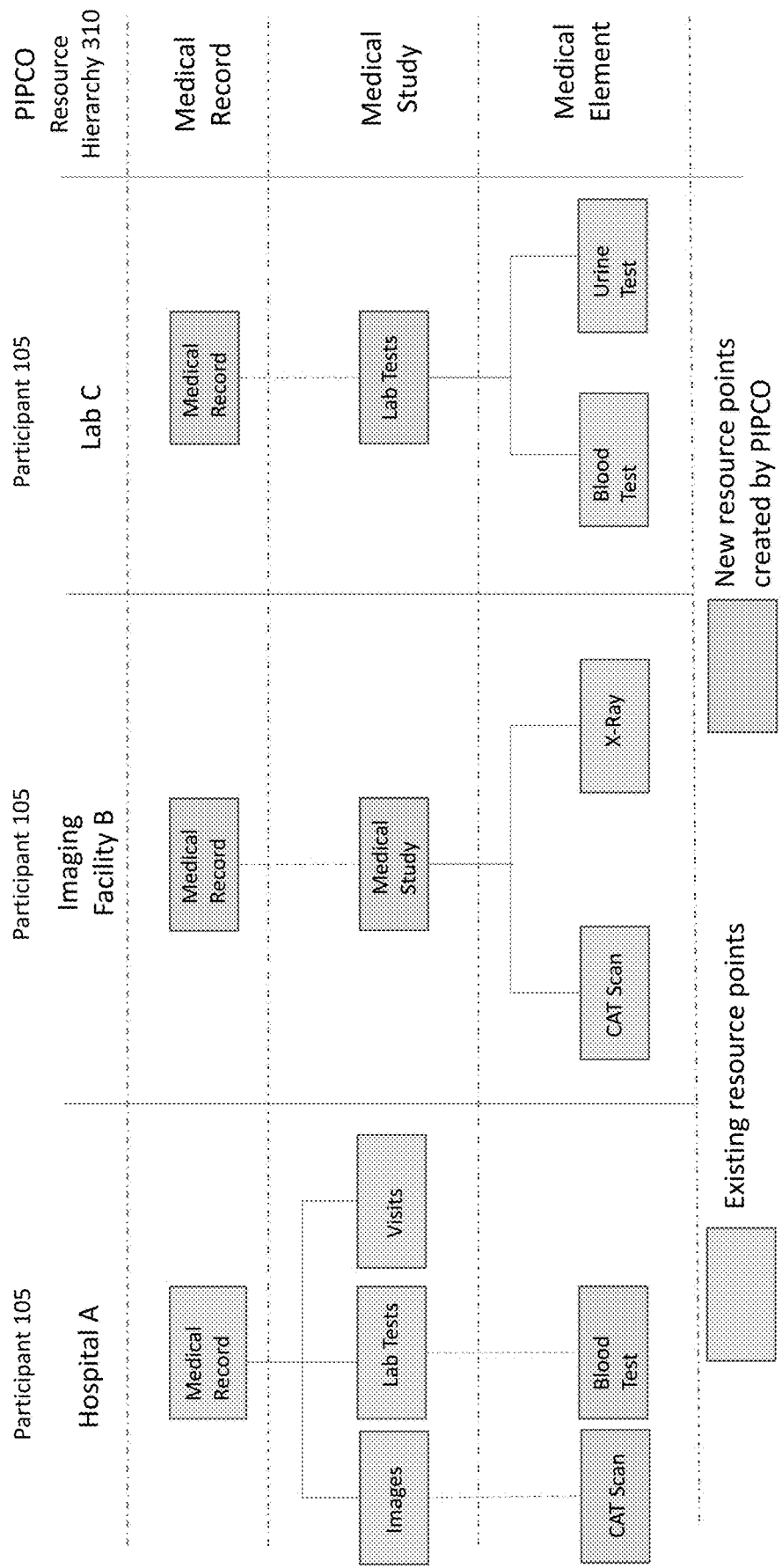
FIG. 6A. EXAMPLE RESOURCE HIERARCHY IN HEALTHCARE DOMAIN

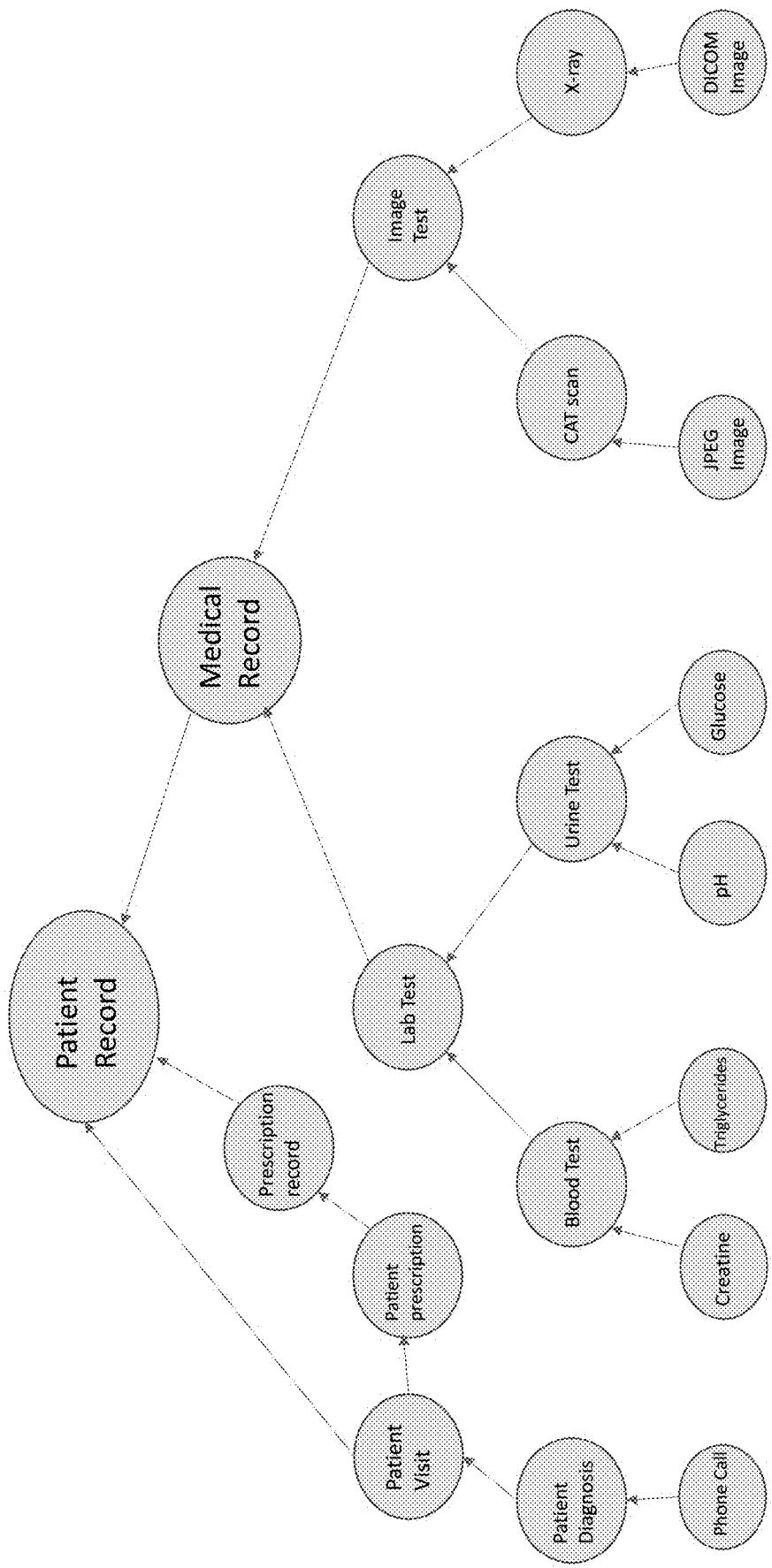
FIG. 6B. EXAMPLE BREAKDOWN OF ATOMIC RESOURCES INTO GREATER ATOMICITY IN HEALTHCARE

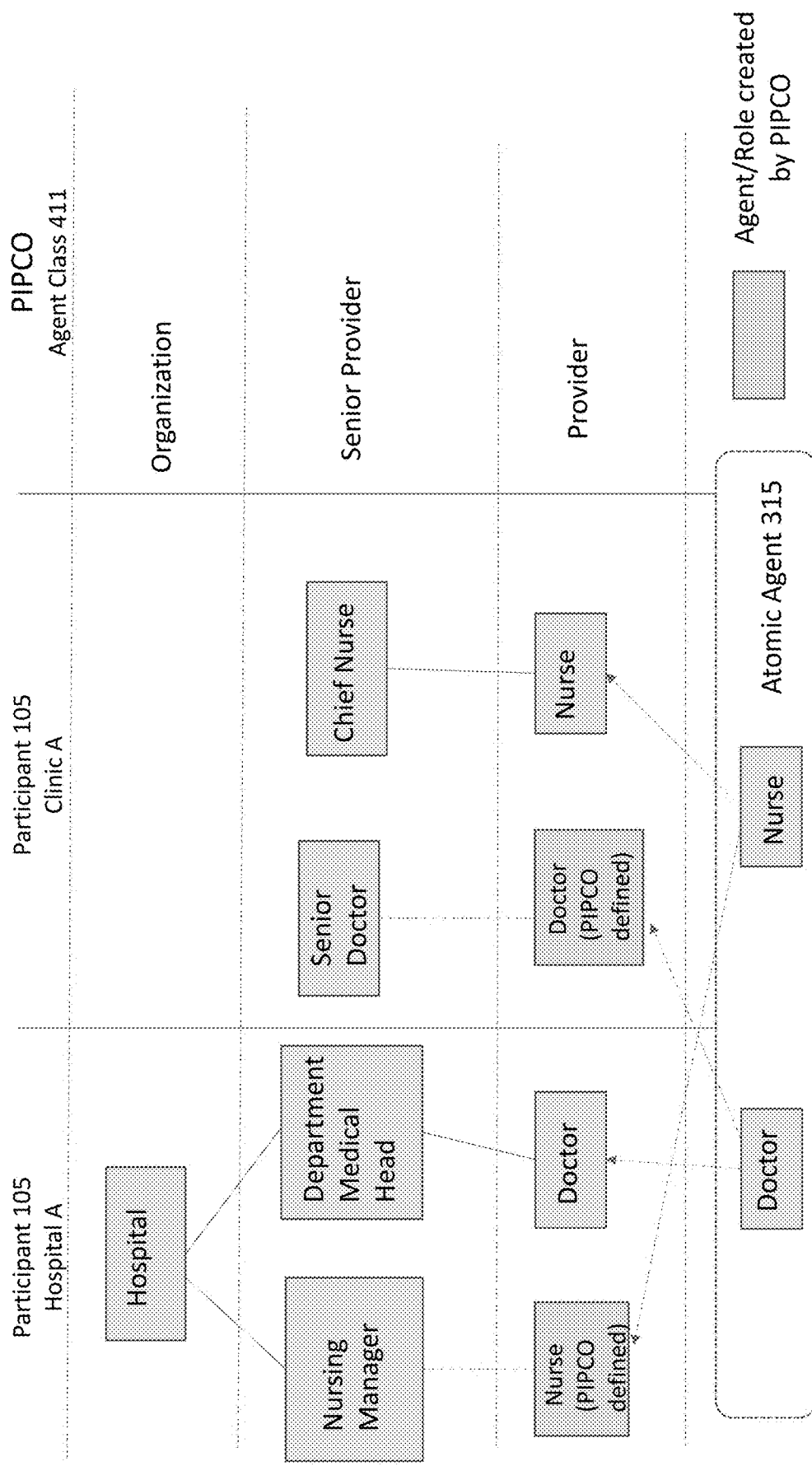
FIG. 7. EXAMPLE AGENT/ROLE HIERARCHY IN HEALTHCARE DOMAIN

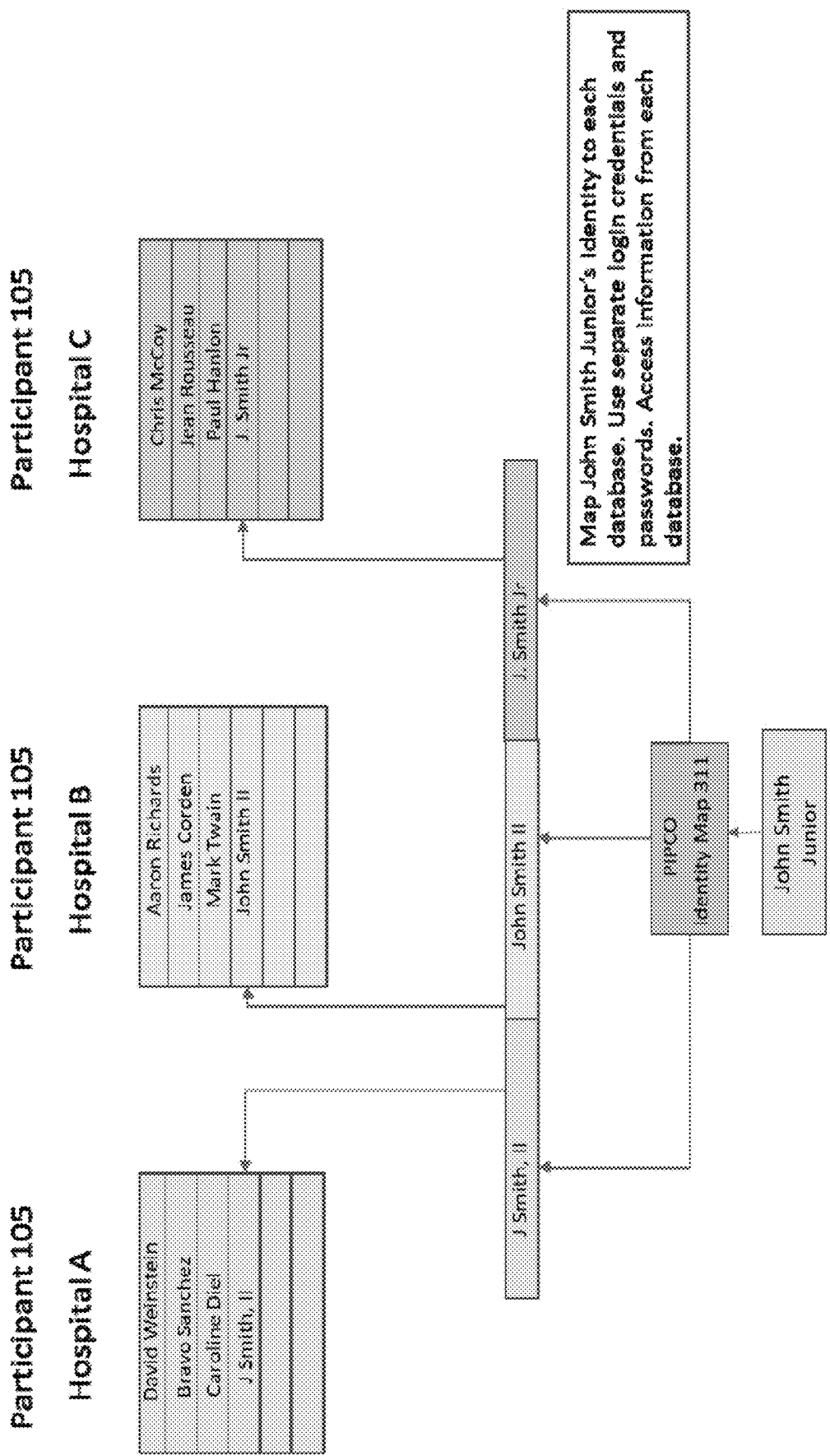
FIG. 8. EXAMPLE IDENTITY MAP

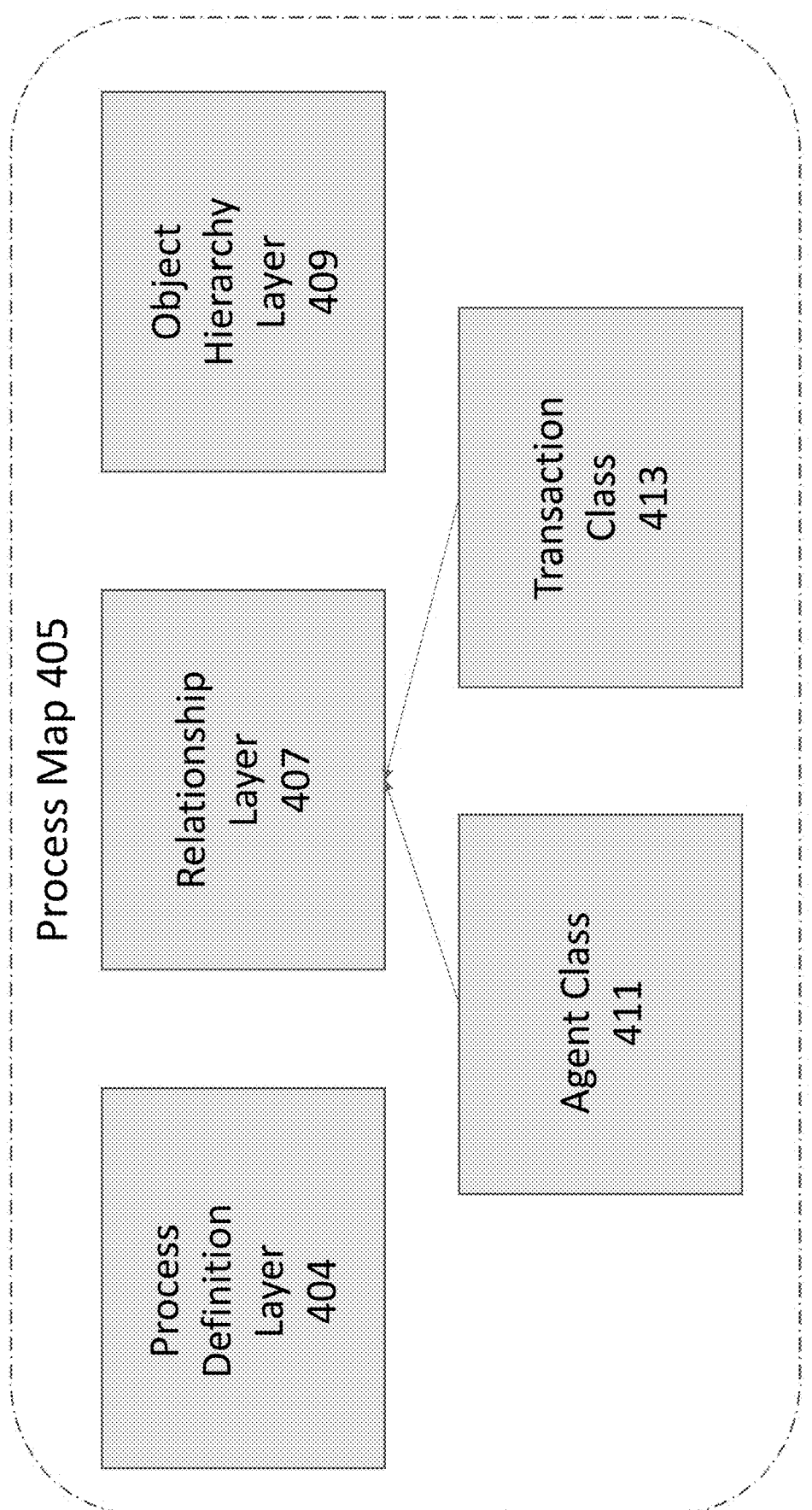
FIG. 9. THE PROCESS KNOWLEDGE ENGINE

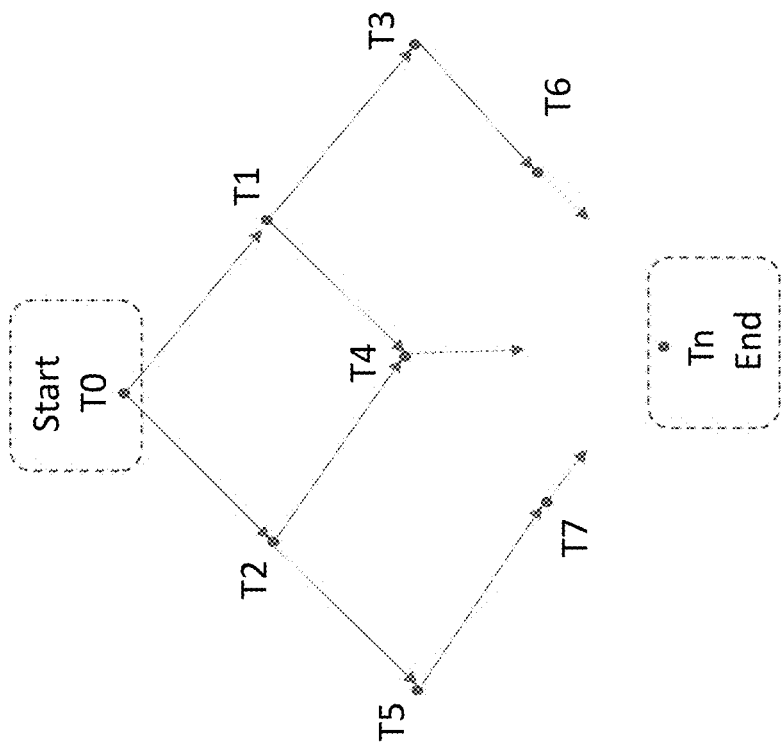
FIG. 10. ABSTRACT PROCESS DEFINITION LAYER

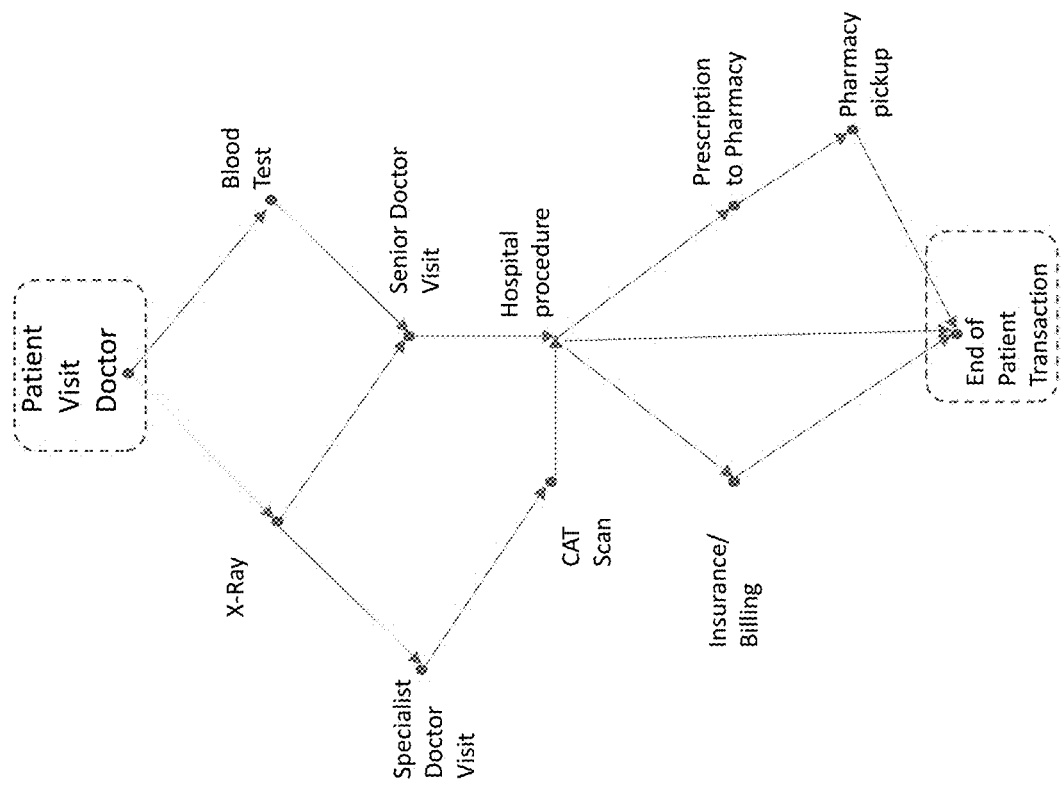
FIG. 11. EXAMPLE HEALTHCARE PROCESS DEFINTION LAYER FOR A SINGLE PROCESS

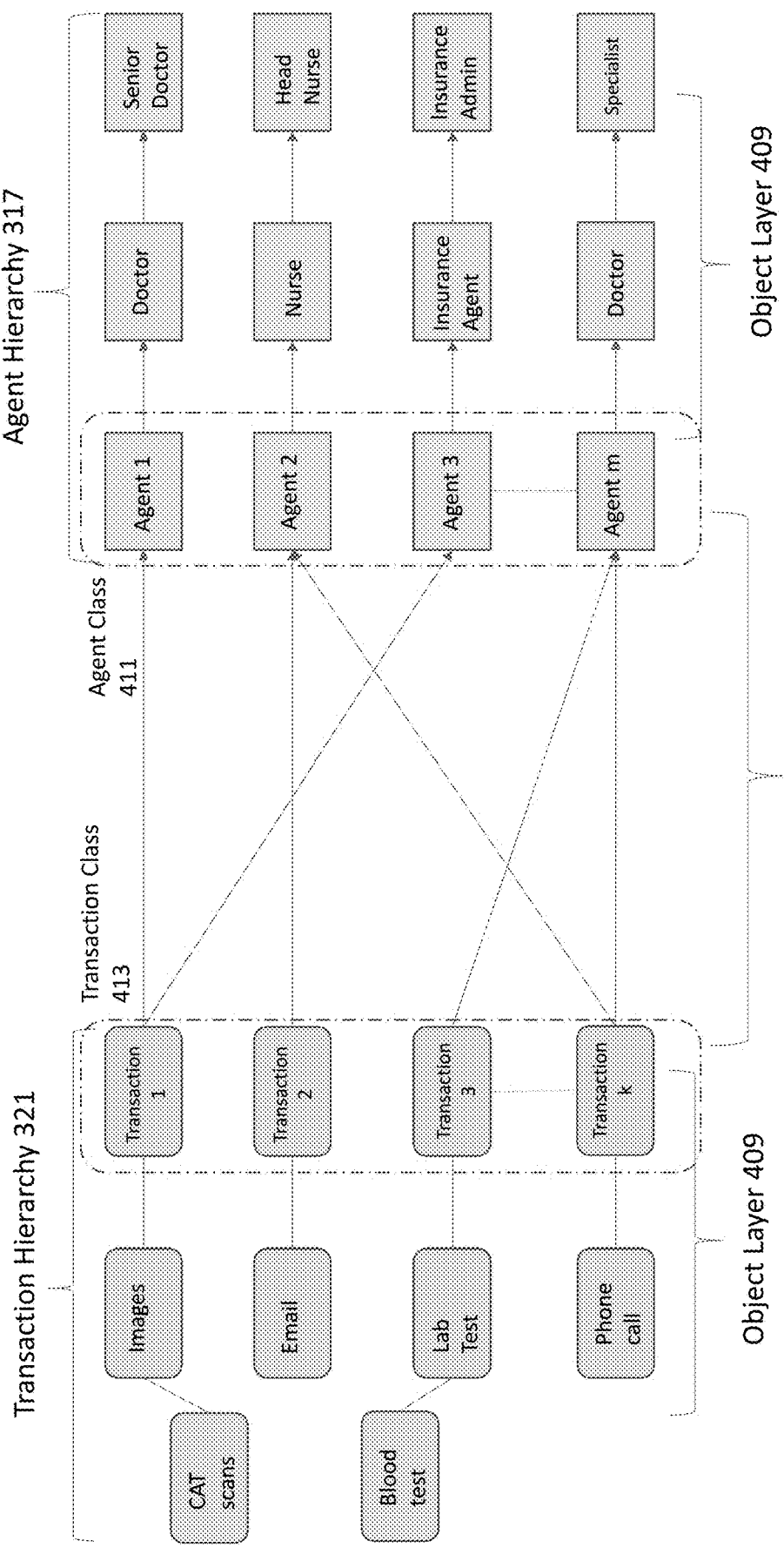
FIG. 12. RELATIONSHIP AND OBJECT LAYERS – PERSPECTIVE 1

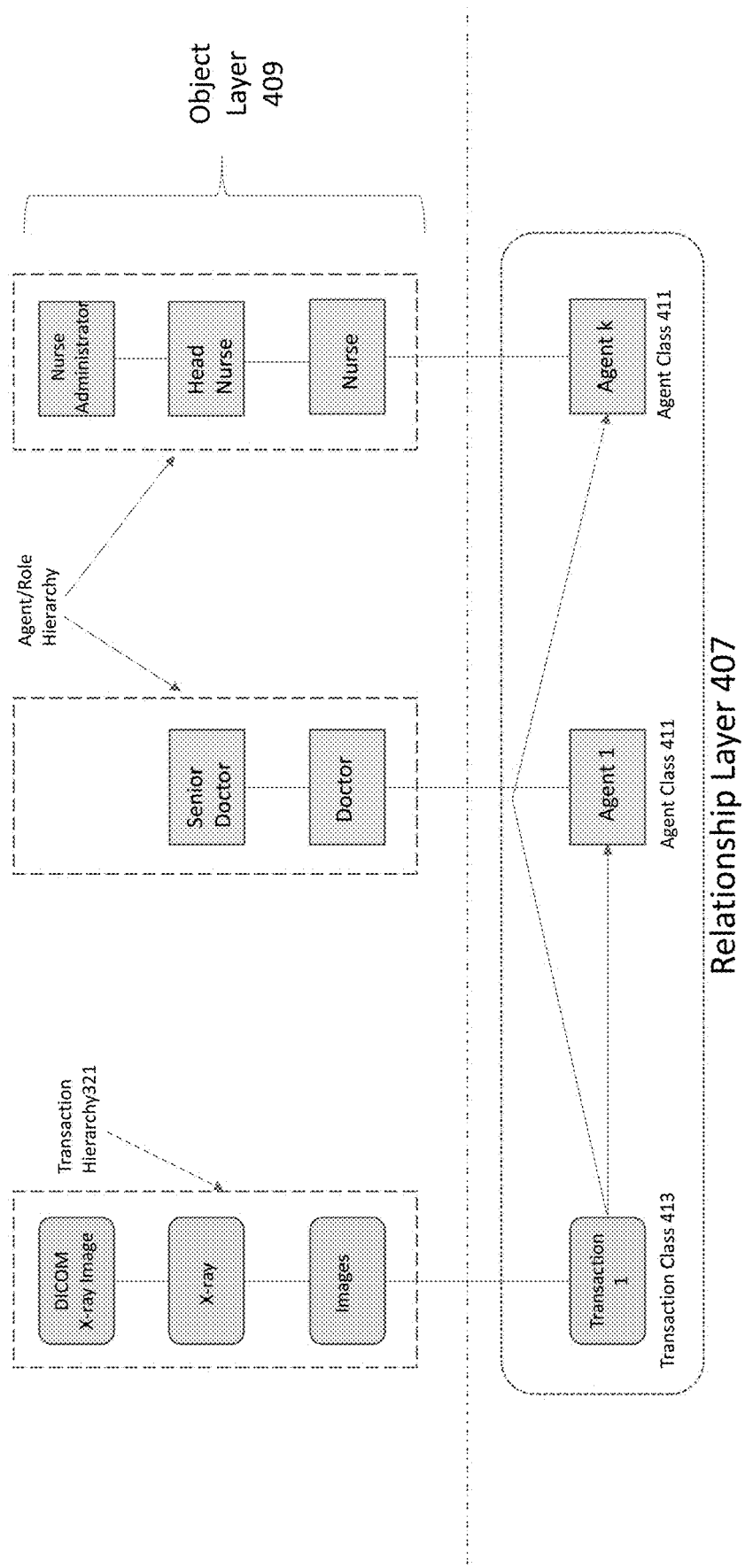
FIG. 13. RELATIONSHIP AND OBJECT LAYERS – PERSPECTIVE 2

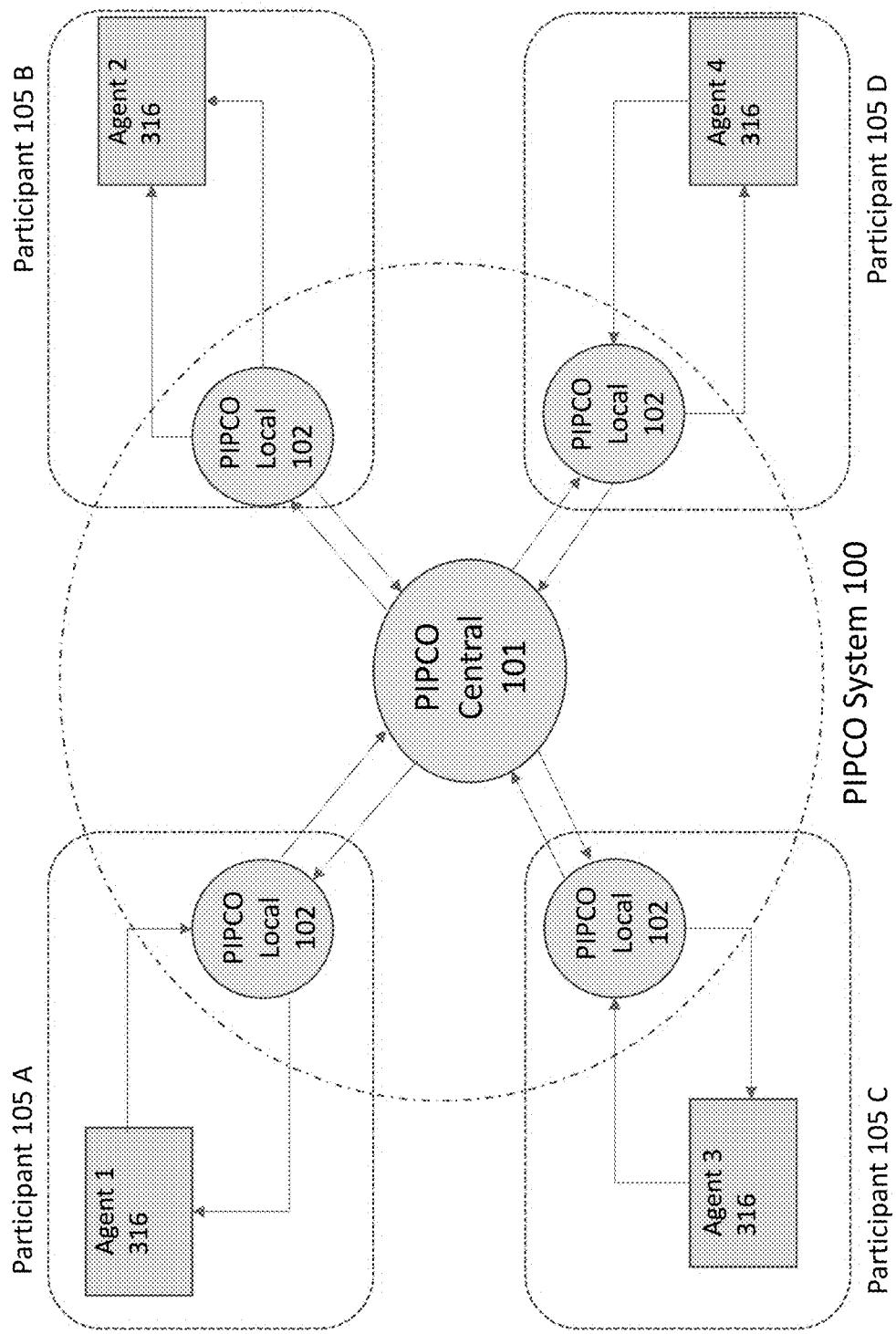
FIG. 14 DECENTRALIZED PIPCO SYSTEM

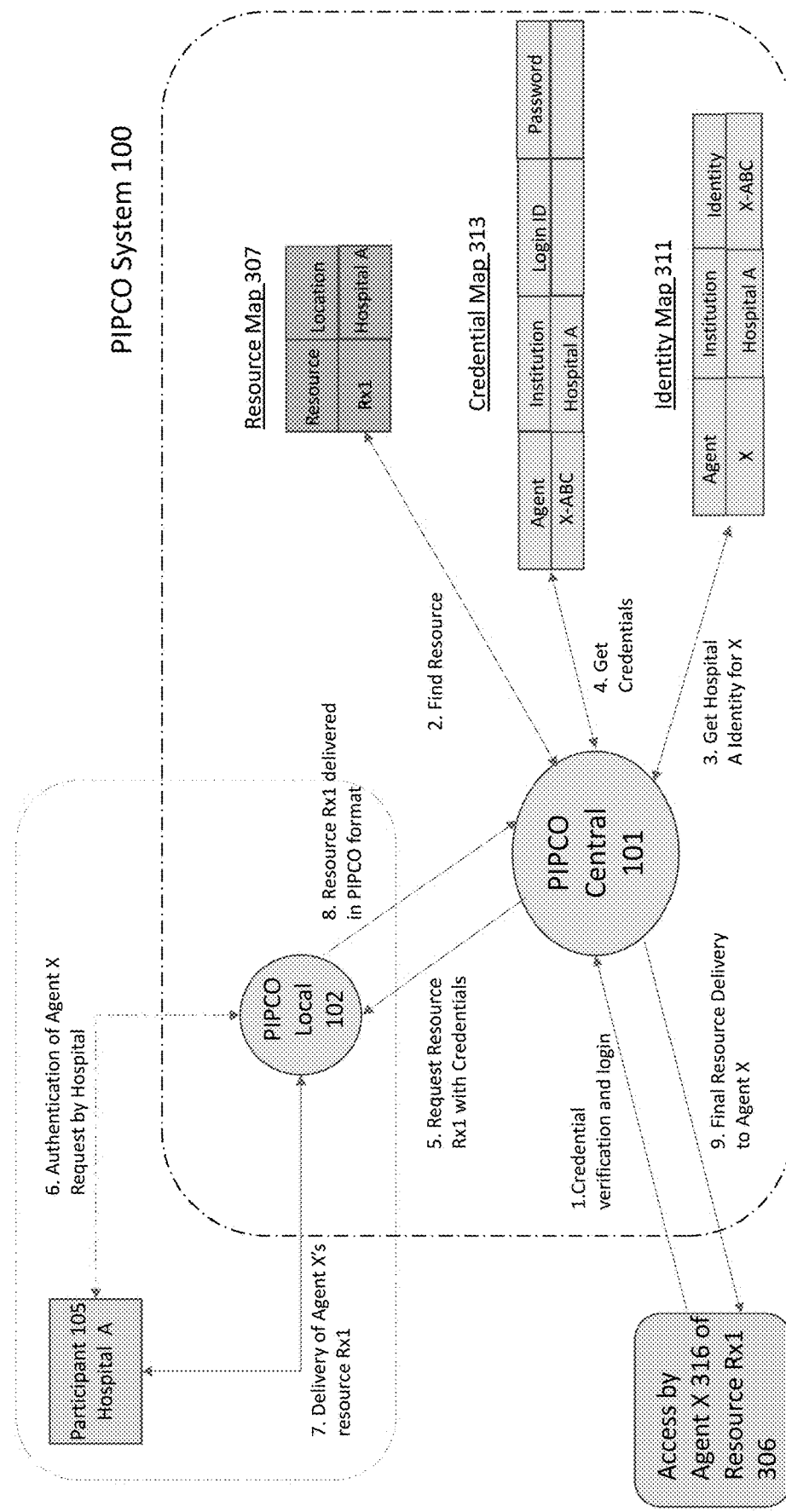
FIG. 15. EXAMPLE PIPCO HEALTHCARE TRANSACTION WITH LOCAL AND CENTRAL SYSTEMS

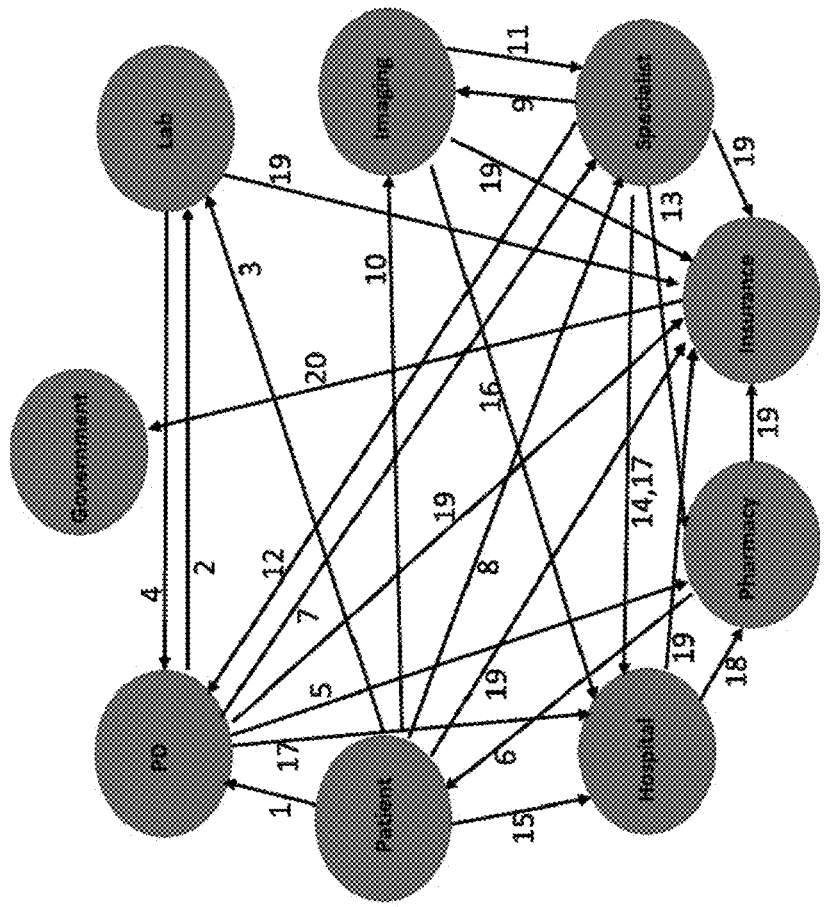

Typical Current Process Flow in Patient Sick Visit

1. Patient visits Primary Doctor (PD).
2. PD orders lab tests.
3. Patient visits lab for tests.
4. Lab sends test results to PD.
5. PD sends prescriptions to pharmacy.
6. Patient collects drugs from pharmacy.
7. PD refers patient to specialist.
8. Patient visits specialist.
9. Specialist orders scans/imaging.
10. Patient goes to Imaging facility.
11. Imaging sends results to specialist.
12. Specialist discusses case with PD.
13. Specialist sends new prescriptions to pharmacy.
14. Specialist schedules Hospital procedure.
15. Patient enters Hospital for procedure.
16. Imaging sends data to Hospital.
17. PD and Specialist share diagnosis with Hospital staff.
18. Hospital orders more drugs from pharmacy.
19. All providers submit claims to Insurance.
20. Insurance coordinates with government

FIG. 16. ORIGINAL(PRIOR ART) HEALTHCARE PROCESS FLOW

PIPCO Re-engineered Process Flow in Patient Sick Visit

1. Patient visits Primary Doctor (PD).
2. PD orders lab tests.
3. Patient visits lab for tests.
4. Lab sends test results to PD.
5. PD sends prescriptions to pharmacy.
6. Patient collects drugs from pharmacy.
7. PD refers patient to specialist.
8. Patient visits specialist.
9. Specialist orders scans/imaging.
10. Patient goes to Imaging facility.
11. Imaging sends results to specialist.
12. Specialist discusses case with PD.
13. Specialist sends new prescriptions to pharmacy.
14. Specialist schedules Hospital procedure.
15. Patient enters Hospital for procedure.
16. Imaging sends data to Hospital.
17. PD and Specialist share diagnosis with Hospital staff.
18. Hospital orders more drugs from pharmacy.
19. All providers submit claims to Insurance.
20. Insurance coordinates with government

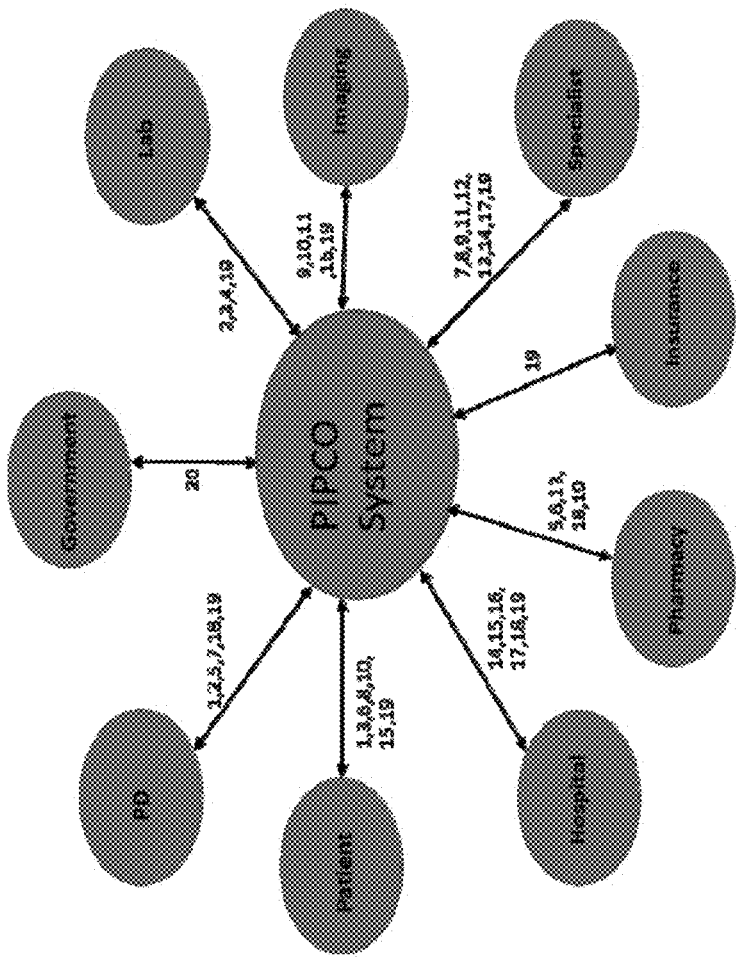

NOTE: *The arrows in the graph reflect a log of the interaction, and not a visit to a PIPCO facility.*

FIG. 17. PIPCO RE-ENGINEERED DOCTOR VISIT PROCESS FLOW

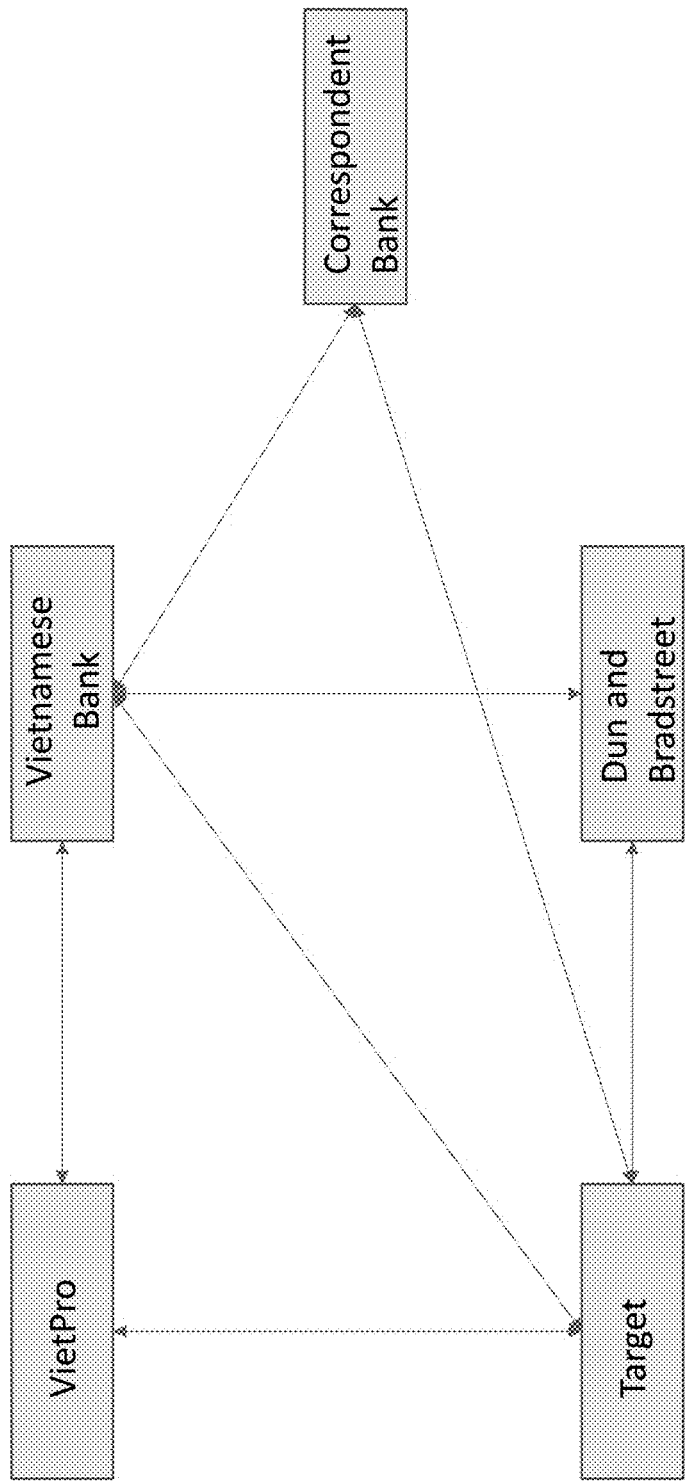
FIG. 18. ORIGINAL (PRIOR ART) BANKING TRANSACTION PROCESS FLOW

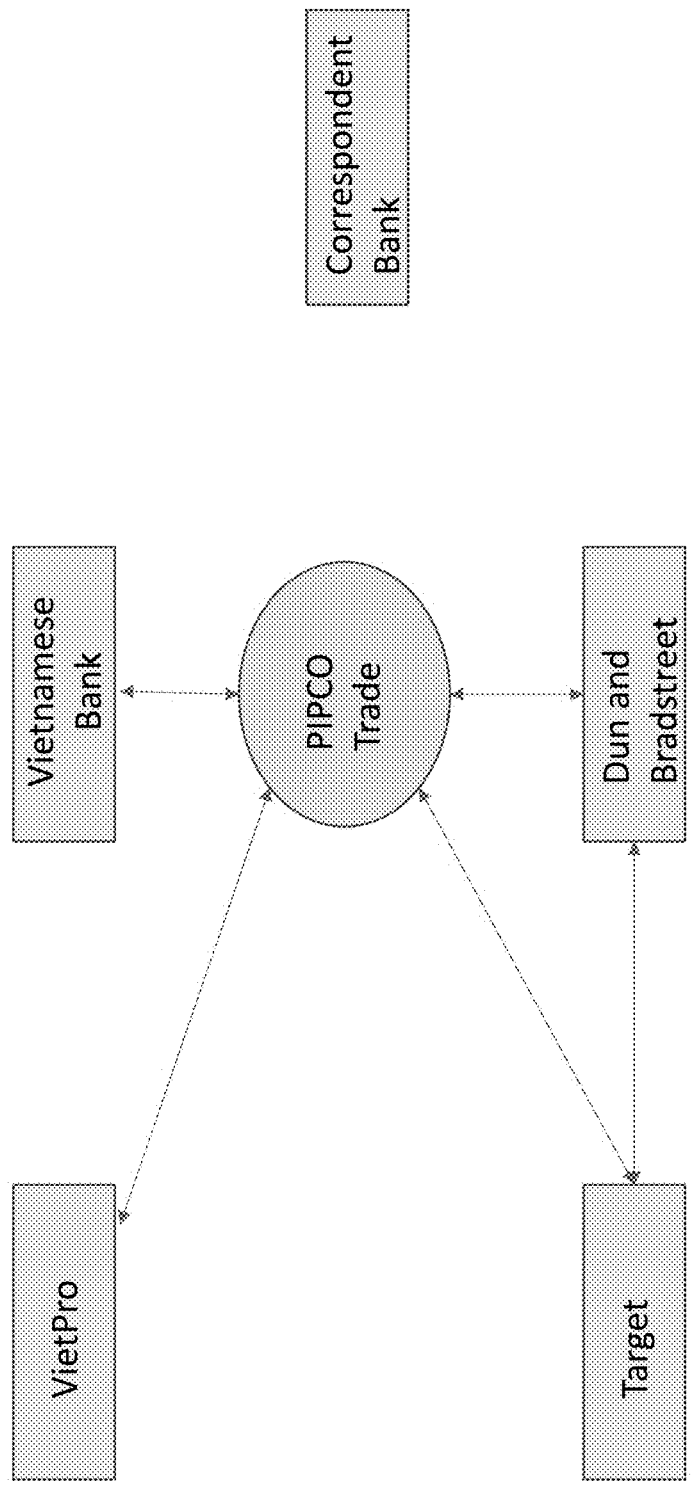
FIG. 19. PIPCO RE-ENGINEERED TRADE FINANCING

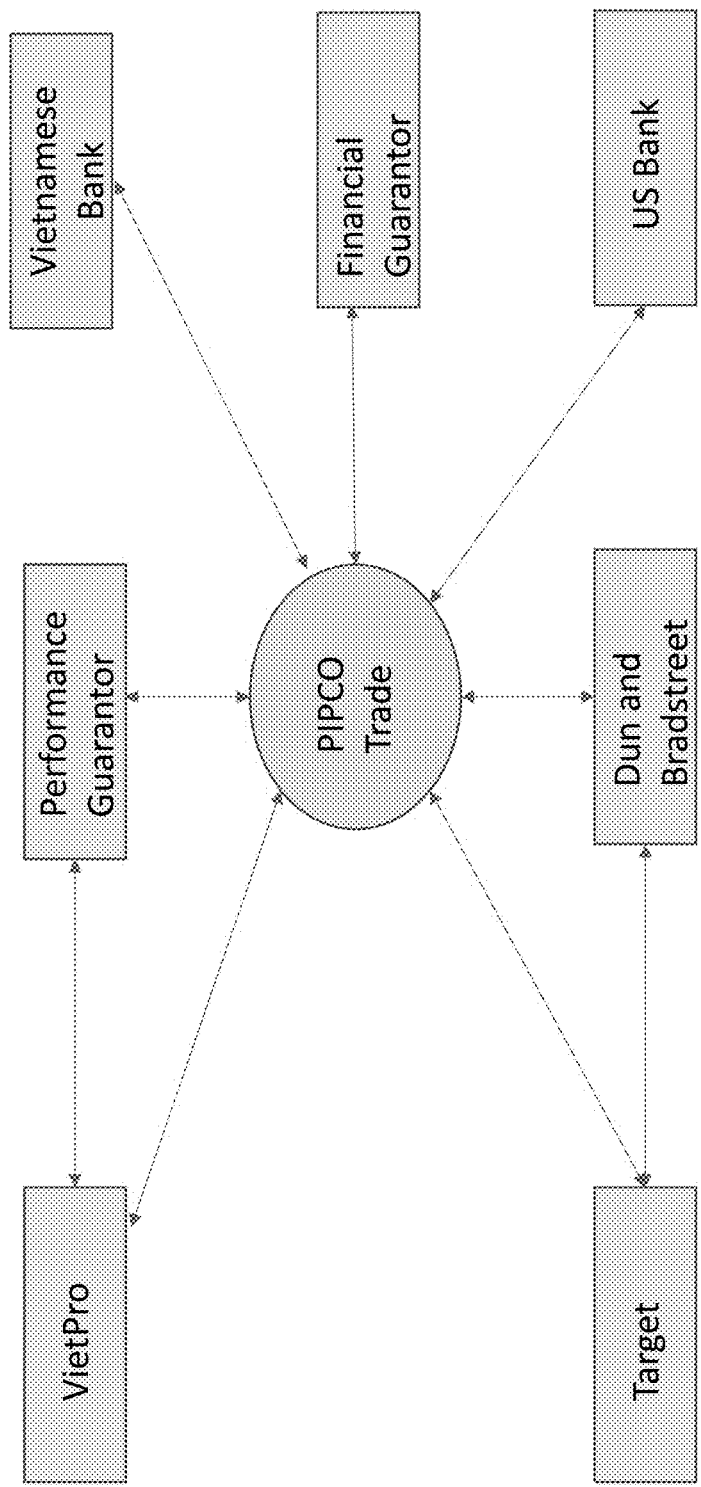
FIG. 20. PIPCO RE-ENGINEERED TRADE PROCESS FLOW

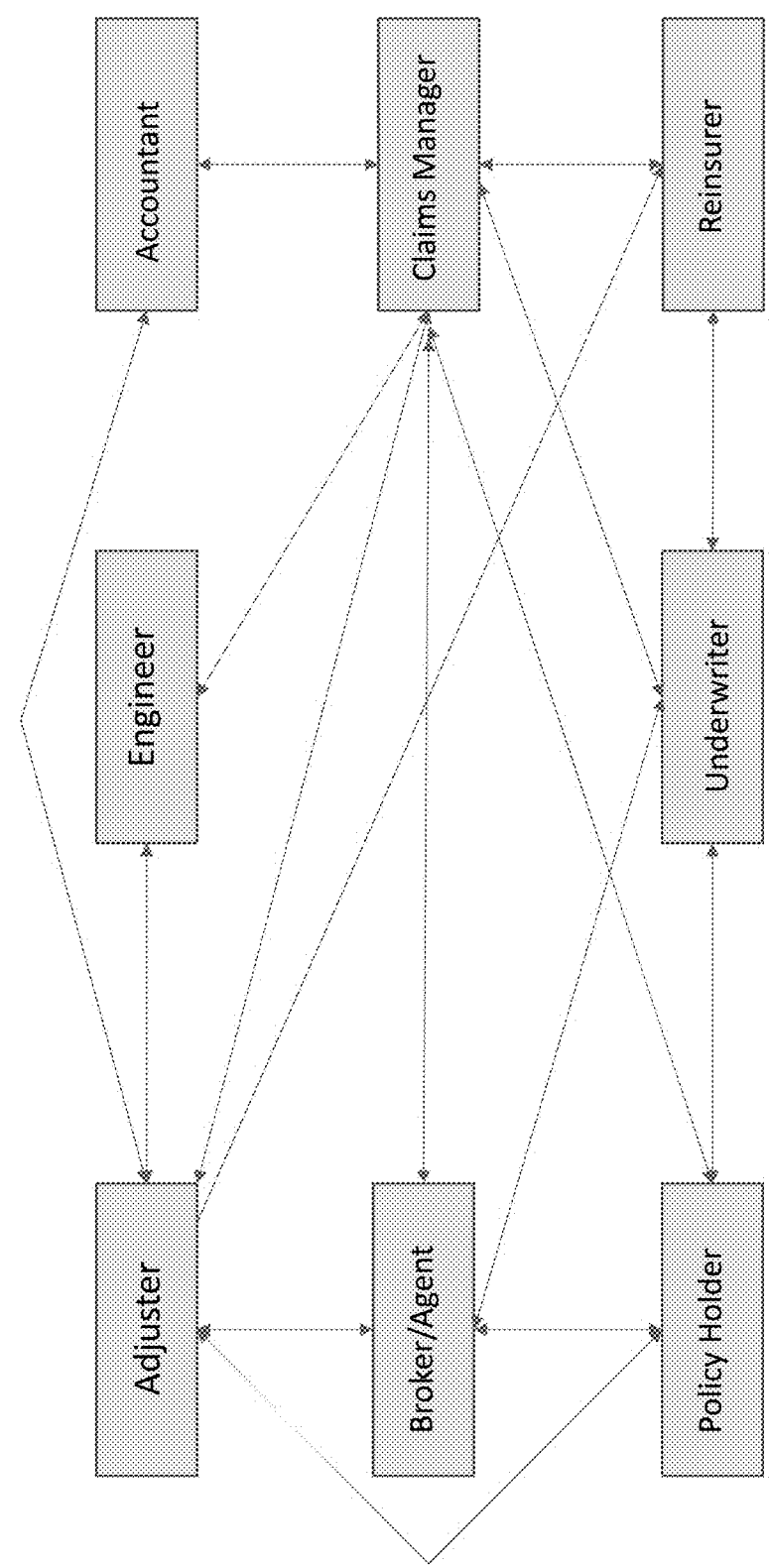
FIG. 21. ORIGINAL (PRIOR-ART) INSURANCE CLAIM SETTLEMENT PROCESS FLOW

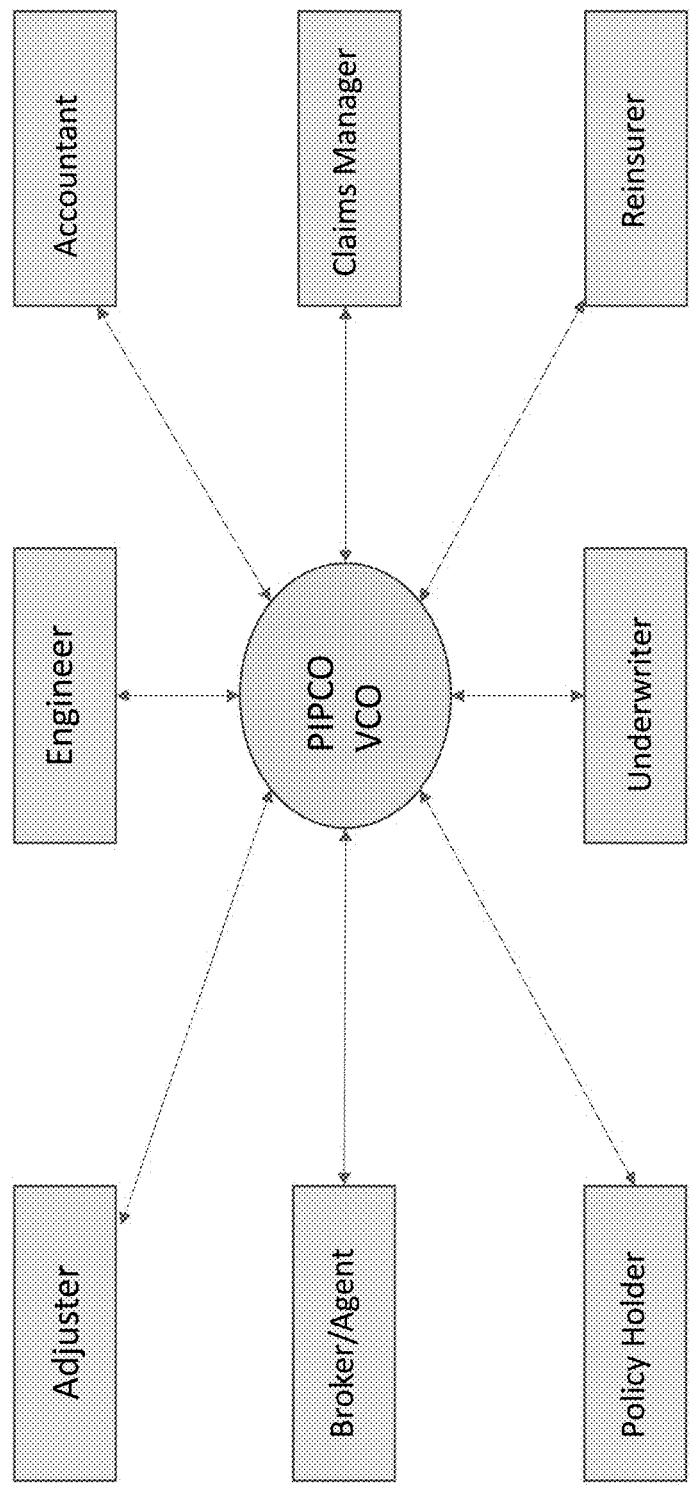
FIG. 22. PIPCO RE-ENGINEERED INSURANCE CLAIM PROCESS

SYSTEM FOR PROCESS COORDINATION AND INTEROPERABILITY ACROSS DIFFERENT SYSTEMS, PLATFORMS, AND/OR BUSINESSES

CROSS-REFERENCE TO RELATED APPLICATION

This application claims the benefit of U.S. provisional patent application Ser. No. 62/533,372 filed on Jul. 17, 2017, entitled "Process Interoperability Platform," which is incorporated by reference herein in its entirety.

FIELD OF THE INVENTION

The present invention relates to a system that provides a general process interoperability platform that is designed to coordinate, capture, permit analysis of and ultimately restructure process specific interactions for greater efficiency among all participants in a variety of business processes within a specific industry domain. The invention will replace point-to-point participant interactions with participant-to-platform interactions to permit greater process transparency and permit analysis and restructuring. While the system has wide applicability, it has particular relevance for processes that involve multiple participant institutions that operate with different technology platforms and where the process itself has a complex flow unlike a standard production line.

BACKGROUND OF THE INVENTION

Business Processes and the Internet

The improvement in global communications technologies and rise of the Internet over the last two decades have allowed for numerous changes in the way businesses operate. Specifically:
  The reduction in communications costs and the increasing use of digital information repositories have made it possible to provide information quickly without reliance on physical methods. This has dramatically changed the delivery of product and marketing materials for many businesses.
  The provision of many existing services has been streamlined and made more reliable. Thus for example, bill payments previously done by mail or phone are now done online. Document verification which required physical signatures and mail is now possible through digital signatures.
  The availability of user-friendly graphical interfaces to reams of online information has resulted in the rise of the virtual business. Amazon exists because the Internet has made the virtual store possible.
  The novel ways of interaction made possible by the Internet have allowed many new businesses to emerge. Thus, Google arose as a way to allow users to search the Internet for information while selling targeted advertising to the same. Ebay and Facebook came about as logical ways to exploit coordination using the tools of the Internet. Existing businesses have had to adapt to their processes to exploit these new venues. Thus, Google and Facebook now are huge advertising portals. Many businesses sell directly through Ebay.

There is no doubt that the Internet represents a disruptive technological change that is slowly but steadily reshaping numerous key industries and society. While most businesses recognize the nature of the changes, few have a cogent strategy to deal with them. Thus, numerous companies across industries have been struggling with a "digital strategy" without quite recognizing exactly what such a strategy would entail. Given the pace of improvements in communications technologies and the ample availability of funds for new, disruptive technology startups, it is not surprising that the established firms struggle with a digital strategy—it is a tall order indeed to anticipate both the changes in technology as well as the associated changes in business structure that might follow. Even worse, the proliferation of new communications technologies has meant the introduction of totally new ideas such as Blockchain whose significance is not even well understood by the technology, let alone the business, community. In general, established, old-line businesses have adopted Internet technologies gradually and in ways that do not fully allow them to exploit the power of these developments. Thus:
  Existing business process steps have been changed to incorporate some new technologies. So, a bill sent through the physical mail is now replaced by an email notification, a credit card payment previously done by phone is now executed through an online portal and so on. Yet, few businesses have attempted to rethink their entire process framework with the toolbox of new technologies available.
  New processes have been created to deal with problems caused by the more recent technologies. Thus, online records access has meant the need for better backup technology as well as measures to deal with new threats such as hackers and viruses. This has required a significant change in the technology expertise needed, away from the more archaic systems used within the firm to more state-of-the-art frameworks.

Despite the speed at which the Internet technologies have spread, the pace of technological change within businesses has been relatively glacial. This is entirely understandable because few firms want to run the potentially unquantifiable risks of new technologies for what are often marginal improvements to business processes. The real disruptions within some industries have generally come from new competitors who have no existing business franchise to lose from trying a radical new approach.

Witness thus, that most retailers were slow to match Amazon in terms of online presence despite the latter's continued successes. Existing retailers a decade ago lacked the technological infrastructure for a robust Internet presence, and allowed Amazon its rapid growth. Today, they are likely able to replicate Amazon's online presence in retailing, but lack the associated business processes of inventory management, warehousing and delivery that Amazon has developed for its online activities. Astonishingly today, the market capitalization of Amazon is larger than all of the stores (including Wal-Mart) in the retail industry combined.

The disruptive changes that occurred in the retailing industry are likely to happen, if not happening already, in other industries as well. Continued technological change is an inevitability and companies that embrace new methods and processes to improve efficiency are likely to dominate their respective industries over time. The greater the speed of change, the more the need for companies to adapt.

The Areas of Technology Impact

We can distinguish two broad areas where technology impacts a company. First, there are processes that are inherently internal to the company over which it has complete control. These tasks are typically performed by the firm's own employees or agents. Next, we have procedures that are external in that they involve agents including consultants, suppliers, service providers and customers who interact with the firm in set ways without being controlled fully by the firm.

A company has a firm grasp of its internal processes and has generally invested substantially to improve their efficiency. In fact, the best firms were improving these internal methods even before the rise of the Internet, and have continued to do so as technology advances.

A typical firm however, has little ability to influence the external agents it interacts with. For starters, such agents (including the firm's customers, suppliers and the like) are not directly under the firm's control. Next, the firm interacts with these agents in the relatively limited context of its own business. As such, it will not have a full picture of their overall businesses and customers, not to mention their technological needs. The rare exceptions to this arise in situations of high-volume manufacturing for example where external suppliers are forced to participate in supply chain portals to be able to deal with a single large customer.

The external processes of the firm however, determine its revenues and ultimate profitability. Without customers the firm will not have sales. Without suppliers it may not have products it can manufacture or sell. Much of the disruptive change to companies from the Internet has come from the external channel. Thus, Amazon started as a virtual bookstore, with a web portal that was superior to those of Barnes & Noble and Wal-Mart. At its start, it lacked the inventory skills, purchasing power and internal technology of a Wal-Mart. Yet, on the strength of its web presence and processes it has managed to decimate Barnes & Noble and emerge as a credible threat to Wal-Mart itself. Over time Amazon has allowed its internal business to evolve in ways that support its external processes in regard to warehouse locations, delivery schedules and the like. That is, its external process interactions have permeated inwards into the company making it a force to be reckoned with in retailing.

Many businesses have used technology effectively to optimize their internal processes but have little control of their interactions with external agents such as their customers, suppliers and service providers. Virtually all external interactions moreover, are point-to-point. Thus, no one agent or group can get a full view of the structure of interaction without considerable effort. With an increase in the number of agents in a business process, the number of interactions grows polynomially so that optimization of each of these interactions does not reduce the complexity of the process itself.

Disruptive Process Re-Engineering

The growth of the Internet and the associated technologies have made it possible to rethink and reengineer an agent's external interactions in ways that simply would not have been possible without the Internet. Numerous startup firms have realized precisely such an aim, even if they were not actually created for that purpose:

Ebay permits individuals and firms to auction off merchandise they might otherwise have sold to specific resellers. It was certainly possible to do this before the Internet (through online bulletin boards for example) but Ebay made this easy for the public at large.

Facebook allows groups of individuals to interact simply by creating interest groups and allowing members to share information. Prior to its creation, such interaction had to be achieved by point-to-point communication or group emails.

Dropbox and similar alternatives permit files to be shared across users, in some cases with versioning and shared editing.

Salesforce allows a company to interact with its own on-the-road salespeople in standard ways that were not easily possible without the Internet.

All of the above firms share a common characteristic. They were each designed for high-volume provision of specific functionality.

To take full advantage of current technologies, a business will have to integrate a range of technology products, such as the ones above, into its own unique digital platform. The existence of the above building blocks makes developing some business functionality easier, but it creates an integration headache. The business will have to invest in technology that will make products such as the above work seamlessly in its context, and even worse, will have to keep investing in the same as technology and its software providers change. A digital integration platform for various different operating platforms across related businesses simply does not exist today.

Overall, we can draw the following conclusions about technology and business processes today:

Technological change is happening and is both irreversible and unavoidable.

Few businesses have a cogent strategy to manage technological change. There is considerable risk to embracing the wrong technology both in terms of business franchise and costs. Yet, not changing may mean a more nimble competitor might threaten your existence.

The Internet is allowing for, if not forcing, change to business processes from the outside in. The need to adapt to a changing external technology environment is forcing a rethink of internal processes.

There is a proliferation of new technologies and software packages. However, a technology-agnostic, flexible framework that can incorporate new technologies on demand to serve business needs does not really exist.

SUMMARY OF THE INVENTION

The present invention, which shall be referred to as the Process Interoperability Platform ("PIPCO") is a system that provides a general process interoperability platform that is designed to coordinate, capture, permit analysis of and ultimately restructure process specific interactions for greater efficiency among all participants in a variety of business processes within a specific industry domain.

PIPCO is a unique system that acts as a process hub to address the complexity of business processes by replacing point-to-point interactions between agents by point-to-hub interactions. This system, however, is distinct from traditional exchanges or other platforms in that it is inherently an incremental process integration system for its participants. As such, it operates by first providing the most basic integration services for its participants, but over time allows them to migrate increasing amounts of functionality into this system. The PIPCO system by its design allows the incremental standardization of key business processes while allowing its participants to continue using most, if not all, their existing technologies as well.

The PIPCO system provides significant theoretical and practical benefits. In a conventional (point-to-point) process involving in agents, the number of channels for agent interaction would grow at a rate of $n^2$ in the worst case. Also, a single document that is revised m times can generate a worst case storage requirement that is m*n times the size of the initial document. The PIPCO system replaces agent-to-agent interactions in a process by agent-to-platform communications. The PIPCO system also can store and/or reference documents from a single location and maintain a history of changes from the original document rather than store it afresh every time. The PIPCO system can reduce the number of process interaction channels so that they grow only at a factor of n or linearly in the worst case. The PIPCO system can also reduce document storage requirements to a constant factor that is the size of the initial document (plus the revision history) rather than the worst-case mn copies generated in a conventional process flow.

The PIPCO system has wide applicability in a variety of industries such as healthcare, insurance and global trade. The PIPCO system serves a critical function that no other system provides. The PIPCO system is a powerful "horizontal" integration hub that permits participants to combine industry-wide systems and technologies to satisfy some of their core cross-technology and cross-agent coordination needs. The PIPCO system also allows them to do this incrementally in a fashion that suits their needs both in terms of functionality and timing. Over time however, the PIPCO system will allow a participating business to migrate many of its processes to the system and ultimately to transform its process flow in its own unique way to allow for the most efficiency and effectiveness.

The PIPCO system permits the integration of disparate technologies into a cohesive framework that can be adapted to the specific needs of individual businesses. The PIPCO system has the following characteristics:

Flexible. The system by design allows for, if not encourages, the easy incorporation of new technologies and methods into its framework. The focus of the system is to provide for the easy integration of business process steps, using the optimal technologies for doing so.

Incremental. It provides the ability to start with limited functionality and then add features depending on needs. As such, the system is not a complete solution to external interaction—it is a framework for the mapping of external processes at a pace that is suitable to the agent in question.

Customizable. Each participant (and its associated agents) will have its own unique needs. The system is designed to be easily customized and adapted to each participant type and work with their resident systems as needed. This is not a one-size-fits-all solution.

Cost Efficient. The primary cost to the participant will be in the initial integration and diligence needed to hook onto the PIPCO system. The expectation is that once operational, the cost savings to the participant will be tangible and obvious.

Intelligent. The system is gathering process flow data. As such, it provides the raw information needed to study the process flow within a domain. This can in turn be used to arrive at process improvements and modifications that might benefit the participants.

The various participants in the PIPCO system could be of two broad types:
  Entities entirely internal to a firm such as business units and divisions. When used in this context, the PIPCO system can be used to deliver incremental process change within a business, enhancing or supplanting existing technology and processes.
  Entities completely external to the firm such as suppliers, customers, service providers and the like. With such participants, the PIPCO system can coordinate the external transactions of a firm that are not typically captured within its existing internal systems. Such transactions would include emails, estimates, messaging, documents, approvals, revisioning etc.

While the PIPCO system can be used effectively in the limited context of a single large firm/business, its true power comes when it is used as the primary integration platform for the external transactions of some, many or all of the firms/businesses within a given industry/domain. In such a situation, the PIPCO system can be used to structure, standardize and ultimately streamline the entire process of interaction between firms/businesses and their full complement of external counterparts.

When used to integrate external transactions in an industry/domain, the PIPCO system exhibits significant increasing returns to scale. The more the participants that sign on to the system, the greater the number of methods and transactions that can be integrated into the framework and the more that new technologies can be deployed. As such, the larger the scale, the greater will be the efficiency gains and cost savings for all the participants.

The PIPCO system is technology agnostic by design. There is no "right" technology that the PIPCO system pushes. Rather, the system uses the optimal technologies that make the most sense for a given industry/domain with the intent of replacing the same as better alternatives become available. To permit such integration for a variety of new technologies, the system is, in many respects, truly cutting edge in its design.

Finally, the PIPCO system is both top-down and bottom-up in its design. Setting up the system requires considerable top-down knowledge of industry processes and a willingness to project an idealized process flow based on technological change. Yet, the implementation of the PIPCO system is inherently bottom-up. The platform starts by providing simple coordination functions across industry participants within a domain, but could evolve quickly with significant increasing returns to scale to take over an entire industry/domain. This is something that will become increasingly clear below.

Example Illustrating the General Concept of the PIPCO System

The PIPCO system's approach to business process restructuring can be better understood by looking at a simple, non-technical example.

Consider a number of small, manufacturing businesses in an industrial region that typically have raw materials shipped to them and in turn, mail out their finished products to their customers. For simplicity, assume these firms all receive and send their products through their local post office which is capable of handling their volumes. The shipments from the businesses have to be packaged, transported to the local post office and mailed out with the appropriate insurance and delivery confirmation requests. To do this each business deputes one or more employees.

Assume that a shipping expeditor enters this region to help these businesses with their packages. At the start, the expeditor contracts to pick up the packages from each business, ensure that the associated paperwork is done correctly and deliver the packages promptly to the post office along with the right payments. As a bonus, the expeditor provides, at month end, a log of all shipments, prices paid and delivery dates for the business' records.

To provide these services the expeditor hires a small staff of dedicated and knowledgeable shipping employees, purchases a fleet of trucks capable of handling all the shipments and deliveries and builds the necessary computer systems to log and track the packages for each business. If all the businesses sign with the expeditor, it can most likely deliver its services at much lower prices than the businesses themselves can do it for because it has the expertise and the scale that its clients lack. The expeditor's initial foray into this business process was focused on the delivery of a service that is of obvious (though small) tangible benefit but of limited scope so that the possibility for error is minimal. Importantly, each business has little to no cost to signing on with our expeditor and will realize quickly whether this new service works at all—if its net costs, adjusted for the benefits, are actually higher with the expeditor, it will simply refuse to use the latter's services.

After signing on its clients, our intelligent expeditor could look to add more value to its basic package business. Specifically, it might quickly understand that many businesses ship to another industrial area and that a bulk discount can be negotiated with the post office or another independent shipper to send these packages collectively. This is something that the individual firms could never have known, but that the expeditor with its accumulated process knowledge can understand and exploit. Importantly, if the expeditor does its negotiations properly, it can very likely make a handsome margin even while allowing its clients to profit from somewhat lower prices.

But the expeditor need not stop with just lowering shipping costs for its customers. It might realize, based on the packaging, that some of its users have complex packaging requirements that require expensive packing materials. As such, it could help these businesses in one of two ways: it can source packing materials in bulk and deliver them for lower cost to the customer; alternatively, it could take over the packaging process in entirety for a firm and again likely do it at much lower cost given its own larger scale in performing this operation.

Taking things a few steps further, the expeditor over time might come to handle all the international customs paperwork for its customer firms, warehousing of raw materials and product, and possibly serve as an outsourced purchasing and delivery manager who handles even the payments. In fact, as new features and delivery possibilities became available, the expeditor would attempt to incorporate them into its platform to provide the maximal benefit to its customers.

The important features brought out by our example are the following:

The expeditor provided basic services in the beginning at low cost and tangible benefit and with no disruption to its customers.

Any new services provided were taken up at the discretion of the business because the benefits were obvious relative to costs. The expeditor typically could provide these needed services at much lower cost than the business itself could.

The services a business obtained from the expeditor were effectively customized for its needs—no business had to take on services that it did not need.

Each business could be reasonably assured that the expeditor would be the shipping and logistics expert that would capitalize on current best practices. So it could rely on the expeditor to use the best and lowest cost methods possible for handling the business' logistics.

Over time, a business that used the expeditor's services extensively, ended up transforming its internal processes dramatically albeit incrementally. So, incremental internal change occurred at low cost with clear benefit at each step and with little internal opposition or downside risk.

Referring to the expeditor as PIPCO Shipping would make the explanations more tangible. From PIPCO Shipping's perspective, delivering all the services that its client businesses might need today and into the future will require significant planning and technology. It will need to understand the business domain and the nature of the services to be provided today and far into the future. Even more importantly it will need to operate with a business and technology platform that will permit the gradual integration of its clients' business services. The same platform will also be used by the clients for information relating to their business processes, and so the expeditor has to incorporate its clients also into this platform. Also, PIPCO Shipping will have to constantly learn from its own process data about what new technologies and processes might need to be integrated to provide better service to its clients.

The PIPCO system was obviously the core integration platform used by PIPCO Shipping to execute the above strategy. With this platform, PIPCO Shipping can incrementally re-engineer its customers' processes to their collective benefit. This re-engineering moreover happened at each step with low incremental cost and minimal business disruption. Even more importantly, each business adopted only the services it actually needed from PIPCO Shipping effectively using the platform to devise its own customized integration solution. Simply by bringing the businesses in our industrial region together into this advanced technology platform, PIPCO Shipping is able to coordinate their activities and engender cost savings for everyone.

The PIPCO system of the present invention includes the following four main components:

A process specification language that can be used to specify the process steps, agents etc. for a specific domain.

A specification repository that defines the atomic process elements, the various agents and their specific capabilities, rights and permissions and other setup information necessary to understand the process. As such, the specification repository will have maps of the various agent identities and credentials, data regarding the location of various resources etc.

A process knowledge engine that defines the actual sequencing of the process steps and maintains the current state of every process tracked by the PIPCO system. The process knowledge engine's sequencing is laid out with a specification written in the process specification language.

An execution engine that performs the actual process steps as specified for every participant, manages access and security using the various maps maintained in the system for this, and updates the process state in the process knowledge engine.

BRIEF DESCRIPTION OF THE DRAWINGS

Preferred embodiments of the present invention have been chosen for purposes of illustration and description and are shown in the accompanying drawings forming a part of the specification wherein:

FIG. 1 provides a general overview of the PIPCO system of the present invention.

FIG. 2 illustrates the four main components of the PIPCO system of the present invention.

FIG. 3 illustrates the various functions of the specification repository of the PIPCO system.

FIG. 4 provides an overview of an example of some functions of the PIPCO system.

FIG. 5 illustrates some atomic resource definitions in a healthcare domain.

FIG. 6A illustrates the resource hierarchy for various atomic resources in a healthcare domain of FIG. 5.

FIG. 6B illustrates an atomic resource that is broken down into atomic resources of a lower hierarchy in a healthcare domain.

FIG. 7 illustrates some base/atomic agent definitions and agent/role hierarchy in a healthcare domain.

FIG. 8 illustrates the identity mapping by the PIPCO system across different participants.

FIG. 9 illustrates the process knowledge engine and in particular the various layers for creating a process map of the PIPCO system.

FIG. 10 illustrates a process definition layer in abstract terms for the process (transaction) map of the process knowledge engine.

FIG. 11 illustrates an example of a process definition layer in a healthcare domain.

FIG. 12 illustrates an example from one perspective of the relationship and object layers in a healthcare domain.

FIG. 13 illustrates an example to distinguish different object layers in healthcare domain.

FIG. 14 shows a decentralized PIPCO system of the present invention having a PIPCO central system and a plurality of PIPCO local systems.

FIG. 15 shows an example of PIPCO central and local systems working together to deal with a transaction in the healthcare domain.

FIG. 16 is a schematic of the prior art process flow among various atomic agents in a healthcare domain.

FIG. 17 is a schematic of the PIPCO system re-engineered doctor visit of FIG. 16.

FIG. 18 is a schematic of the prior art process flow of one banking transaction.

FIG. 19 is a schematic of the PIPCO system re-engineered trade financing of FIG. 18.

FIG. 20 is a schematic of the PIPCO system re-engineered trade process.

FIG. 21 is a schematic of the prior art process flow of an insurance claim settlement showing the interactions that occur for only one side of the claim.

FIG. 22 is a schematic of the PIPCO system re-engineered insurance claims process.

DETAILED DESCRIPTION OF THE PREFERRED EMBODIMENTS

The following terminologies are used in the following description and their general meanings are provided below:

Entity is an individual, a company, an organization, a business with a separately identifiable existence, or an organizational unit or division within a larger entity Participant is an entity that uses or interacts with the PIPCO system. On occasion when we refer to participant we mean the group of agents representing the participant. This should be clear from the context.

Agent is a specific role within the PIPCO system. The concept of an agent corresponds to that of a user of the PIPCO system who has certain well-defined capabilities. An agent acts on behalf of a participant in the PIPCO system with his defined role.

Industry (or Domain) is formed from a group of entities that work together/interact with each other in a particular area. For example, healthcare, insurance, global trade, etc.

Resource refers to a function, data element or operation that can be performed or provided either by a participant (or his agent) in the PIPCO platform or by the platform itself. The concept of a resource thus corresponds to an action along with all its associated data.

An index of the reference numbers and corresponding elements is provided:

| Reference Number | Elements |
| --- | --- |
| 100 | PIPCO System |
| 101 | PIPCO Central System |
| 102 | PIPCO Local System |
| 105 | Participant |
| 200 | Process Specification Language |
| 300 | Specification Repository |
| 305 | Atomic Resources |
| 306 | Resource |
| 307 | Resource Map |
| 309 | Agent Role Map |
| 310 | Resource Hierarchy |
| 311 | Identity Map |
| 313 | Credential Map |
| 315 | Atomic Agent |
| 316 | Agent |
| 317 | Agent/Role Hierarchy |
| 319 | Process Step/Transaction |
| 321 | Process Step/Transaction Hierarchy |
| 323 | Knowledge Database |
| 400 | Process Knowledge Engine |
| 404 | Process Definition Layer |
| 405 | Process Map |
| 407 | Relationship Layer |
| 409 | Object Hierarchy Layer |
| 411 | Agent Class |
| 413 | Transaction Class |
| 500 | Execution Engine |

As shown in FIG. 1, the PIPCO system 100 is an intelligent process assistant that works to assist all participants 105 in a group of business processes specific to a given industry domain by coordinating all the process interactions required among their various agents 316 for performing these functions. The PIPCO system 100 is a web based process hub that efficiently and effectively connects all participants 105 (and the agents 316 who act on their behalfs) to each other, as necessary and as required. The PIPCO system 100 does not possess the superior intelligence needed to decide on exactly what changes need to be made to improve a process, but permits the gathering of information to allow one to perform such a function. Once any changes are decided on, the PIPCO system 100 can be instructed to implement them much as a low-level functionary in a production line (or an intelligent robot) might. The PIPCO system 100 thus is a primitive intelligence that can deal with voluminous amounts of process flow information generated by the multitude of agents it has to deal with, while being programmable for greater functionality both in terms of data complexity and process steps. Designing the PIPCO system 100 is tantamount to designing a simple brain—it needs to have the ability to process information, store state and accumulate knowledge over time.

As shown in FIG. 2, the PIPCO system 100 can be viewed as being made up of four main components:

The Process Specification (or Domain Programming) Language 200. This is the language that is devised to allow for the identification/specification of all the components of the PIPCO system 100 (agents, process steps, access rules, etc.), and to lay out the sequencing and the logic of the actual process steps. This language is highly specific to the domain in which the PIPCO system 100 provides process coordination.

The Specification Repository 300. For the PIPCO system 100 to provide process coordination, it needs to know the atomic details of the process. It needs to understand what the process steps 319 are, how they are performed, who the participants are, their roles, rights and permissions and other setup information. These details are maintained by the specification repository 300. Without this information, the PIPCO system 100 could not even begin to perform its functions.

The Process Knowledge Engine 400. The PIPCO system 100 has to have an understanding of the overall sequencing of process steps 319 as well as maintain a concept of current process state to provide coordination. It needs to track any transaction done on its system from initiation through completion. The information obtained from monitoring this process flow is what permits the PIPCO system 100 to determine what every participant has done in a given process and subsequently analyze the whole process' efficiency. As such, the PIPCO system's 100 process sequencing and state engine is effectively the system's conscious brain that gives the system its intelligence for effecting process coordination.

The Execution Engine 500. This is the part of the PIPCO system 100 that actually implements the various process coordination steps with the rules and mappings laid out in the specification repository 300 to drive its behavior. Put differently, the execution engine 500 is the body that performs the functions it is directed to by the process knowledge engine 400 that is the brain. The execution engine's 500 activities are logged and ultimately studied by the process knowledge engine 400. The execution engine's 500 behavior is driven by code written in the process specification (or domain programming) language 200.

The Process Specification Language 200

The Process Specification Language 200 is a domain specific programming language that is devised to permit the specification and programming of the entire PIPCO system 100. At the minimum, the language will permit the specification of a high-level process map that defines all of the following:

What the various steps are for the process that the PIPCO system 100 is trying to model and how to perform the various system functions for each of these steps.

Who the agents are in the process along with their roles in each of the process steps.

How agents work with the PIPCO system 100 both in terms of incorporating their designated process steps into the platform framework as well as in their ability to create, access and change information resident in the PIPCO system 100.

The process specification language 200 has to be very specific to the domain/industry in which the PIPCO system 100 operates for process coordination. It has to be flexible enough to support a variety of agent 316 and process flow specifications. It also needs to support high-level process steps 319 to allow for easy checking of the specifications. Thus, in a healthcare domain for example, the language needs to be able to specify high-level operations such as accessing a patient's record in a specific format from a hospital, converting a radiology image for viewing in a certain format, etc.

The PIPCO system's 100 rules language will be called upon to define a large number of potential agents 316 and process steps 319. In addition, a single agent or process step will have to be mutable into multiple sub-units. For example, in the healthcare domain, a monolithic hospital agent could over time be broken up into a multitude of agents who are subdivisions or lower level functionaries of the single hospital. Again, a single process step, whose inner workings the PIPCO system 100 was not initially privy to, might over time be broken up into a group of sub-steps. Given this design requirement, the PIPCO system's language will have to support a hierarchic definition of agents and process steps that can over time be redefined into groups of smaller entities with minimal effort.

The Specification Repository 300

The specification repository 300 provides the basic knowledge (building blocks) in order for the PIPCO system 100 to provide process coordination. The specification repository 300 provides answers to the following questions:

What is the PIPCO system 100 going to do for the participants (in terms of specific process steps or transactions 319) in its chosen domain? Every process step 319 in the PIPCO system 100 framework is treated as the access of a resource. As such, the specification repository has to define exactly what resources are accessible through the PIPCO system 100 which is tantamount to laying out what functions can be provided.

How should the PIPCO system 100 go about providing a specific requested resource or service? For this, the PIPCO system 100 needs to understand both where the requested resource or service is, and how to deliver the same through the PIPCO system 100.

Who are the participants 105 and their authorized agents 316 in the PIPCO system 100? The PIPCO system 100 needs to understand the various participants 105, their agents/roles in the system and their rights to access the various resources defined. These agents 316 moreover, need to have the appropriate credentials to instruct the PIPCO system 100 to perform their chosen functions.

As shown in FIG. 3, the specification repository 300 performs the following functions: (1) identifies where and what the resources are for the particular domain by (a) standardizing the resource definitions and (b) building a map of resource locations 307; (2) optimizes how to provide resources to a participant 105 (including identifying the process steps 319 and allocating the process steps 319 into a transaction/process steps hierarchy 321); and (3) determines which participant 105/agents 316 have access to what resources by (a) creating a hierarchy and role map 309 for the agents within each participant based on the roles that exist within the participant organization, (b) reconciling multiple identities the participant's agent might have at other participants 105 in the PIPCO system 100 with an identity map 311 and (c) creating a credential map 313 for resource access.

Resources (What and where)

The PIPCO system 100 is a virtual cloud platform that provides a common interface for process resources to all its participants 105 no matter where they are from and what internal systems they are using. The PIPCO system 100 is a middleware layer that provides seamless operational access to all the resources available to each participant 105, where the term resource encompasses both functions as well as data. By creating a common framework for resource operational access no matter where they are located or what third-party subsystems they are provided by (which is equivalent in our discussion to a common framework for executing a process step), the PIPCO system 100 can track the entire process flow and can thereby improve overall efficiency.

As illustrated in FIG. 4, a resource R 306 requested by an agent X 316 at 4-01 might be resident on the systems internal to another participant A 105 at 4-02. However, when X is authenticated into the PIPCO system 100 at 4-03, he needs to be able to access resources R 306 he is entitled to in A's systems as though they were actually maintained by the PIPCO system 100—the process of authenticating X for the resources R at participant A and their delivery to X have to be transparent to X, and will be further described below.

To provide access to resources, the PIPCO system 100 has to: (a) standardize resource definitions across participants; and (b) build a map of resource locations 307.

Standardize Resource Definitions Across Participants

In most ad-hoc processes across many participants, what defines a resource (be it a process step or data unit) is itself not consistent across participants 105 and can vary quite widely. A resource can be a text file, a video, an appointment, a voice call and the like, or a more complex concept such as a procedure, a test summary, or a claim backup. Different participants 105 typically have different access protocols and credentials for various resources. However, when the resource definitions are not standardized across participants 105 in the process, there is no way to provide any process coordination because there is no concept of what a process step is.

The PIPCO system's 100 approach to resolving this is to develop a common hierarchy 310 of resources 306 that unifies the resource models in use across all the participants 105. To do this, the specification repository 300 of the PIPCO system 100 performs the following functions:

1. Define what the atomic resources 305 for the PIPCO system 100 are, using the most granular resource elements used by the universe of participants 105 in the framework of the domain. It is important to note here that not all participants 105 will actually work with this level of granularity in their resources internally, which means that the PIPCO system 100 may have to break down their internal aggregate resource concepts into a more atomic framework.

2. Organize these atomic resources 305 into a logical hierarchy 310 for access, security and functional purposes. The expectation in designing this hierarchy is that most participants 105 in the PIPCO system 100 will find that their resource concepts correspond to some level or levels in the hierarchy 310. The higher up we go in this hierarchy, the more complex the resource concepts become.

3. Map the resource definitions in use across all the participants 105 into this framework for the domain so that when a specific resource in the context of the PIPCO system 100 is referenced, it is referring to the same item across any participant 105 despite any internal definitions they may have.

The above resource framework is extensible both upwards (to create more complex resource groupings and access hierarchies) and downwards (to create more atomic resource definitions) when needed as PIPCO over time expands its process knowledge.

FIG. 5 shows some atomic resource definitions in a healthcare domain with three participants 105: Hospital A, Imaging Facility B, and Laboratory C. Each participant 105 has a different concept of what it deems to be atomic resources 305. Hospital A has an overall concept of a medical record broken down into Images, Tests and Visits with no additional granularity past that framework. Imaging facility B and Laboratory C have more granular notions of both images and tests than Hospital A does breaking these down into the categories of CAT Scan, X-Ray, Blood Test, and Urine Test. The PIPCO system 100 creates an atomic resource definition from the resources in use at various participants 105. The definition step for the PIPCO system 100 involves first identifying the (initial) atomic resources 305 of the framework as being the CAT Scan, X-Ray, Blood Test, Urine Test and Visit. The PIPCO system 100 then organizes each participant's 105 resources into a resource hierarchy 310 starting with these atomic resources 305 recognizing that not all participants 105 may have or need all these atomic resources 305 internally. The PIPCO system 100 may also have to create such atomic resources 305 for participants 105 who have these resources but operate with them internally at a higher level of aggregation. Hospital A for example, operates with an Image category but that will be broken down into sub-categories by the PIPCO system 100 both in concept and in implementation. This happens even though Hospital A internally does not work with these categories to ensure that Hospital A can work correctly with the other participants 105 in the PIPCO system's 100 framework.

FIG. 6A illustrates the resource hierarchy 310 for the various atomic resources 305 shown in FIG. 5. The PIPCO system 100 constructs a hierarchy 310 for the atomic resources 305 from the various participants 105. Hospital A, Imaging Facility B, and Laboratory C all have divergent definitions and terminology for their respective resources and access/use hierarchies. Having established an atomic set of resources 305 in the prior step as shown in FIG. 5, the PIPCO system 100 then sets up a hierarchy 310 for the atomic resources 305, such as Medical Record, Medical Study, and Medical Element in order of increasing specificity. The atomic resource definitions 305 and hierarchies 310 in use among the participants 105 can be mapped into the PIPCO system 100 framework in some cases with slight changes in terminology, and in others (like Hospital A) with a significant amount of effort. For example, for certain participants 105 (like Imaging Facility B) where no corresponding resources 306 are identified to fit into certain levels in the resource hierarchy 310 (like Medical Record), the PIPCO system 100 creates such resources 306 for the participant 105 with the appropriate access logic.

Over time, it should be noted also that the PIPCO system 100's resource definitions might change with resources 306 being broken down into increasing levels of atomicity. FIG. 6B illustrates how one atomic resource 305, i.e. patient record, can be broken down into lower hierarchy atomic resources 305, e.g. medical record, prescription record, etc. over time.

It is anticipated that individual participants 105 will support only a subset of the PIPCO system's 100 atomic resources 305 and can map their resources only into a part of the PIPCO system's 100 extensive atomic resources 305 and resource hierarchy 310. However, the logical organization provided by the PIPCO system's 100 framework for resources across all participants 105 is an essential precondition for process coordination. The PIPCO system 100 can engage in process-wide setting of permissioning and access that abstracts away from individual resource concepts in use at each participant 105 due to the existence of its resource map 307 (to be further discussed below). In the discussions below, atomic resources use reference number 305, and resources in general (be they atomic or higher-up in our resource hierarchy 310) uses reference number 306.

Since the PIPCO system 100 views all data elements and functions as resources, and process steps 319 are defined to be accesses of these resources (which we can also think of as being operations performed on these resources) the creation of the resource hierarchy 310 is tantamount to defining every last function and data element made available through the PIPCO system 100 platform. The resources 306 in the resource hierarchy 310 (atomic and other) are the only ones that the PIPCO system 100 knows about and can process through its framework. It is important that this resource hierarchy 310 be comprehensive enough to support the needs of all the participants 105 in the PIPCO system 100.

Build a Map of Resource Locations

Once the various resources made available by participants 105 to each other in the context of a specific process instance are identified and categorized into atomic resources 305 (and more generally resources 306 using the resource hierarchies 310), they need to be located so that they can be made accessible to other participants 105 in the PIPCO system 100. The PIPCO system 100 builds a resource location map 307 in its specification repository 300 that can identify the specific systems within and across participants 105 that store relevant elements and lay out the methodologies for access as well as the credential systems in place for authenticating such access.

Building the resource map 307 is an important step in the PIPCO system 100. The analysis that the PIPCO system 100 does is to study how best to locate and access these participants' 105 resources 306 given the protocols in use internally within the participant's 105 setup. The initial set up of this resource map 307 is mostly a manual process, but its maintenance can be facilitated by document versioning and specification technologies that are widely in use currently. It should be noted that since not all participants 105 will necessarily support all the atomic resource 305 concepts that the PIPCO system 100 works with, the resource map 307 will by necessity support both atomic resources 305, as well as resources 306 higher up in the resource hierarchy 310.

A standard relational, object or other database can provide the table structure and can also support the hierarchy 310 needed for quick access of these atomic resources 305. For a given domain, there may be several thousand atomic resource 305 identified/defined. However, these numbers represent a trivial load for any modern database engine.

How to Provide Resources to Participants

Knowing what and where resources are with the resource map 307 does not allow the PIPCO system 100 to solve the problem of how to access the resources and deliver them to participants 105 requesting them on the PIPCO system 100, and what the process steps 319 are to achieve this. The various resources 306 identified in the resource map 307 are accessible through a variety of protocols using varying credentials. To allow for the resources 306 to be accessed by the PIPCO system 100, accessors/operators are provided for the resources 306 (both atomic and higher level as needed) that take the appropriate participant 105 credentials, apply them as needed to the resource repositories maintained by the various participants 105 and then parse the formats in which the resources 306 are delivered into a structure from which the PIPCO system 100 can extract the information it needs to update its process state as well as to manage the delivery of the resource 306 to the requesting participant 105.

For example, the process step 319 to obtain transaction tags from a medical transaction delivered in the Health Level 7 Clinical Document Architecture standard (HL7-CDA) by a hospital, the PIPCO system 100 has to do all of the following:

Connect. The PIPCO system 100 provides a connector to the hospital system that delivers this HL7-CDA record, where it can automatically send the requesting participant's 105 credentials for authentication to access this resource. The protocols for this for example, might involve complex multi-stage authentication.

Request. The PIPCO system 100 requests the appropriate resource after authentication using the right hospital locators for identifying this resource 306, which means it needs to convert its resource location map 307 into precise instructions for the execution engine 500.

Parse. The PIPCO system 100 parses the resource 306 returned to extract information which in this case means parsing the HL7-CDA document to extract the appropriate transaction dates, tags and other details that are relevant to the PIPCO system 100 for logging the transaction correctly. This requires providing a relatively complex parser that not only understands the HL7-CDA format, but also can deal with the site-specific codes introduced in this format by the specific hospital delivering the report. In the event that the resource 306 delivered is not "atomic enough" for the accessing agent 316, the PIPCO system 100 will have to process it to break it down into the form desired so that only the appropriate atomic part of the resource 305 is delivered.

The various resource accessors are custom-designed with possibly third party components for seamless integration and exchange of information among various operating platforms via the PIPCO system 100. The accessors have to rely on the PIPCO system's own identity definitions and mapping to work properly.

To Whom the Resources are Provided

The PIPCO system 100 defines all the participants' 105 agents 316 that are permissioned to use it and specifies exactly what each can do on the PIPCO system 100. The PIPCO system 100 also has the right authentication/credential mechanisms in place to allow each agent 316 to perform his/her permissioned functions given that it will involve multiple participant subsystems that might have their own concepts of agents, roles and security. Thus, even if the PIPCO system 100 understands how to provide access in technical terms, it needs to be able to manage the mechanism of who or which agent 316 can obtain such access. The PIPCO system 100 achieves this by providing a hierarchy and role map 309, an identity map 311, and a credential map 313.

Agent Hierarchy and Role Map 309

The PIPCO system 100 defines the roles for each agent 316 in its platform. These roles are defined based on the process that the PIPCO system 100 is coordinating, and have to be granular enough to permit the various levels of access and coordination that the process needs but simple enough to permit overall process understanding and analysis. The most granular roles would be that of the base/atomic agents 315 in the PIPCO system 100. The process for setting up the base/atomic agent 315 definitions in the PIPCO system 100 is very similar to the process for atomic resource 305 definition discussed above and shown in FIG. 5. The process for setting up the base/atomic agent 315 definitions is simpler than that for atomic resource 305 definitions because there are obvious logical participants involved in a given process in the domain of operation.

The PIPCO system 100 incorporates the atomic agent definitions 315 into a hierarchy of more complex agent 316 definitions. Agents 316 higher up in the hierarchy have all the capabilities of the agents 316 below them in (their branch of) the hierarchy, and some additional capabilities that the lower agents 316 lack. The atomic agent definitions 315 ensure that a granular enough set of (atomic) roles exists that will allow appropriate modeling of the capabilities and permissions of the various actual agents 316 that will use the PIPCO system 100 by slotting them into the right position in the agent/role hierarchy 317. The PIPCO system 100 thus controls permissioning and access by simple rules established on the basis of the position of a given agent 316 within the agent/role hierarchy 317. The process for creating the agent/role hierarchy 317 is similar to that followed in setting up the resource hierarchy 310 as shown in FIGS. 6A and 6B. The agent/role hierarchy 317 defines the levels of access for all agents 316 in the PIPCO system 100 depending on where they are located in the hierarchy and its proper definition is critical for the correct functioning of the PIPCO system 100. In our subsequent discussions, the concept of an atomic agent uses reference number 315, and the concept of a general agent (atomic or higher up in the hierarchy) uses reference number 316.

FIG. 7 shows some base/atomic agent 315 definitions and the agent/role hierarchy 317 in a healthcare domain with two participants 105: Hospital A and Clinic A. Similar to the atomic resources 305, each participant 105 has different agents 316 who would be an atomic agent 315 of the PIPCO system 100. The PIPCO system 100 creates a base/atomic agent 315 definition based on the various agents 316 within the participants 105 in the domain, which in this example are just two base agents 315 of Nurse and Doctor. Each agent 316 in this example operates with a different named role (from the PIPCO system 100's perspective) at each participant 105. For example, a medical provider at Hospital A is a doctor, but at Clinic A is a nurse. Again, Clinic A does not even have a Doctor role/agent, and Hospital A does not define a Nurse role/agent. The PIPCO system 100 sets up a agent/role hierarchy 317 such as Organization, Senior Provider and Provider, and remaps each role at the participants 105 into the agent/role hierarchy 317 for process coordination. For simplicity, FIG. 7 shows a single agent/role hierarchy 317 within the PIPCO system 100 to which these internal participant 105 roles are mapped. In a full implementation, the agent/role hierarchy 317 can have multiple branches to deal with multiple functions and roles within each participant 105.

Security frameworks that do not dovetail easily with this hierarchic view simply cannot be adapted into the PIPCO system 100—the resulting complexity will be too much for the platform.

Specifying roles and permissioning agents in the PIPCO system 100 is a simple process that can easily be implemented in any computer system. The wrinkle the PIPCO system 100 faces however, is that its process roles may not map easily or at all into specific internal roles within individual participants 105 that participate in the platform. The PIPCO system 100 defines its security framework in terms of its own agent role definitions for consistency across its platform. However, each participant 105 of the PIPCO system 100 will likely have its own internal security framework based on its identification of the accessing party. Since the roles and the identities are of necessity different, what is clear is that the PIPCO system 100 has to map its own identities and roles into equivalent roles/identities to access various resources 306 for each of its agents 316, along with the appropriate credentials for access, by creating an identity map 311 and a credential map 313.

Identity Map 311 to Reconcile Multiple Identities

One of the biggest problems in coordinating an external process is that participants 105 generally will not agree where it comes to identifiers either for users or more generally for resources such as documents. While multiple document identities might create the annoyance of document redundancy, disagreement on user identities will mean that any process coordination will not be possible—we cannot coordinate a process where there is a disagreement on who the actors are. Thus, creating a central hub for process interaction requires that we unify identities for the various participants 105 and when possible even for the various resources 306 across participants 105 to the extent such resources are physical resources 306 such as documents. In a system that everyone is required to implement, say by government mandate, such identity unification is relatively simple though the transition to the same can be painful. In this situation, every participant has to adopt the resource and participant identifiers mandated by the central system which becomes the universal identity provider.

The PIPCO system's 100 approach to unifying identities is radically different given that is not a mandated system. By design, the PIPCO system 100 functions as a central cataloging system that maps a central PIPCO identity for each agent 316 and resource (whether atomic or not) 306, to a catalog of associated identities for the same across all participants 105. Thus, when data pertaining to a given resource 306/agent 316 is being accessed from a given participant 105, the PIPCO system 100 translates its central process identity for this resource 306/agent 316 into the appropriate identity in the participant's 105 internal framework. Thus, the PIPCO system 100 maintains a universal identity translator that can map multiple identities for an agent 316 or resource 306 across participants 105 into a single identity that guarantees that all participants 105 in the process flow are all referring to the same resource 306 or agent 316. This is a critical element of the PIPCO system 100 design—without such identity unification, it will be impossible to get a consistent view of all participants' 105 activities within a given process step 319. It is also important to note that such identity unification has to happen at the level at which such identities are maintained by the participant 105, not at the level of atomicity that the PIPCO system 100 accesses them by. Thus for example a Medical Record resource 306 within a participant 105 might be broken down by the PIPCO system 100 into more atomic resources 305 such as CAT Scan, X-Ray, Blood Test, Urine Test etc. However, the participant 105 identifiers for its Medical Record are linked to that resource 306, and not the PIPCO System 100's atomic resource 305 definitions which the participant is not aware of. As such, the PIPCO System's 100 identity unification even for atomic resources 305 has to occur at the appropriate level in the resource hierarchy 310 within the participant 105 where resource identification is actually possible. In this example, thus, such identification and unification will have to occur at the Medical Record level.

FIG. 8 shows an example from the healthcare domain that can help to make this clearer. A variety of electronic health record systems exist today as do numerous insurance and billing systems. A patient named John Smith Junior might be entered into various provider systems in different ways. Participant 105 Hospital A for example might refer to him as J. Smith, II. Participant 105 Hospital B might call him John Smith, II, while participant 105 insurance company C that covers him might refer to him as J. Smith Jr. These variations are hardly unusual especially when the father of our patient who is John Smith Senior might also be a patient involved with all these participants 105. Forcing a common identity to John Smith Junior across all participants 105 in this context is a difficult process—every last one has to update his/her internal identity maps with the process getting even more complex on a global basis where Junior for example might be replaced by another term such as Filo as might occur in a Portuguese speaking nation like Brazil.

The PIPCO system solves the identity problem without requiring participants 105 to change their internal data. After all, if a hospital (say Hospital A) is to identify a patient as J. Smith II, it will refer to him the same way in all its internal transactions pertaining to him. The PIPCO system 100 may identify this same patient as John Smith Junior in its identity map 311 and will map his identity for participant 105 Hospital A to be J. Smith, II, which is the identity the hospital uses, and translate all references to him appropriately across participants 105 when needed. The idea here is that by doing so, the PIPCO system 100 resolves the identity problem once at the platform (for resources 306 obtained from every participant 105), and any other participant 105 accessing this patient using the PIPCO system's 100 John Smith Junior identifier is assured of the right John Smith no matter which participant 105 provides his records.

Although FIG. 8 illustrates the identity map 311 in the context of a patient's identification, the same applies to other agents 316 or resources 306 (such as documents that have unique identifiers inside organizations/participants 105) within their respective hierarchies 309 and 310 when required. This is one of the more critical aspects of the PIPCO system's 100 overall design.

Credential Map 313 for Resource 306 Access

The identity map 311 cannot itself serve to obtain needed resources 306 from various locations of the various participants 105. For each agent 316 of the PIPCO system 100, the PIPCO system 100 has to set up a map of credentials 313 for resource 306 access from each participant 105 from whom he will be accessing such resources 306. These credentials are tied to a participant's 105 defined identity for that particular agent 316 defined in the identity map 311. This way a request to the PIPCO system 100 is an authenticated resource request from a given agent 316, which is translated into an equivalent request to the participant 105 who actually stores the required resource 306, using the right identity for the same, along with the correct credentials. Once the resource providing participant 105 authenticates this request (being given the credentials such participant 105 provided the agent 316), the appropriate resource 306 can be accessed and delivered to the requesting agent 316. By providing this function, the PIPCO system 100 is effectively becoming a virtual resource repository for all participants 105. Any resource needed by participants 105 in the process is made seamlessly available by the PIPCO system 100 even though it might be resident in a remote location with another participant 105.

It should be noted that a given agent 316 might request a resource 306 that is more atomic than what actually exists in the participant 105 (as in the new resource points shown in FIG. 6A) because of the PIPCO system 100's resource mapping and hierarchy 307 and 310 creation. For such cases, the PIPCO system 100 will use higher level credentials than available to the agent 316 to obtain the more extensive resource 306 but then only deliver to him the portion of this higher level resource 306 that he is entitled to access (which will be some resource 306 that is lower in the resource hierarchy 310 than the more extensive resource 306 obtained by the PIPCO system 100) according to the PIPCO system's 100 rules. That is, an Imaging Technician in a hospital might have access only to images, but a given participant 105 in PIPCO's system 100 might only maintain Medical Records that also contain images but that our Technician is not entitled to see in full. In such situations, the PIPCO system 100 will obtain the Medical Record from the participant 105 using higher-level credentials than that available to the Imaging Technician, but then only make available to the latter the images from this Record. For such purposes, the PIPCO system 100 will have designated credentials that permit the right level of access to obtain the higher level resources 306 for its purposes of creating resources 306 that are lower in the resource hierarchy 310.

The identity and credential maps 311 and 313 that the PIPCO system 100 provides are relatively straightforward to implement. The identity map 311 by design links all credential information for resource 306 access. These maps are inherently relational and can be implemented easily in a classic relational database. They can get quite large however, and need to be very well secured given the sensitive nature of the credential information that is stored, while providing good performance. The true challenge in implementing these maps rests less in the abstract design and more in the implementation for good performance.

The identity and credential maps 311 and 313 allow the PIPCO system 100 to provide seamless access to resources 306 dispersed across participants 105. This is a critical design requirement for the PIPCO system 100 platform. In fact, with stored credentials and high-speed communications links to the individual participants 105, the PIPCO system 100 provides a much higher level of performance than individual participants 105 accessing the same resource 306 outside of the PIPCO system 100 might get.

The various information, data, maps, specifications, etc. of the specification repository 300 are stored in one or more knowledge/process state databases 323.

The Process Knowledge Engine 400

The PIPCO system 100 views every process as a sequence of resource 306 accesses or to use a more familiar term, transactions. A high-level process might be made up of a sequence of transactions with a well-defined beginning and ending step though there are many transactions contemplated with multiple parallel threads of activity where such a clear delineation is not possible. For process monitoring and coordination, the PIPCO system 100 has to know the sequence of steps involved in the process 319. The knowledge engine 400 is the component of the PIPCO system 100 that defines and maintains the process sequencing logic—it is the conscious brain of the PIPCO system 100 that understands the process and stores the sequence of process steps 319 already completed. The PIPCO system's 100 ability to store overall process state across all participants 105 is what allows it to make the process flow transparent and assess where, if at all, process efficiencies can be improved.

The specification repository 300 defined the atomic process steps 319 and the various access and resource maps 307, 309, 311, 313 needed to execute each step. The knowledge engine 400 pulls these specification building blocks together into a process structure that is adaptable for each participant 105 depending on his requirements. The consistency of the definitions in the specification repository 300 allows process logic coding (and the maintaining of process state) with complex sequences of process steps and guarantees that this code works seamlessly across all participants 105 of the PIPCO system 100.

There are some significant design considerations raised in creating the process map 405 for the process knowledge engine 400 of the PIPCO system 100 that are unusual if not unique. Specifically:

Large volumes of abstract data. The process steps 319 logged by the PIPCO system 100 which are viewed as atomic transactions need to be stored along with information as to who participated in the process 319, their access permissioning etc. These data need to be stored in a way that permits us to link back to the various participants' 105 data repositories as needed when the transaction in question involves data elements that are being accessed, Given that every function performed by the PIPCO system 100 for its participants 105 (including access of records, uploads, image conversion etc.) is a process step 319, the system 100 will log millions and ultimately billions of transaction steps. Storing these transactions along with their rich set of links and retrieving them efficiently is a critical design goal.

Changing nature of atomic resources 305, agents 316 and relationships. The PIPCO platform's 100 concept of an agent 316 and his transactions might get richer and more complex over time. For example, a hospital participant 105 that gives the PIPCO system 100 access to a monolithic patient record as a single resource might decide that this atomic resource 305 needs to be parsed by the PIPCO system 100 into its various components such as test results, doctor visits, allergies, etc. When this happens, the PIPCO system's 100 platform needs to expand its hierarchy and role maps 317 and 309, credential maps 313, and resource maps 307 to support these now exploded resources 306. Again, the same might happen for a monolithic atomic agent 315 in the PIPCO system 100. A hospital participant 105 for example, might want the PIPCO system 100 to allow for more granular process coordination across specific members in its staff such as doctors, nurses etc. (i.e. a more granular agent/role hierarchy 317) in the context of the overall process flow. The morphing of a single atomic agent 315 or atomic resource 305 into multiple new subtypes not only increases the number of atomic agents 315 and atomic resource types (while rendering many of the prior atomic types no longer atomic!) but also necessitates the creation of many new atomic resource 305/agent process links. The PIPCO system's 100 platform supports such morphing as a core element of its design.

Complex and Flexible Relationships. The process steps 319 may have to be related in complex ways that may not be anticipated when the PIPCO system 100 is first set up. For example, the process steps 319 relating to a medical patient coming in for surgery might need to be related to his transportation requests and accommodation arrangements—things that are not of a medical/healthcare nature in the strict sense but in the context of a sick patient who needs special transport and lodging are in fact part of the process 319. The relationships that the PIPCO system 100 will model are not all set during the initial design phase and the PIPCO system 100 needs to be flexible enough to support any type of future relationship that may not be anticipated.

To meet the above objectives, the PIPCO system's 100 process knowledge engine 400 is the most complex component in the overall design. The process knowledge engine 400 has to deal with a growing number of participants 105, an increasing hierarchy 310 of atomic resources 305 and a growing number of agents 316. It has to also deal with a growing set of process steps/transactions 319. Moreover, the knowledge engine 400 has to reference and track all these process elements (agents, resources, steps etc.) at any level in the various hierarchies, and it has to do all this while providing reasonable performance. The PIPCO system 100 addresses these requirements in a sequence of layers: the process definition layer 404, the relationship layer 407, and the object hierarchy layer 409. A schematic of these layers is laid out in FIG. 9.

The Process Definition Layer 404

As shown in FIG. 10, the process definition layer 404 permits the sequencing of numerous transactions into a well-defined process layout. "T" represents a particular transaction/process step 319. A particular sequence of a process steps 319 may involve starting at T0, to T1, to T4, then ending at Tn. In a more concrete example in the healthcare domain shown in FIG. 11, the process steps 319 described above would involve starting at "Patient Visit Doctor," to "Blood Test," to "Senior Doctor Visit," to "End of Patient Transaction."

The actual specification of the process layout 404 is not as simple as just laying out a static graph as shown in FIG. 10. This is because an actual process that the PIPCO System 100 will deal with is much more fluid and will often involve multiple branches based on results obtained from prior steps 319. The process definition 404 will have to be written in the process specification language 200, and will lay out the overall process logic including the results (if any) that need to be obtained at every step and what the next possible step might be. Put differently, the process specification is much like a language grammar. The grammar rules restrict the possible order of process steps 319 (to a greater or lesser degree depending on the process in question) but the actual process flow might evolve in any fashion that is consistent with our grammar. It is in defining the process step 319 sequencing moreover that the importance of the process specification language 200 becomes obvious. When defining sequencing rules for a process 319, it is essential that we have a language that is rich enough to capture the high-level process primitives for that domain. Thus, in a medical domain our process specification language 200 will have to support high-level primitives such as "Get Medical Record from Hospital" or "Establish Conference Call with Doctor" that will permit easy process sequencing within our process definition layer 404. These high-level concepts of course will be interpreted by the PIPCO system 100's execution engine 500 (taken up in the sections below) to perform the desired functions.

Despite the fact that the process definition layer 404 involves complexity in specification, it is perhaps the simplest part of the specification repository 300. The PIPCO system 100 uses the process specification language 200 to program the rules that lay out the dynamic process sequencing steps 319. This specification even for a complex process is relatively small and easily maintained in the PIPCO system's 100 specification repository 300 using any available database or even simple file storage technology.

The Relationship Layer 407

The relationship layer 407 of the knowledge engine 400 allows for the mapping of relationships (such as participant, principal, payer, guarantor, receiver etc. depending on the domain) between any agent 316 in the agent hierarchy 317 and any process step 319 (which to reiterate in the PIPCO system 100 is viewed as accessing a resource 306) in the process step/transaction hierarchy 321. For example, a phone/conference call that occurs (which in the PIPCO system 100 is an resource 306 request involving two or more agents 316) is a resource 306 use that needs to be linked to all the participating agents 316, possibly with the actual recorded call and/or a transcript of the same being available to all agents 316 in it. The initiator of the call might be related to this transaction with the relationship "initiator" and the participants with the relationship "participant". This relationship setup will allow us to go back to the transaction in question later to determine exactly who did what in it, and possibly notify them appropriately later based on rules set up when transcripts or recordings of the call become available. It is this linking of agents 316 and transactions 319 after the fact that permits each to have a full view of what has happened in the process.

The problem is that the PIPCO system 100 has rich agent and process hierarchies such as 317 and 321. Meshing these changing hierarchies with an even richer relationship layer 407 will simply become impossible if the system were of moderate complexity, let alone the complexity of the PIPCO system 100. To permit such modelling, the PIPCO system 100 adopts strict rules:

Every agent 316 in the PIPCO system 100, no matter where he is located in the agent/role hierarchy 317 belongs to an Agent class 411.

Every action performed or transaction 319, no matter where it is in the transaction/process step hierarchy 321 in the PIPCO system 100 belongs to a Transaction class 413.

Only Agent and Transaction classes 411 and 413 can be related to each other or among themselves in the context of the relationship layer 407. The relationships between Agent and Transaction classes 411 and 413 are multi-modal which means they can be related in arbitrary ways, be they with SQL-style relational schema, or no-SQL methods such as graph, key or other arbitrary connections. The multi-modal nature of the PIPCO system 100 means that all these types of relationships will be permitted simultaneously.

The multi-modal requirement in the relationship layer 407 can be easily understood with the following simple process example. A process with four agents 316 A, B, C and D might be initiated by A requiring a specific action to be performed and informing B and C of the same. In response to A's request. B and C might simultaneously have to perform specific functions. Assume that both B and C have to upload a required file to D. D in turn interacts with each of the file providers B and C multiple times as he processes the files uploaded. Such interactions might include notifications to these agents 316 upon verification of the files' correctness, decoding of their contents and analysis of the data in them. Once these process steps are completed, B and C respond with the results from D to A who then deems the process finished. In this case, what is obvious is that the process steps between A and agents B and C respectively are logically distinct. Again, the interactions between B and D, and C and D are logically distinct as well since these are effectively separate groups of interactions that occur in parallel with neither B nor C knowing that the other is interacting with D. Modeling these interactions typically involves constructing a complex graph of process steps 319. When it comes to the actual relationships between agents 316 A, B, C and D however they may be hierarchical. Yet, the question of which agents 316 were involved in a given process step 319 (which is also something the execution engine 500 of the PIPCO system 100 tracks) is a simple one-to-many relation. Since the PIPCO system 100 has to support all these types of relationships simultaneously (graph, hierarchy, relational) even in this trivial example, its relationship core is multi-modal in concept and has to be implemented as such.

The implementation of the multi-modal relationship core is with a combination of many currently available technologies geared to specific types of relationships (such as available relational or graph databases for example) with the linking across the same being made possible by the PIPCO system 100 with custom-designed cross-database tools.

The Object Hierarchy Layer 409

The rich and likely growing hierarchies of agents and transactions in the PIPCO system 100 are not directly captured at all in the relationship layer 407. However, they are captured indirectly because every agent 316 in the PIPCO system 100 belongs to an Agent base class 411 and every process step 319 belongs to a Transaction base class 413. Thus, each agent 316 and process step 319 however complex, has its relationships managed at these base class levels without these connections polluting the agent and transaction hierarchies (317 and 321 respectively). Thus, the agent and transaction object hierarchies 409 can be arbitrarily complex with numerous different agent 316 types and roles, as well as numerous different process steps 319 respectively. However, complex the hierarchy, though, the core relationships, identity maps 311 etc. will all work correctly given that everything is defined at the level of the base class 411 and 413.

The object hierarchy 409 implicit in the Agent and Transaction base classes 411 and 413 means that the core knowledge engine 400 will of necessity be complex. In particular:

At the relationship level it will have to be relational. After all, it is relating Agent classes 411 and Transaction classes 413 which is a purely relational function.

At the agent 316 and transaction 319 levels it has be object-oriented. It embodies a well-defined object hierarchy 409 in these dimensions that needs to be represented.

At the process definition layer 404 where transactions/process steps 319 are organized into the process, it needs to be graph-oriented with multiple pathways and node sequencing.

Importantly, the knowledge engine 400 has to provide all of the above different relationship schemas simultaneously while being fully extensible along all these dimensions.

FIGS. 12 and 13 illustrate an example from two different perspectives of the relationship and object layers 407 and 409 within a process map 405 in a healthcare domain. For the first perspective in FIG. 12, each transaction 319 is organized in a transaction hierarchy 321. For example, Transaction 1 is for images, and in particular, CAT scan images. Similarly, each agent 316 is organized in agent/role hierarchy 317. For example, agent 1 is a doctor, in particular a senior doctor. The relationship layer 407 identifies a relationship between an agent 316 and a transaction/process step 319. The object layer 409 seamlessly relates the Transaction 413 or Agent 411 Class to the more complex transaction 319 and agent 316 concepts. Using the object layer 409 allows the abstraction away from the complexities of the agent 316 and transaction 319 hierarchies (317 and 321 respectively) and their possible mutations over time—the relationships defined at the relationship layer 407 will remain unchanged no matter how these agent 316 and transaction 319 concepts evolve.

For the second perspective in FIG. 13, the relationship layer 407 involves multiple agents 316 with a transaction 319. This transaction for example, might be one that involves both doctors and nurses such as obtaining a CAT scan or X-ray with contrast for which both groups might have participated and for which both would need to have information about after the fact.

The very large number of transactions and relationships that need to be maintained by the relationship layer 407 in the PIPCO system 100 make designing for performance a significant issue. The relationship layer 407 works in concert with the process state/knowledge database 323 to store every transaction 319 processed through the PIPCO system 100 and all the associated relationships (be they with other transactions 319 or agents 316 as indicated by the appropriate Transaction 411 or Agent 413 classes) for the same. This will permit going back at a later date to study this transaction 319 and its relationships from the perspectives of any of the related agents 316 or transactions 319, and analyze the same by comparing it with other similar transactions 319 that might have been done by the PIPCO system 100. As such, the databases for the relationship layer 407 and process state/knowledge database 323 which will work together need to both be distributed, multi-modal and virtual in that most data accessed through their framework will be via links to other sources. Even more, the actual dataset used by a single agent 316 at any point in time is likely to be very small which means the data store has to operate by creating a high-speed view for every agent 316 for his own data for reasonable performance.

The Execution Engine 500

With the resource definitions 306, locations (with resource map 307) and participant identities 311 incorporated into the PIPCO system 100 framework through the specification repository 300, and with the process map 405 provided by the process knowledge engine 400, the execution engine 500 does the actual work of process implementation.

A non-exhaustive list of process features that can be provided by the execution engine 500 includes:

- Access to relevant process resources 306 be they text files, videos, audio, images and the like to all agents 316 based on their appropriate permissions.
- Ability to make voice and video calls or send texts to agents 316 in the PIPCO system 100 directly through the PIPCO system 100 with full recording and, if needed, transcription of the same.
- Capability to upload data according to certain specified rules and to make it automatically available to other agents 316 when permissioned.
- Logging of all transactions 319 on the PIPCO system 100 with full access logs and audit trails for changes.
- Full versioning for all documents with ability recover documents of any vintage with minimal effort.
- Automatic document format conversion, optical character recognition when needed, language translation, backups and compression if and when needed.

To understand how the execution engine 500 works, it is instructive to look at some examples. FIG. 4 shows an example of a typical resource 306 access by an agent 316 that involves the execution engine 500 of the PIPCO system 100 as follows:

1. PIPCO Authorization. The agent X 316 first has to authenticate into the PIPCO system 100 itself using the PIPCO system 100 provided credentials at block 4-03. This authentication might be done by the PIPCO system's 100 own identity management subsystem, or alternatively by a third-party authenticator such as Google or Facebook that provides identity management. The actual process of authentication, however it is accomplished, has to be managed by the execution engine 500, as does the logging of the actual access.

2. Resource Request. The agent X 316 requests (at block 4-01) a resource R 306 to which he is entitled access after authentication. The location of the resource is provided to the execution engine 500 as is the agent location for the resource from the various maps (such as the resource map 307 and credential map 313) maintained for this purpose. The execution engine 500 has to obtain the correct mappings quickly and ensure that the relevant servers that provide the resource 306 in question are operational.

3. Resource Access and Delivery. The resource map 307 shows where the relevant resources 306 are located. However, the PIPCO system 100 itself needs to provide the mechanisms for accessing the resource 306. Specifically, at block 4-06, execution engine 500 has to handle the authentication for the resource 306 using the agent's 316 credentials, access the resource 306 using the needed protocols and identifiers, and once obtained has to deliver the resource 306 in an appropriate format to the requesting agent 316. These tasks can prove highly complex. Thus, if a resource 306 such as a patient image exists on a specialized image server for example, the execution engine 500 will have to provide the right identifiers for the resource 306 based on the participant's 105 protocols, obtain the resource 306 using the appropriate system calls and then post-process the same (as taken up below) for display on say a tablet, phone or other such device.

4. Resource Processing. This is where the true flexibility of the execution engine 500 comes into play. At block 4-08, resource 306 once accessed may have to be processed in some complex ways before delivery to the requesting agent 316. Such processing will include the execution engine 500 post-processing the resource 306 to determine its nature and update its process state/knowledge databases 323 in the specification repository 300 at the minimum. The execution engine 500 might also have activities such as document format conversion, optical character recognition, language translation etc. When the resource 306 is an item like a conference call or a calendar scheduling request, the post-processing will have to incorporate other agents 316 into the processing loop before delivery or completion of the request is possible. Much of the resource processing done by the PIPCO system 100 can be done by third party subsystems that are integrated into the PIPCO system 100 platform for this express purpose. But the execution engine 500 provides the overall management of these subsystems.

Note that FIG. 4 is a simplified example that does not show the actual process map 405 nor the updates of the process state/knowledge databases 323 by the execution engine 500. The process steps/transaction 319 are all specified (along with the current state as defined by all the process steps 319 performed already) in the knowledge database 323. The execution engine 500 simply references these items to perform its various functions, and updates the knowledge database 323 when atomic process steps 319 have been completed.

Put differently, the knowledge database 323 includes a set of rules for the processes 319 that are within the specification repository 300, and the execution engine 500 is the actual machine that executes these process 319 rules and updates the knowledge database 323 when it has completed each step 319. As such, the accumulated knowledge of the PIPCO system 100 can be used to engender process changes by alterations to a given process 319 rules for one or more participants 105 and their associated agents 316 using the process specification language 200 which in this context is a rules programming language. The execution engine 500 actually implements this new sequence of process steps 319. From a user's perspective, the perceived intelligence of the PIPCO system 100 comes from the knowledge database 323 and the execution engine 500 working in concert. Thus, a process step 319 such as the upload of a file of a specific type by an agent 316 might be specified in the knowledge database 323 (with the process specification language 200) as one that triggers a sequence of additional operations such as messages sent to various defined agents 316 acting for specific participants 105, with a tabulation of their responses sent back to the uploading agent 316. The additional steps 319 following the file upload represent the intelligence of the PIPCO system 100—after all, absent the PIPCO system 100 the uploading agent 316 would have had to perform all the messaging functions required by the process 319 himself. The fact that the PIPCO system 100 can perform these functions accurately, consistently and with full transparency to all participants 105 and agents 316 as to who did what (including what the execution engine 500 itself did) is what makes it function as an increasingly intelligent quasi-human assistant to all its participants 105 and their agents 316

Developing the execution engine 500 is an ongoing effort because the rules language has to be extensible to support new agents 316, process steps 319 and resource (305, 306) processing methodologies. This in turn means that the engine 500 itself is constantly extended to support more functionality.

The design of the execution engine 500 is likely to be much more complex and fundamentally different from other similar engines that have been developed. This is because the PIPCO system intends right from the start to be a virtual process coordinator whose participants 105 may be widely scattered geographically with differing and potentially highly complex internal systems. Again, the PIPCO system 100 intends even from the beginning to seamlessly incorporate third party service providers into its framework for activities such as the provision of phone calls, calendaring, translation, format conversion and the like, and possibly even for more fundamental requirements such as identity management. Finally, the execution engine 500 has to log process information from a variety of agents 316 and in a format suitable for easy analysis as discussed below.

Thus, the PIPCO system's 100 platform has to deliver resources 306 obtained from a variety of complex systems in different locations, all in close to real time—a tall order for even a system where the data are all locally resident on a single server. However, the more that PIPCO system 100 centralizes the actual process resources into its own storage framework by copying the same, the more are the chances for redundancy, out of date data and the like.

To deal with these implementation issues, the execution engine 500 is designed from the start to operate both with a central brain as well as remote brains located ideally in each participant's 105 location. Put differently, the execution engine 500 has distributed intelligence with the central brain and the local brains working in concert. FIG. 14 shows the PIPCO system 100 of FIG. 1 in a decentralized setup that includes a PIPCO central system 101 and a plurality of PIPCO local systems 102. Each PIPCO local system 102 may physically reside within a participant 105's internal technology framework behind its own firewalls and security barriers (whether on site or on the internet) or virtually reside in a secure allocation for that participant 105 within the PIPCO system 100.

FIG. 15 shows one of the PIPCO local systems 102 in an expanded form along with the PIPCO central system 101 in a healthcare domain along with the full workings of the PIPCO system 100 to process an agent request from Agent X 316. The numbers in each process step 319 show the process sequencing—we have a total of 9 steps from the request by Agent X of Resource R×1 to its final delivery to him. Steps 1 through 5 which relate to the handling of the requesting agent X 316, his authentication, the search of the resource 307 and credential 313 maps and the actual resource 306 request to the local PIPCO system 102 at our Hospital A are handled by the PIPCO Central System 101. The PIPCO central system 101 maintains the complete process and identity maps 405 and 311 (process map 405 not shown in the figure), along with the logic for access for the execution engine 500. The local system 102 operating in the participant 105 site maintains a copy of these maps 405 and 311 as relevant only for that participant 105 site in terms of data to be delivered to the PIPCO system 100. Steps 6, 7 and 8 are handled by the local PIPCO System 102. The main role of the local system 102 is to manage the agent authentication, pre-format data and tag information so that responding to a resource 306 request from the central system 101 is a relatively immediate process and actually deliver the final result to the PIPCO central system 101. This process will work as follows:

1. The execution engine 500 of the PIPCO central system 101 requests a resource 306 from the PIPCO local system 102 at a participant 105 site (step 5). This request in our example is made with the correct identity of agent X 316 to Hospital A 105 where he is referenced as X-ABC rather than X, and with the right login credentials for Hospital A for X-ABC.

2. The execution engine 500 of the PIPCO local system 102 provides the necessary authentication translations as needed and then polls the internal authentication system maintained by the participant 105 to ensure that the resource 306 requested can be delivered (step 6).

3. If the local authentication server of the participant 105 responds in the affirmative to the access request, the execution engine 500 of the local system 102 will respond to the execution engine 500 of the central system's 101 request by marshalling the resource 306 (which it has likely pre-formatted) and delivering it at high speed to the execution engine 500 of the central system 101 (steps 7 and 8).

4. Repeated requests to the participant 105 site for specific resources 306 might be cached by the execution engine 500 of the local system 102 if needed to boost performance. Caching to the cloud might be essential if the participant 105 site cannot support high-speed communications at times of peak demand. Of course, the PIPCO central system 101 delivers the resource 306 to the requesting agent X 316 in Step 9.

The important issue to note here is that the execution engine 500 of the central system 101 has a host of satellite execution engines 500 at various local system 102 of high traffic participant 105 sites to offload much of the participant 105 specific logic from the execution engine 500 of the central system 101. However, since these execution engines 500 of the local systems 102 will operate with the same rules and maps as the execution engine 500 of the central system 101, there is built-in redundancy where it comes to function as well as the potential to generate very high speeds by optimizing the execution engine 500 of the local system 102 appropriately with suitable caching or other strategies.

With the PIPCO system 100 of the present invention, the biggest bottleneck ultimately is likely to be communications speed in the links from the PIPCO system 100 to its participants 105 and providers. The PIPCO system 100 is devised with the ability to allow for a variety of intermediate caching steps, and numerous different transmission protocols so as to reduce the penalty imposed by communications speeds.

The main challenge of the execution engine 500 of the PIPCO system 100 is not speed but flexibility. Much of the PIPCO system 100 is written in a flexible interpreted language such as Python, with a host of third party modules being integrated into the framework to provide key optimizations. Select modules of the PIPCO system 100 that are bottlenecks will be rewritten in a lower level language such as C++ to improve speed if needed.

Theoretical Efficiency

A conventional process flow, particularly when it involves external agents, is typically set up around point-to-point interactions among the participating agents. These exchanges moreover, involve the transmission of data such as documents, images and the like, with each agent storing his own private copy of the same. Typically, when specific documents are changed, the revised document is sent in its entirety simply because the various agents in the process rarely use common tools that permit the incremental logging and incorporation of changes into an initial document.

With some simple mathematics, we can calculate the worst-case number of agent links that need to be maintained in the conventional process flow as well as the worst-case data storage requirements across agents.

Assume we have n agents in our process interacting on a point-to-point basis. In the worst case, every single agent might have to deal with every other agent in the process. Thus, Agent 1 in this situation would interact with agents 2, 3 . . . n, Agent 2 will interact with agents 3, 4 . . . n in addition to Agent 1 and so on. If the total number of communication links that need to be maintained for this worst case process situation is N, we can show easily that:

$$N = \sum_{i=1}^{n-1}(n-i) = \frac{n(n-1)}{2}$$

In computer science terms, the number of links or channels of interaction between the n agents in the worst case, grows at a rate which is the square of the number of agents, or $O(n^2)$.

On the storage front, assume Agent 1 generates an initial document, updates it a total of m times storing each updated document in its entirety, and then sends each version to the other agents in the process. That is, Agent 1 initially creates a document of size $D_0^1$. His first minor update (or revision 1) changes its size relative to the previous version by an amount $\delta_1^1$ so that the new document has a size $D_1^1 = D_0^1 + \delta_1^1$. On the $k^{th}$ revision then, the size of the document will be:

$$D_k^1 = D_0^1 \sum_{i=1}^{k} \delta_i^1$$

His total storage needs $S^1$ for m changes then, assuming the changes $\delta_i^1$ are small relative to $D_0^1$, will be given by:

$$S^1 = \sum_{k=1}^{m} D_k^1 = \sum_{k=1}^{m}\left(D_0^1 + \sum_{i=1}^{k}\delta_i^1\right) \approx m * D_0^1$$

In the worst case, each agent stores a full copy of every revised version of this one document sent by Agent 1. Thus, the storage needs across all the n agents for just this single document generated by Agent 1 through m revisions will be approximately:

$$n * S^1 \approx n * m * D_0^1$$

That is, the storage needs for the conventional process grow multiplicatively with the number of changes m and the number of agents n or at a rate of O(mn) since mn copies of the initial document are effectively stored.

The PIPCO system 100 by design aims to replace point-to-point interaction between agents 316 in a process with point-to-platform interaction. In the worst-case scenario of a process that requires interactions across all the agents 316, these interactions will nevertheless be conducted through the PIPCO system 100 by every agent 316. As such, the number of communication links will only grow at a rate proportional to the number of agents 316 or linearly. In computer complexity terms, the number of links grows at an O(n) rate rather than the $O(n^2)$ rate in the conventional process flow.

On the storage front, the PIPCO system 100 channels the data to all participants 105 from a single store that is either at the PIPCO system 100 itself or the generating agent 316. Moreover, if the PIPCO system 100 were the exclusive channel for access, it could optimize the storage of the document by storing the initial large document and then simply storing the small changes made. When any agent 316 views the data, he will get the current version because the PIPCO system 100 can perform the appropriate adjustments to ensure the correct document is seen. Moreover, it can maintain an audit record of the changes across the document's history to make understanding the changes much easier. If the PIPCO system were to do this, its storage requirements for the documents generated above, assuming that the changes $\delta_i^1$ are small would be:

$$S^1 = D_0^1 + \sum_{i=1}^{m}\delta_i^1 \approx D_0^1$$

What is clear is that for every transaction 319 in the worst case, the PIPCO system 100 can reduce storage costs by a factor of m*n so the storage per transaction is virtually constant. That is, the PIPCO system 100 has reduced storage complexity from O(mn) to the constant level of O(1).

Thus, the PIPCO system 100 has some obvious benefits. In an n agent 316 process, it cuts down the worst-case agent communication links needed from a complexity of $O(n^2)$ to O(n). It reduces worst case storage requirements for a single document transaction from a single agent with m revisions from a factor of O(mn) to the constant amount of O(1). When the number of agents 316 n is large as are the number of document revisions m, the tangible benefits delivered by the PIPCO system 100 can prove immense.

Three examples are provided below for three different domains: healthcare, global trade, and property and casualty insurance. These domain illustrations are not intended to be exhaustive. Rather they are intended to demonstrate the power of the PIPCO system in allowing for the re-engineering and re-mapping of business processes in these domains. As such, these examples are intended to reinforce the extraordinary power of such a top-down integration platform.

Example of the PIPCO System for the Healthcare Industry

The US healthcare industry is the single biggest area of expenditure for both the private sector as well as the government. Healthcare is among the largest benefits provided by most US corporations to their employees. Medicare and Medicaid are huge governmental programs whose costs only continue to grow with the increasingly aging population in the US.

The sharp rises in the cost of healthcare cannot be understated. In the early 1980s, the US spent roughly 6% of GDP on healthcare expenses. Today, almost 17% of GDP goes to healthcare, and even this figure will rise over the next several years with the demographic patterns in place. Virtually everyone involved in the industry would agree that the costs of healthcare have increased dramatically. In fact, even with significant technological advances that have reduced the costs of both diagnosis and treatment, the overall costs have continued to soar. While there is substantial debate on exactly what has prompted such an explosion in costs, we can nevertheless identify some broad drivers:

- Doctors are increasingly being forced to see more patients, making it impossible for them to spend the time truly necessary for accurate diagnosis. As such numerous often unnecessary tests have replaced educated patient assessment and care.
- The lack of a central system for patient record keeping means that many tests are often duplicated simply because prior data which might be in the possession of a different provider are not available easily.
- The existence of health insurance means that patients are typically not focused on the cost of their care which becomes the responsibility of the insurance company. Rather than a cooperative process to generate the best outcomes for the patient, the health payments system often therefore becomes an adversarial setup where patients, insurance company experts and providers argue about exactly what can be done and paid for.
- Healthcare pricing is notoriously opaque. Few providers make available standard pricelists, even though they are often required to. Consumers cannot easily comparison shop based on costs or outcomes given the complexity of the price detail.
- Fraud is rampant in the industry with a variety of providers and consumers gaming the system either to profit or to get around arcane payment rules.
- Administration costs are high and only increasing. The need to limit fraud and cost overruns means the existence of a permanent group of cost monitors at every step of the delivery process. This in turn imposes more costs both on patients and providers as they have to contend with even more recordkeeping and approval processes.

A significant rethinking of the healthcare process is much beyond the scope of the PIPCO system 100. Yet, the PIPCO system 100 can be used intelligently in numerous areas of healthcare where significant efficiency gains can be obtained, even while leaving the core structure of the system largely intact. In fact, using a PIPCO system 100 strategically in the healthcare industry would make parts of the healthcare process much more timely and transparent. With the scrutiny that a PIPCO system 100 would provide, a variety of powerful technological tools can be applied to streamline certain elements of the process and cut costs.

The approach of the PIPCO system 100 would fill an important void in the US medical process arena. By its very nature it is a horizontal integration platform that simply does not exist in the medical space today. The PIPCO system's 100 platform would be designed to coordinate all the participants and agents (such as providers) in the medical space adopting and integrating their preferred vertical solutions for specific requirements as needed. Thus, the PIPCO system's 100 platform from the start would be designed to operate with a range of high-quality medical billing solutions, diagnostic software aids and record-keeping databases as needed. As such, it integrates all the partial solutions into a unified system that can satisfy at least some of the basic integration needs of each participant 105/agent 316.

An example below shows how the PIPCO system 100 could transform the US medical process involving a relatively simple doctor-patient visit. First the process flow for such a visit today is explained, and then how things change in a PIPCO system-driven medical world.

The Doctor Visit and Follow Up Today

Consider a patient who visits his doctor for something that is not entirely trivial. As shown in FIG. 16, in such a visit, many, if not all, of the following agents 316 will be involved:

- The patient who is the one that initiates this process through his decision to visit the doctor.
- The primary doctor (PD) who is the first point of contact. This doctor will examine the patient and work towards a diagnosis possibly with further consultations being needed with a specialist.
- The specialist who the patient is referred to by the primary doctor for further evaluation.
- The laboratory which performs the tests and delivers the results to the doctor(s) and/or patients.
- The imaging facility which takes scans or other images of the patient.
- The insurance company which provides medical insurance for the patient.
- The pharmacy that receives the prescription from the doctors and provides the medicines to the patient.
- The hospital or clinic which might provide services such as an operating room, injectable drugs and the like.
- The government depending on the type of service and the type of insurance that the patient has.

FIG. 16 shows the process flow and interaction among the agents 316, which gets extraordinarily complex even with a relatively small number of agents 316 for a relatively normal doctor visit. Being specific, the patient fills out some forms before the doctor sees him listing his allergies, symptoms etc. These forms will be retained by the doctor and may be provided sometimes to specialists. The doctors may order tests typically with a prescription for the same either given to the patient or the in-house lab. The doctors write up a diagnosis that may be provided to the patient as well as prescriptions for a drug store or orders for further treatment at a hospital. Of course, this diagnosis and all the associated test orders will be reviewed by insurance company as well as perhaps by the government. The labs, imaging facilities and hospitals in turn will perform the needed procedures on the patients and provide the latter with summary reports that are often transmitted to the doctor(s) who ordered the tests, though not necessarily to other doctors in the patient's care matrix. And the patient, for better or worse, may have to end up as the process coordinator, especially once the initial treatment is complete and payments need to be made.

Even FIG. 16 is in many ways much simpler than the reality of what happens. With the confidentiality of patient records, each agent 316 (provider) will insist on a bevy of forms and paper work for data release to another agent 316. Each agent 316 moreover, will keep his own private copy of all the patient's records relating to their interaction. When the agents 316 providing the medical services are independent of each other, they often have no format for data transfer at all and will usually resort to printed reports or scanned emails of the same. Often the patient himself acts as the courier. Typically, given the privacy concerns rampant in medical care, there is no central repository of patient records. That also means that there is no way for simple automation in the analysis of test records or comparison of outcomes—we rely substantially on the practitioners' skills and experience.

Trying to improve the above process' efficiency with an independent overseer is very likely doomed to failure even before the latter starts: a new agent 316 is likely to create so many new communications requirements in an already overloaded system that just the costs of these new links should dwarf any efficiency gains he might engender. That said, what is remarkable is that the existing process even works at delivering good outcomes!

The PIPCO System 100 Re-Engineered Doctor Visit

There have been numerous attempts to address the administration nightmare created by the above doctor visit. These measures can be divided into three broad groups:

The closed omnibus solution which involves adopting a custom system that imposes its own order on the above chaos. Many such systems have been tried or at least conceived of, but the overwhelming complexity of the process has made universal adoption virtually impossible. The omnibus system aims to replace all existing systems and as such has to perform in a fast changing technological environment with high reliability—a tall, if not impossible, order for any technology.

The limited audience system. Such systems are being used increasingly within the confines of certain hospitals or medical groups where the providers operate under a single umbrella. In such situations, all the medial records can be centralized as can billing and insurance claims processing. Unfortunately, when a patient goes out of the confines of the hospital system, he is back in the chaotic world earlier described.

The limited function system. Many systems have attacked the challenges in medicine by focusing on just one problem area such as billing. Thus, medical billing systems that can handle billing to insurance companies, Medicare and the patients are widely available. Other systems that provide medical record keeping and secure backups are also omnipresent. While many of these systems do well at their stated function, they are simply not capable of providing a base on which the overall messy process described above can be reworked.

The PIPCO system's 100 approach to re-engineering the medical process above is to create an omnibus platform that can take on the task of process coordination. The platform will impose a framework for sharing data and process knowledge across participants 105 and their associated agents 316 so as to limit redundancy and permit process change over time. The PIPCO system 100 aims to exploit the fact that much of the information and process steps relating to sharing/correcting information are inherently wasteful—once data relating to a patient is gathered correctly by a specific agent in this process, the same data must be made available seamlessly and correctly to all other agents that are permitted to see any or all of that data. Any changes to the core data should be again transmitted as quickly as possible to relevant participants 105/agents 316 without manual intervention. And each participant 105/agent 316 should be permitted to store and view the data he is permissioned for at will in his computer system of choice, back it up as needed and be guaranteed that it is accurate at all times given the limits of the actual process of data gathering.

To be more specific, where it comes to the primary doctor, he typically maintains multiple blocks of information relating to the patient. These information blocks are:

A Identification information along with billing and insurance details.

B Patient history that details allergies, surgeries etc.

C Current symptoms and the details relating to onset of the same.

D The tests ordered/done.

E The lab results.

F The final diagnosis and treatment recommendations.

G The patient instructions for treatment, follow up care, tests etc.

H Prescriptions with drug dosages.

While the doctor collects this information, not every agent 316 in the process is privy to all of it. Thus, the specialist that the doctor may refer the patient to may need to see all of the above. The pharmacy needs to only see block H. The patient needs to see G and possibly F, but is also entitled to see everything else. The insurance company will need to see everything if the patient has authorized that. The lab will need to see A and D, but nothing else. The important point to note here is that the doctor is forced to manage what each agent 316 in this process can see and has to make sure that appropriate safeguards are in place to prevent unauthorized information release or theft of the same. Obviously, each agent 316 in the process collects information about the patient. A lot of this information is common across participants 105, though they inevitably collect the same multiple times.

In the abstract, the medical process involves each agent 316 collecting some basic information about the patient and his problems, performing some functions specific to his role in this issue, and then notifying the other appropriate agents once the assigned tasks have been performed. The PIPCO system's 100 approach to streamlining this medical process would work by limiting information redundancy and enabling easier coordination. Thus, the PIPCO system 100 would create the framework for dealing with information blocks A-H above, along with the necessary security and process rules for sharing the same information. In this world:

The primary doctor would simply collect the information in his usual way, but the system would be engineered to organize this information along the block structure above.

The blocks of information would be shared automatically with other agents 316 in the process—pharmacies, hospitals and the like without doctor intervention. That is, once the doctor asserts that the information is accurate, it will automatically be released to all relevant agents 316 involved in this process. Each agent 316 will see only the block(s) that he is entitled to.

The information release will be timestamped and appropriate reminders sent to other affected agents 316 regarding the availability of new information.

Any updates to the information would be highlighted and depending on the block modified, all the affected 316 agents would be notified. Agents 316 who do not need to see the modified block will not be notified.

Of course, the same methodology would apply not just to the doctor but to all other agents 316 in the process.

The PIPCO system 100 may not store any of the actual information that it disseminates—the only thing it has to store is the framework for process interaction and the rules that apply. So, the doctor's information could well remain on his own custom internal system—the PIPCO system 100 simply hooks into his technology to make it available to other agents 316 in a format that is conducive to their use.

Viewed in the context of other approaches to solve the problems of medical processing, the PIPCO system's 100 approach is to create omnibus platform that is designed to plug in a variety of participants 105 specific to the medical domain. The platform serves as a process coordinator, transmitter, translator, and transaction record-keeper. It may also be a data repository because its participants 105 need that too for speed and/or convenience, but it need not. FIG. 17 is a schematic of the PIPCO system 100 re-engineered doctor visit. Even if the PIPCO system 100 functions were provided to the various agents 316 in the process at variable cost plus a decent margin for the company, the efficiencies gleaned by operating with the PIPCO system 100 cannot be understated. The PIPCO system 100 would do all of the following:

- Limit data redundancy across agents. A single identification record obtained by any one agent 316 in the process can be shared across all agents 316.
- Eliminate point-to-point communication, replacing it with agent 316 to PIPCO system 100 interaction. All data would be verified once by the associated agent 316, and the PIPCO system 100 would guarantee that the correct data would be transmitted with a high degree of certainty.
- Provide a central framework to study the process dynamics and assess bottlenecks, and provide coordination help as needed. Thus drug approvals, for example, that are not provided in a timely manner can be quickly escalated and resolved by the patient providers without the sick patient even being aware of what was happening.
- Permit process migration over time with total flexibility. A doctor might decide that the PIPCO system's 100 platform can store the data it transmits on his behalf and ultimately make it his backup solution. Interestingly, such a backup might be stored in the doctor's own premises and system but in a more efficient and usable PIPCO system's 100 format.
- Allow over time for significant process reengineering. If a specialist wants to have an internist serve as his first point of contact, he might be able to perform his diagnosis purely on the basis of pictures and videos obtained from the initial patient visit and shared with him in real-time through PIPCO system's 100 platform. This is taken up below in more detail. But the point to note is not that the PIPCO system 100 is the right way or the only way to do this, but that it is a framework that will seamlessly allow such migration if needed.

A Radical New Healthcare Model with the PIPCO System

The PIPCO system's 100 platform will allow elements of the medical process to be re-engineered incrementally as discussed above but it can support dramatic change as well, especially when such change is sought by one or more participants 105.

In medicine as practiced today, the doctor is akin to a fine craftsperson. His bedside manner, the confidence he induces in the patient and his reputation are all elements of the mystique that show up in terms of the high prices charged. The ancillary medical facilities that have arisen across most of the US are there to support this team of highly skilled doctors. Payments, for the most part, are made by the insurance companies based on the procedures performed on the patient rather than the outcomes engendered. The few exceptions to this are facilities such as the Mayo Clinic which attempt to bill based on the totality of care rather than specific procedures.

Unfortunately, the craftsperson approach to medicine is inherently expensive. Numerous manufacturing industries such as those for automobiles, furniture, clothing and electronics have successfully moved to a production line approach. This has resulted for the most part in both a reduction in costs and an improvement in quality. The prospect of a production-line approach to dispensing medical care is something that has been well appreciated for many decades. In fact, New York's Sloan-Kettering Institute for Cancer Research was created in 1945 with a grant from the Alfred Sloan Foundation. The eponymous Charles Kettering was a General Motors Vice President and director of research and his role in the organization was to organize cancer research and treatment using the production line techniques used at his former employer. Numerous studies since have showed that production line techniques in medicine do work at generating better health outcomes. An influential medical book, *the Checklist Manifesto* (*Atul Gawande*, 2011, *Publisher:Picador*), showed how even the simple act of adopting a checklist before surgery avoided unnecessary mistakes and improved results.

Moving from a craftsperson to a production line model is something that we believe will ultimately become inevitable in medicine. With the data that is gathered in a production line setup, smart computer-assisted artificial-intelligence aides for diagnosis are likely to become more easily applicable. When married with a detailed history of prior cases and outcomes, these AI helpers will simply become even more powerful, allowing the doctors to focus their energies on the truly complex cases that actually need their attention. In fact, one can easily envision a situation where test results, lab reports and the like are analyzed independently by a computer system even before the doctor gets involved in making his ultimate diagnosis.

The PIPCO system 100 is not attempting to determine exactly how the healthcare model of the future will work. But given its decentralized nature and its ability to build a knowledge base from its participants 105 it will be ready for the future no matter how it may evolve.

Consider for example a production line approach to medicine, especially for patients located in remote areas with few specialists. One can easily conceive of a framework where:

- A nurse or junior internist sees a patient and takes a series of photos and/or videos appropriate to his symptoms.
- A senior team of doctors, likely in different locations, with some computer assisted diagnostic tools request certain tests or more videos.
- The diagnosis is made by the geographically dispersed senior team after they collectively study the tests and images.
- The appropriate treatment is prescribed with the actual delivery of the instructions being done by the nurse/internist.

The PIPCO system 100 can seamlessly support this new model of medicine. The attending nurse/resident would post the most current patient identification and insurance data, along with all the diagnostic information and images to the PIPCO system 100. This information would be immediately available to the specialists and other need-to-know agents 316. The most appropriate diagnostic, Artificial Intelligence tools would operate on this data thanks to the PIPCO system's 100 integration of the same. The senior team's recommendations, based in part on the computer aide, would be captured with the instructions being correctly transmitted to all parties in the process. And everything would be fully documented so that there is no ambiguity whatsoever. If the patient calls in with a problem following the initial diagnosis, he would call into the PIPCO system 100 and the appropriate parties/agents 316 would be simultaneously informed. And importantly, the outcomes of this could be studied ex post. A host of computer tools could be employed easily to study the patient's progress over time and to check whether any provider erred in the provision of his care. Put differently, with the data that the PIPCO system 100 collects one can accurately determine the process errors created in the practice of medicine and put in place the appropriate safeguards to limit them.

When each agent 316 in the medical process completes his assigned task(s), the PIPCO system 100 can log such completion, match the service provided against the patient's insurance benefits and allow the insurance company to make payment. To permit all this easily and securely, the PIPCO system 100 could incorporate Blockchain or an equivalent payments technology into its platform as needed.

Even better, the PIPCO system 100 will also make available its platform to external service providers through its Application Programming Interfaces (APIs). Using these, we could potentially have a viable ecosystem of external providers who allow even greater efficiencies in care delivery. Thus, a manufacturer of a blood pressure monitoring device that permits a patient to check and log his pressure on his phone can use the PIPCO system's 100 API to post the same on an ongoing basis to the patient's care record in the platform. All that the device manufacturer has to do then is integrate to the platform—the data once in the PIPCO system 100 will be immediately available to all the care providers as needed. The PIPCO system 100 in turn, using the participant 105 APIs can seamlessly update the appropriate patient records for the providers/agents 316 if needed, along with the caveats as to the accuracy of these results based on the fact that they were obtained from a less-accurate home device operated by the patient. Even better, the PIPCO system 100 can run its own Artificial Intelligence (AI) tools to determine if the patient-posted data are sufficiently serious (when adjusted for standard measurement errors) to warrant immediate attention from providers agents 316.

Healthcare companies today deploy a complicated mix of technologies, systems, applications, and processes to serve patients and physicians and to deal with organizational idiosyncrasies. This mix involves both state-of-the-art technologies as well as prehistoric, legacy systems. As an integration platform, the PIPCO system 100 has to set itself up to work with a given participant 105 just once. When the PIPCO system 100 has finished its integration, the benefits of the same will be available to all agents 316 on the PIPCO system's 100 network. As such, the PIPCO system 100 eliminates multiple integration steps between each set of parties dramatically lowering costs for everyone. Thus, the PIPCO system 100 can take away much of the integration headaches and costs from providers/participants 105 and allow them to focus their energies on the quality of healthcare delivered.

Based on the above, it is clear that the PIPCO system has the potential to radically transform the healthcare process, and do so while remaining agnostic about what the future will bring. New process techniques, whatever they might be, can easily be mapped into the PIPCO system's 100 platform. And new technologies, be they Blockchain, Artificial Intelligence or something else entirely can be seamlessly integrated into the PIPCO system 100. The PIPCO system 100 truly is a platform for the future.

Example of the PIPCO System for the Global Trade

There has been an explosion in global trade over the last several decades with many countries in the developing world becoming preferred destinations for the outsourcing of goods and services. Thus, China has emerged since the early 1990s as the world's manufacturing powerhouse, while India has become an important business process outsourcing hub, both countries catering to the wealthier consumers of the developed world. While such global decentralization of production and services has only gained momentum over the years, the fact remains that this is a process that is extremely complex requiring a multitude of intermediaries for facilitation.

The Challenges in International Sourcing

A simple foreign transaction that involves the ongoing purchase of standard products from an overseas producer by a domestic entity involves some or all of the following facilitators:

Global transportation firms that will transport the produced goods across country borders.

Global insurers and reinsurers to insure the goods against loss, though generally not against missed delivery schedules.

Customs brokers to navigate the arcane export and import regulations and tariffs that govern the transaction.

Banks or other financial firms who will handle the cross border payments and any working capital, financial and exchange rate transactions.

Lawyers to agree on the contract terms and particularly the mechanisms and venues to resolve disputes.

Accountants to track all the transactions and associated payments and determine the appropriate cross-border and other taxes.

When the transaction in question becomes larger, the number of intermediaries and the complexity of their tasks increase. Thus, the ongoing purchase of large order from a foreign producer might require the purchaser monitor the actual production and certify as to its quality, as well as to the producer's meeting a variety of changing international regulations. With a globally decentralized supply chain, the purchaser may also have to take steps to ensure that his order will be delivered in a timely fashion, and if necessary intervene to help the producer. And dealing with local problems (such as bad weather, a factory strike etc.) could necessitate sourcing from a different location altogether.

Current Technology Applied to Trade

Numerous technologies have attempted to address many of the problems posed by global trade. At one extreme, various global supply chain software technologies allow for the integration of a vast global supply chain into a single platform that everyone can sign onto to manage most of their ongoing transactional needs. Yet other platforms have evolved to support specific parts of the trading process. Thus, there are systems that will deal purely with customs processing, others that will handle just global payments and associated currency trades, and yet more to handle transportation, insurance and the like. While a given firm can very likely find an optimal combination of technologies that might serve its needs for global trade, it cannot have them work seamlessly without undertaking a significant software integration effort.

The state of the art thus, where it comes to global trading is that the largest firms have moved to high volume, do-everything supply chain platforms. These expensive technologies require huge integration efforts not just at the level of the business but also all of its major suppliers. Medium to large firms that deal with a variety of differentiated products often have to struggle with a complex hodge podge of ever changing systems and processes. And the smaller firms, and often even the largest firms have to resort to an intermediary to provide them the needed services. All this said, sourcing overseas from a new foreign supplier is daunting for most firms especially at the start. Even companies that operate with the very best technology and/or intermediaries for trade management still have to turn to new providers or one-off approaches to deal with specific issues. The knowledge needed for such ad-hoc adjustments to the standard process resides within capable individuals in the firms, and is rarely institutionalized. As such, transfers or terminations of key personnel often result in the loss of vital process information especially in dealing with unique bottlenecks that technology cannot anticipate.

How the PIPCO System 100 can Make a Difference

The PIPCO system 100 when applied to the processes involved in global trading can serve three important functions:

Facilitation. The PIPCO system can be used to implement certain necessary steps involved in global trade processing in a transparent and flexible fashion permitting significant efficiency gains.

Institutionalization. By forcing trade transactions to be viewed in a consistent fashion, the PIPCO system could permit the institutionalization of key process steps so that personnel changes within an agent firm will not require a relearning.

Transformation. Over time, the PIPCO system could potentially change the process of trade, and dramatically in some cases. There is a built-in bias to efficiency that the PIPCO system would bring simply by forcing total transparency.

Put differently, the PIPCO system 100 is a great FIT for global trade.

Trade Finance the Conventional Way

A simple example will illustrate the benefits that a PIPCO system would bring to the trading process. FIG. 18 is a schematic of the prior art process flow in one banking transaction.

Consider a large US retailer like Target that wants to place an order for garments manufactured in Vietnam by a small, high-quality producer who we shall call VietPro. Target might have been persuaded to place a small initial order of say 10,000 garments impressed by VietPro's management and product when the latter made one of their infrequent trips to the US. Target finds that its initial batch of VietPro garments has left its customers clamoring for more and would like to award VietPro an order to produce 250,000 pieces for the next selling season.

Now VietPro, a small maker, has to source raw materials and labor for its larger order and might need a bank loan for the added working capital requirement. The purchase order from Target should make its local bank comfortable with quickly advancing such a loan at attractive rates. Yet, that is not what will typically occur for the following reasons:

The local Vietnamese bank has no idea of who or what Target is. Even if it is able to find out, it cannot verify the legitimacy of the order. It has to contact a correspondent bank in the US to act as its agent for all this.

Target will be unwilling to disclose all the details of its purchase order for competitive and privacy reasons. A correspondent bank acting for the Vietnamese bank will have to navigate Target's bureaucracy and obtain a statement as to the legitimacy of the purchase order. It will also likely have to use a business credit firm like Dun & Bradstreet to opine on Target's creditworthiness.

When the loan is advanced finally, the bank will charge possibly much higher Vietnamese interest rates on this loan even though this loan could have been obtained at much lower rates in US dollars. Also, VietPro now has a US dollar purchase order and it might be much less risky to have a loan denominated in US dollars. Trying to hedge their US dollar exposure with a Vietnamese dong loan is something VietPro simply does not have the expertise to do.

No US bank will get involved in this loan though they all know Target, because they have no idea as to how VietPro will perform.

Trade Finance with the PIPCO System 100

The PIPCO system 100 can facilitate the above process as well as transform it to make it much simpler as illustrated in FIG. 19. Specifically:

Target will post its purchase order on the PIPCO system. Since the PIPCO system understands that this is a purchase order (based on information in the knowledge database for the process) it knows already that only authorized personnel in Target can post such an order. As such, if such an order is on the PIPCO system, it has to be authentic.

A credit agency like Dun and Bradstreet can be automatically linked into the PIPCO system's platform. So, even before the Vietnamese bank requests it, all the information regarding Target's bonafides will be available to the bank.

VietPro simply needs to point its local bank to the PIPCO system for this transaction and all the data needed for loan approval will be immediately available.

Clearly the PIPCO system does provide some significant benefits in the above context. In fact, if documents need to be translated or formats need to be changed for documents and images across different countries, the PIPCO system can seamlessly handle all that given its knowledge of the domain. A participant in the original process like the correspondent bank above can also be rendered superfluous.

Other Trade Processes with the PIPCO System 100

The PIPCO system 100 can work to completely transform the trade process over time. Target's first few orders with VietPro were successful and the firm decides to make the latter a significant supplier, and wants to place an order next for 2,000,000 (two million) garments. Now Target has to subject VietPro to much closer scrutiny given its importance. It needs to ensure that VietPro can scale up its business, meet its delivery deadlines and that its management can be trusted with large initial and progress payments. Target may have to send inspectors to VietPro's factories to monitor their condition, ensure that safety and other standards regarding child labor are met etc. It may also have to do a periodic financial audit of VietPro if the latter does not have published financial statements.

Thus, Target has numerous hurdles in its path to make VietPro a major supplier. A relatively unknown supplier in a faraway domain with different operating customs and language means that Target has to make a true commitment to source from Vietnam in a more significant way. It has to devote personnel who can travel to Vietnam periodically, pay its employees or third party monitors to perform the diligence on VietPro and needs to continue doing that over time. Such monitoring may be done by ad-hoc Target teams or external intermediaries set up by or known to key supervisory Target personnel. The process of monitoring here, even for the largest firms, is only partially structured. A departure of key Target personnel will not mean a loss of data from prior monitoring exercises. Rather it will mean a loss of knowledge for Target because many of the ad-hoc decisions made in monitoring are simply not adequately documented or sequenced, so getting a full picture of the process is virtually impossible. There is no doubt that there is considerable cost for Target to increase its exposure to Vietnam. Unfortunately, VietPro will end up paying for much of this because Target will simply demand lower prices.

The PIPCO system 100 can dramatically alter the way in which such transactions are performed. It is important to note here that Target may have few suppliers in Vietnam and as such may have little need to develop an extensive process for dealing in the country. The PIPCO system on the other hand will expect to sign up numerous Vietnamese suppliers and Target equivalents the world over and has a vested interest in making the process dynamics easier and cheaper. Specifically, as illustrated in FIG. 20, the PIPCO system can perform all of the following functions:

Sequence all the transactions that a Target might do with VietPro, including documenting all the auditors/monitors hired, as well as providing translated and verified copies of all their reports. This will provide a full view of the process that was not previously available.

Open up the process to external firms which are in the business of monitoring firms like VietPro. Target can simply choose from this group of oversight firms to find a desirable auditor for VietPro instead of reinventing this wheel.

Obtain feedback as to the success of the monitoring firms and their pricing from Target and others once the work has been performed. These reviews will form the basis for objective ratings of the service providers from actual, verified users.

Introduce a credible guarantor that will actually guarantee VietPro's timely performance and observance of work standards, taking on the responsibility of monitoring as needed. Such a guarantee would obviate the need for Target to do any monitoring at all. If this were done by an inter-governmental agency, it might help in making Vietnam a much easier sourcing venue and could work to boost the nation's trade.

Work with Vietnam's central bank to aggregate purchase orders for Vietnamese firms across currencies and effect asset-backed loans to these firms in the currencies of purchase order denomination. This would be especially beneficial to high-interest rate countries which want to borrow at the low rates available to their developed brethren, for what are low-risk transactions.

Example of the PIPCO System 100 for Insurance Claims Settlement

The Property and Casualty (P&C) Insurance industry is especially well suited to the application of the PIPCO system. The processes for global claims settlement are among the most complex and costly in the insurance industry. Global insurers spend over $20 billion a year purely in the administration of P&C claims in addition to payouts they actually make on the losses in question. And this is despite the fact that most companies in the industry have actually moved to cut costs and use technology heavily within their claims handling processes.

Much of the P&C claims-handling process involves interaction between the insurance company and external agents such as other insurance companies, reinsurers, claims adjusters, agents and attorneys. While companies may have improved their internal processes, they have had little control over their interactions with these external agents many of whom may be in entirely different domiciles or jurisdictions. Also, claims processes and legacy systems vary materially from firm to firm and country to country, with no single forum or system for rapid filing and exchange of all elements of claims information among the various groups involved in the process.

The PIPCO system is particularly well suited for application to the global Property and Casualty insurance industry. The platform can dramatically simplify the external interactions involved in claims settlement bringing about a significant reduction in costs.

The Participants 105 in an Insurance Claim

An insurance claim involves two or more firms; it may be adversarial in nature; it may cross geographic boundaries; it may require specialized engineering and accounting tools and processes; one or more parties may litigate the claim; and, it may take several months or years to resolve. There is a tremendous amount of information that must be gathered and compiled. There is no central, accessible office to act as a focal point for all or, for that matter, any of the parties involved in the process. Information sharing and communications occur via fax, e-mail, courier, standard mail, telephone, and face-to-face conference. The potential participants are listed below:

Corporate Policyholders generally initiate the claims process, determine their insurance needs and levels, self insure within limit and manage their internal claims process.

Brokers often handle the claims process on behalf of customers, consult with individuals and corporations on insurance needs, secure insurance covers.

Underwriters utilize claims experience to underwrite and price products.

Reinsurers provide added financial protection via reinsurance on a case-by-case or carrier-by-carrier basis.

Adjusters collect claims information, order tests, research claims.

Accountants determine costs associated with losses.

Engineers determine circumstances and details of loss.

Claims Managers coordinate the claims process, collect and compile information, direct inside and outside counsel, approve experts and consultants, establish protocols and procedures.

Attorneys get involved as needed.

The Current Claims Process

Considering a typical global shipping insurance claim as shown in FIG. 21 will illustrate the complexities in the process. The example is actually rather simple in the world of marine claims, but quickly illustrates the complexities faced in settling such a claim.

A London-based marine insurer receives a phone call informing it of a collision that one of its insured ships has had with a pier in Manila. The insurer engages a local independent claims adjuster to make an initial assessment and advises its Hong Kong office to supervise the proceedings. The pier owner alerts his insurer of the damage and contends the ship captain was at fault. His insurer, a US domiciled company, engages its own local independent adjuster to make an assessment. Each insurer alerts its respective law firm of a possible action and each law firm then engages a corresponding law firm in Manila. The damages are extensive causing each insurer to hire a local engineering firm to make a study of damages. Each insured also seeks business interruption costs from their insurers, prompting the need for accountants to set initial loss reserves. Damages are such that they not only penetrate the retention levels of the London insurer but also penetrate the higher levels of reinsurance, prompting the need to inform their reinsurance broker and through them, their reinsurance carrier(s).

All of the information in the situation above is exchanged via telephone, fax, cable, e-mail, standard mail, international couriers, and face-to-face meetings. Very quickly there are many individuals involved, with the claims manager at each insurer trying to organize and keep track of the information flow from his team. Access to real-time data or to a comprehensive, up-to-date body of information related to the claim is nearly impossible.

The existing systems for global claims do not have any mechanism for coordination of all the agents involved in it. While the interactions themselves may have been streamlined via email or other standardized electronic methods, the process itself involves multiple interactions across agents without any centralized information or control regarding the progress of the claim. As such, the total cost of interactions between the participants is substantial even if each interaction currently is of low cost. And the costs are far greater than just the communications costs. Internal processes within each insurance company have to be tailored towards supporting the various agents who need to be informed about the status of a claim, and this leads to tremendous inefficiencies because of the numerous redundancies created.

Not surprisingly, in this example, the entire claim will take months to resolve. In fact, even the simple exchange of data might take weeks if not months.

Claims System with the PIPCO System 100

The PIPCO system 100 is especially well suited to the management of global insurance claims. The PIPCO system 100 can provide a simple framework within which all claim participants can work so that they can effectively coordinate their activities. This system, by its design will eliminate both process and data redundancy and dramatically speed up the entire process for claims settlement while reducing costs.

The PIPCO system's approach would be to establish a web-based, global internet service bureau that would be dedicated to insurance claims information, processing, and management. Within a server facility a Virtual Claims Office (VCO) would be dedicated to each individual insurance claim. The VCO would be in effect for the life of the claim with ease of access from any global location using Internet-based browser technology. The Virtual Claims Office (VCO) will be a combination of:

- A Virtual Claims Representative (VCR) corresponding to each participant 105 in the claim whose behavior will be specified completely by the real participant. The VCR will determine how information arriving at the VCO will be processed.
- A Virtual Filing Cabinet (VFC) that will permit each participant 105 in the claim to post information relevant to that claim to a centralized location. Access by other agents 316 to the information posted by the agents 316 of participant 105 to the VFC will be controlled by the VCR he has set up.

While the VFC and the VCR are terms that make the insurance process easier to understand, these concepts map easily into the functions of the PIPCO system 100. The VFC is part of the PIPCO specification repository 300 and the VCR is a combination of the specification repository 300, process knowledge engine 400 and the execution engine 500.

The web-based VCO would be analogous to a real claims office that is staffed 24 hours a day by representatives from each participant 105 in the claim. Each representative (an agent 316 in the PIPCO system 100) has full access to all the information available to his corresponding employer/participant 105 which is placed in a secure filing cabinet to which he has the keys. Based on rules established by his employer (PIPCO participant 105), he will share appropriate subsets of the information in his files with the others in the claims office (agents 316). When a representative receives information from another in the office, he may be instructed to contact his employer immediately, or alternatively can be empowered to act in a limited fashion on behalf of his employer, perhaps by contacting yet another representative in the office to initiate other transactions.

By its basic design, The Global Insurance Virtual Claims Office will provide an up-to-date, centralized, interactive information repository, under the control of the claims manager (who would be a specified agent 316 in the PIPCO system 100), and immediately accessible by all authorized parties/agents 316 on demand. In the example above, each agent 316, each day submits reports, data, or other information directly to the claims node resident on the server. Each submission has embedded protocols for administration and access designed by PIPCO for the specific insurer participant 105 when the VCO was established. Thus, the claims manager and other authorized agents 316 have instant 24 by 7 access to all information they are permitted to use. And, the information has been translated where required so it can be viewed on the user's system with no expensive software purchases or enhancements.

The Virtual Claims Office is not just an exchange or an online document sharing system. It really is a virtual office in that the participant's 105 VCR can fully implement the participant's rules for claims management. As such, this VCO does not attempt to usurp the role of legacy systems or attempt to alter the structure of the claims process within any particular participant's (105) domain. That is, any involved party can map his process for external interactions into the VCO without necessarily altering his internal processes.

For a given participant 105 in the claim, the PIPCO system 100 replaces the numerous, expensive interactions with multiple other agents 316 to a single set of transactions with the PIPCO system itself. In fact, using the web even this single transaction will likely be of lower cost than today's often document-driven physical interaction. FIG. 22 shows how the PIPCO re-engineered claims process would work.

The PIPCO system 100 replaces multiple agent 316 transactions with a single VCO transaction for each. It eliminates redundancy. And it provides centralized process coordination and feedback to all participants 105 and agents 316, something that does not exist at all today. Not surprisingly, the PIPCO system 100 represents a genuine cost and time savings methodology for claims settlement. It has the potential to shrink claims settlement timeframes from months to weeks or days.

Example of the PIPCO System 100 as a Foundation for Other Technologies

There have been numerous technology concepts that have garnered significant attention over the last few years. A non-exhaustive list of these technologies would include:

- Blockchain, a distributed ledger idea made popular by the proliferation of the cryptocurrency Bitcoin.
- Artificial Intelligence which involves making computers into intelligent robotic aides for a variety of activities including answering phones, taking payment, delivering simple information etc.

Big Data Analysis which refers to a host of approaches to store and mine large volumes of data in today's digital world for specific patterns so as to forecast behavior, sales etc.

Application Programming Interfaces (APIs) for opening up technologies to outside applications and developers.

The relationships of the PIPCO system 100 to these ideas are discussed below, noting that of the above, only Blockchain is perhaps genuinely new and different. In the discussion below, the PIPCO system reference of 100 will be omitted for convenience.

Blockchain Under the PIPCO System

A Blockchain is a distributed ledger of data where numerous agents hold copies of the ledger so that there is no single point of failure. Participants can add transactions to this ledger based on strict rules that define the transaction. After a certain number of potential transactions are accumulated into a so-called block, they are submitted for approval to the collective network of agents. This block (and the transactions within it) cannot be consummated until other participants agree, after verifying the transactions against their copies of the ledger, that these are in fact legal and permissible given the rules of the network. Once such agreement occurs, each agent in the network updates his copy of the ledger in a fashion that makes changing the agreed-upon entry virtually impossible. At any given point in time, each agent holds the entire history of agreed-on transactions that occurred in the system. Thus, we end up having a robust and distributed transaction history, which cannot be changed without the cooperation of the network at large, and from this any participant can determine the state of the ledger today or at any point in the past. The methods used in Blockchain for agreement on transactions and ensuring that an agreed upon block becomes immutable are novel even as they are complex. For starters, the Blockchain must permission both the participants who can transact in the network as well as the transactions they can execute. Next, when a block needs to be verified, a large enough group of agents has to execute a verification process. This process is extremely complex requiring both a need to check the transactions in question as well as solve a very difficult pre-determined mathematical puzzle with ever-changing inputs that will occupy even a powerful computer for a matter of days. When any one participant in the Blockchain network solves the puzzle and verifies the block it is operating on, it announces the fact to the network. At that point, the correctness of its results is checked by the others in the network after which the block can be accepted. It is possible that multiple agents might verify two different sets of transactions at about the same time, and complex rules dictate then which group of transactions is to be rejected and how the chain should be stabilized preventing forks.

The beauty of the mathematical puzzle is that even if it takes a long time for a single computer to solve, when posed to a large enough network of computers, one of them will stumble upon the right answer simply by chance in a matter of minutes. As such, it is highly unlikely that the same computer can solve this puzzle correctly for several consecutive blocks that need to be verified—to do so, this computer will have to pit itself against the power of the entire network of agent computers.

Once the mathematical puzzle is solved, the other computers all verify the result and once that it done, the block is committed to the ledger. Importantly, the new block receives some identifying information that links it to the last accepted block's identifiers as well as to the data within the block itself. To verify that a block has not been changed thus, participants need to apply a mathematical calculation with inputs being the previous block's identifier and the current block's contents. If these results match the identifying information on the block it has to be legal. If even a single element in the new block is changed, the results of the calculation will change dramatically.

The nature of the encoding process in Blockchain and the distributed nature of the data means that transactions in the chain cannot be undone. The only way to undo a transaction would be by getting most of the nodes in the network to collude in the process—something that would generally be impossible. Again, if a single corrupt agent tries to post a block of valid transactions followed by a block of still correct transactions that would be invalidated assuming that the first group were accepted (like a double payment with insufficient funds for that from an account say) one could in theory attempt to cheat on the network rules. However, the only way for the agent to validate both these transactions himself would be for his own computers to crack the associated mathematical puzzles on both these consecutive transaction sets. However, this is statistically very hard to achieve because of the complexity of the mathematical puzzle that needs to be solved for verification.

Also, the Blockchain network is immune from the standard hacker attacks that central databases may be subjected to because there is no single point of failure. The only way to really compromise a Blockchain network is by some agent or agents controlling over 50% of the computational nodes in the network. Thus the Blockchain network works correctly by design because of the need for consensus and the mathematical techniques needed for verification. An individual participant may not be trustworthy but the rules of the network will nevertheless allow us to trust the data in the blockchain.

To perform the complex verification calculations for acceptance of a block requires considerable computing power in the network at large, with no single computer or group being more powerful than the rest of the network power combined. Numerous computers therefore have to be incentivized to be Blockchain computing "nodes" to perform these computations. The compensation payable to these nodes for their services is effectively the service charge for using the Blockchain network. The Bitcoin cryptocurrency network is the first example of Blockchain in action. By its rules, any participant can transfer Bitcoin securely and anonymously to any other participant. Complex cryptographic methods are used to securely identify both sender and receiver. Bitcoin nodes that verify the calculations (the so-called "miners") are compensated for their services by payments of small amounts of Bitcoin.

Blockchain as a technology brings some significant advantages, not least of which is total anonymity if desired and yet complete security of transactions. That said, Blockchain also makes it impossible to go back and reverse past errors, at least not without a huge degree of complexity assuming that is even permitted. Again, Blockchain lacks a central authority for maintaining the ledger. An industry group may be formed for that purpose, but the intent of such a group by design has to be to deal with issues regarding the rules of the network itself rather than to handle specific disputes or transactions. Thus, not all processes are suitable for Blockchain techniques, even if they may seem that way at face value. Even to the extent that some elements are suitable, migrating them to using this technology in the context of a larger process is anything but simple. The PIPCO system by design is a distributed process hub that involves data, knowledge and execution rules. It is an enabling system that permits the integration of numerous different technologies for addressing specific coordination issues within a particular business domain. As such, the PIPCO system can readily incorporate Blockchain techniques as needed into its structure. In fact, over time, the PIPCO system with its accumulated process intelligence would be able to assess which parts of its process flow are best suited to Blockchain like techniques and which might be better served with more traditional approaches. Thus, the PIPCO system can store some or all of its transaction data, depending on the type of agent, with Blockchain-style encryption across its entire network, or a subset, of participants. It can seamlessly incorporate both a distributed ledger as well as centralized database into its framework depending on what is required for each step of the process. More simply put, PIPCO system's platform is a vast superset of Blockchain.

Viewed in the light of how a new technology like Blockchain can be incorporated into a business process through the PIPCO system, it should be clear that that the PIPCO system is much more than a specific technology—it is a technology framework that tries to use the best specific technologies to solve specific domain problems.

Artificial Intelligence with the PIPCO System

As a concept, Artificial Intelligence (AI) is hardly new. One of the earliest goals of researchers in Computer Science was to build a computer system that could mimic some elements of human behavior to the point where it could at least perform like a primitive animal. Of late however, AI has caught the public's fancy thanks to voice activated phone helpers such as Apple's Siri or Google's OK Google, the prospect of self-driving AI-assisted cars, and home helpers such as the Amazon Echo.

Most computer scientists would agree that AI techniques work best when the domain of focus is limited. We may never get to a situation where we have a Star-Trek-like computer that understands all the nuances of spoken language. However, we already have computers that can assist in specific tasks like making telephone payments, providing information and the like. The more limited the domain and the better the quality of information, the better the prospects for AI.

The PIPCO system is in the business of gathering process data, and especially data that is not organized in any form at all. With the data, the PIPCO system intends to assist agents in its platform rethink and re-engineer their process activities in a way that permits the greatest efficiency. By its very design thus, the PIPCO system is an intelligent platform that learns from its own participants and makes its lessons available to all the others on the platform to their benefit.

To the extent that the PIPCO system gathers and analyzes process data, it is already an example of AI in action. Again, by using its data and focusing on the most expensive parts of a business process first, the PIPCO system would allow the incremental application of AI using a simple cost-benefit calculation. Finally, the PIPCO system can incorporate wholly new AI elements into its platform by simply tying together information from multiple agents and assisting in an arena where there is absolutely no help available, centralized or otherwise. For all these reasons, we believe that the PIPCO system could well be the ultimate example of Artificial Intelligence done right in the business process context.

Big Data Analysis with the PIPCO System

As a process structure repository, the PIPCO system stores process knowledge and either stores the data itself or has the rules to access the same. Of course, depending on the domain, much of the data in question may be encrypted and as such incomprehensible, even if accessible, to the PIPCO system. However, the very fact that the PIPCO system is a channel for data transmission means that it can readily make available data analysis tools while providing the database structures needed for the same.

In its most paranoid form, the PIPCO system could simply serve to channel encrypted data from a participating agent to a data analytic package or service, thus bringing these parties together on the platform. More typically, if PIPCO had some access to the data elements it might be able to actually analyze the data itself using a range of tools while still honoring the privacy and other rules required for the same. Put differently, since the PIPCO system knows the rules under which it has access to the data and implements them, it can work under those same constraints to provide the best analytic tools suitable for the agent. As such, the PIPCO system will make the whole idea of data mining much easier by permitting agents to migrate just what is needed for the analysis to the platform as needed.

Application Programming Interface (API) Standardization with the PIPCO System

The concept of the API is not new. In fact, most software systems provide some kind of API for customization. However, in the last several years, numerous companies have struggled to set up a useful web presence. Most have websites, but not everyone is web-enabled in the sense of providing for substantial functionality online. A few companies have completely embraced the new technologies by opening up their internal systems to outside developers via APIs. Many have actually been technology companies themselves and their interest in providing APIs was to build a large ecosystem with external developers around their products and services.

There are many examples of ecosystems that have been built up successfully around APIs. Salesforce.com created APIs from the first day of its launch to support using its platform in novel ways. Ebay launched its API in 2000 to permit participants in its network to integrate its auction platform more completely into their business processes. Google Maps has an API that permits external websites to integrate mapping functions seamlessly into their setups. Other examples include Twitter, Facebook, Instagram and the like, all of which provide APIs that have led to a thriving external user community that has adapted the functions provided by these firms to their own use in novel ways.

As an integration platform, the PIPCO system benefits from APIs in two ways. First, the PIPCO system can integrate participants much more easily into its platform when they already provide APIs for the same. In fact, absent such APIs, the PIPCO system will have to develop them for the larger systems/participants to actually permit their integration. Next, the PIPCO system provides its own API to allow new participants to integrate into the platform. That is, an external developer that might have previously had to learn the APIs of multiple firms to provide its service, can rely on PIPCO to provide a single API to interface to numerous agents in a given domain.

The important thing to note in this context is that the PIPCO system is designed to respect a participant's (105) security requirements because it is intended at its core to allow for external integration. As such, by providing its own API to external service providers/participants, while using the participant's API for connecting to the participant-side technologies, the PIPCO system can relieve all the participants of the numerous headaches that come from access to internal systems by a multitude of external developers/participants. The PIPCO system can easily serve as a single conduit between the participant and external developers/participants and can do so merely by controlling the functionality that is exposed.

Implementing the PIPCO System 100

Implementing the PIPCO system 100 in an industry/domain requires developing the technology, signing up participants and refining and customizing the system to suit the participants.

Taking the PIPCO system 100 from concept to reality will involve the following steps:

- Building the core technology infrastructure for the platform with a base set of primitive functions that will be of value across most domains. This structure will have the mechanisms for storing and retrieving process knowledge, including data and setup.
- Marketing the PIPCO system 100 into a specific domain with appropriate customization. This involves market research, sales, process consulting and systems integration efforts. The goal is to sign up a critical mass of initial participants to the still-basic but highly customizable PIPCO system 100.
- Refining and building out the PIPCO system 100 with more functionality for existing participants 105 while signing on new participants 105.

It is important to note that the PIPCO system 100 is by design low cost and incremental in rollout. It is not a short-term solution but a longer-term process infrastructure investment. Each step above is further described below.

Building the Core Infrastructure

The PIPCO system for a domain involves a specification repository 300, a process knowledge engine 400, a domain programming/process specification language 200 and an execution engine 500 as discussed earlier. These core infrastructures permit rapid instantiation for a given domain. Specifically, the core technology involves:

- Data storage design of the specification repository 300. Every type of data that might be stored or remotely accessed, be they text data, image data, photographs, audio/video files and the like need to be specified. Next, the mechanisms for storage and rapid access of the data need to be established, be they relational, object-oriented, noSQL (graph or distributed list) and so on. A security model for the data that maps seamlessly into the process knowledge engine 400 is needed. It is important to note also that data are only a part of what the PIPCO system 100 deems to be resources 306. From the PIPCO system 100 perspective, resources 306 include both data as well as atomic functions, actions etc. that can be performed by the system 100 or its participants 105 and agents 316.
- Process knowledge engine 400 design. A model needs to be designed for process specification for each agent 316 including his rights to view/edit data, to see other agents' 316 process steps and data and overall process history. A framework for visualizing and if needed sequencing the various process steps 319 along possibly several independent yet cooperative threads also needs to be designed.
- The execution engine 500 that implements the core process 319 rules in the context of the data design.

The important thing to note is that power of the PIPCO system 100 comes largely from its ability to abstract away from current process methods and focus instead on an ideal that all participants 105 in a given domain can ultimately be moved to. As such, the core technology of the PIPCO system 100 has to be rather general and can be developed even without having decided on the initial target domain.

Customizing and Marketing into a Domain

For the PIPCO system 100 to work ideally, a critical mass of agents 316 in a given domain would participate in the platform. The agents 316 have to be of different types as well so that the power of the platform can be fully utilized. Moreover, to sign up these agents 316, a working system that provides some reasonable functionality with a high degree of reliability is required.

The PIPCO system 100 can be built for a customized domain solution with three groups:

- The PIPCO system 100 staff hired for their expertise in the domain's process and systems technology. This domain team will spearhead the PIPCO system's 100 initial process platform requirements and customizations for the domain.
- Senior management members from potential client participants 105 who are willing to provide information on their process and technology infrastructure so that that the PIPCO system 100 can develop a customized solution that will satisfy some of their needs.
- Industry experts and consulting firms who see in the PIPCO system 100 the prospect for significant future integration business.

Implementation is likely to be a multi-month project especially for the larger company participants 105.

The initial participants 105 who cooperate with the PIPCO system 100 are critical for its success. If they are large enough in the domain, their influence alone might allow the PIPCO system 100 to sign up their providers as agents 316 into the platform. As such, we expect that the first large participants 105 to become strategic partners who will be integrated into the PIPCO system 100 for little charge other than their continued cooperation.

The initial rollout of the PIPCO system 100 is relatively primitive. Thus, it might involve just document viewing and access rules that determine which participants 105 and agents 316 can see what information and in which format, as well as simple process sequencing. However, subsequent iterations of the platform will be increasingly more powerful and extend these basic functions.

Refining and Buildout

The PIPCO system 100 would not have much difficulty signing up participants 105 once the platform is up and running with a critical mass of participants 105. The advanced technologies that the PIPCO system 100 brings will allow each participant 105 signing up with the PIPCO system 100 to come up with his own customized "digital strategy" that will catapult him into the present if not the future.

Also, once a participant 105 is integrated into the PIPCO system's 100 platform, there is no concern about integration of new technologies because that could be effectively handled by the PIPCO system 100. The participant's 105 main focus would be on his own internal processes and how best to change them to be most efficient. Ultimately, the PIPCO system 100 is likely to permeate more through the participant organizations 105 as they start to appreciate the flexible technology building blocks it provides.

As the PIPCO system 100 starts to understand the participants' 105 process flow, it is in a position to provide more customizations. These enhancements might take the form of more elements of the process that can be moved to the PIPCO system 100, or alternatively, a re-engineering of various participant process 319 using tools and services available on the PIPCO system 100. As noted repeatedly, the attraction of the PIPCO system 100 is that any of these changes will not have to be undertaken unless the participant 105 desires the benefit—he can adopt the changes only when he feels that his costs for doing so are much lower than the benefits that he might realize.

The PIPCO system 100 for a given industry may be made up of three distinct groups that work with a common vision:
- A technology development group responsible for the actual design and enhancement to the core technology platform. This group will be staffed by experienced software developers who understand the latest technologies and developments rather than being industry specialists. The initial focus of this group will be to develop a working implementation of the PIPCO system 100 that can be rapidly customized for the various potential participants 105.
- A sales and marketing group staffed at least initially, by expert individuals from the specific industry that the PIPCO system 100 is aimed at, who can explain the PIPCO system 100 and technology to senior level management of the various participants 105 involved. The first priority of the team would be to get critical mass by signing up enough of the domain participants 105 to the platform.
- An implementation and operations consulting group that works with the industry participants 105 that have signed up to map out their internal processes and legacy systems to determine how best to interface them to the PIPCO system 100. This group is really the equivalent of a systems consulting group with a combination of target industry professionals, process engineers and technology experts.

To develop the PIPCO system 100 successfully for a given industry the single biggest challenge is obtaining some degree of initial buy-in from senior industry management. The commitment from the participants 105 would be to let the PIPCO system 100 develop the appropriate hooks to the platform from the participant's 105 existing processes and data stores. With an initial commitment the expectation would be that the PIPCO system 100 rollout would be relatively painless if only because at least at the start it promises so little with minimal to no disruption of existing participant 105 processes.

The PIPCO system 100 requires a significant understanding of the target industry's process flow. The better the understanding, the more flexible the programming language 200 and process knowledge and execution engines 400 and 500. The specification repository 300 is driven by the participants 105 in the PIPCO system 100 for a given industry, while the language in question will be copyrighted intellectual property that belongs to the PIPCO system 100. Therefore, the functionality of the PIPCO specification language 200 for a given industry cannot be replicated easily by a competitor unless the competitor in question signs on the same participants 105 as the PIPCO system 100.

Finally, while the internet may have matured in many respects, the usage of the same where it comes to business processes is still relatively primitive. While the web is broadly stable and the core technologies reasonably robust, there continue to be numerous minor problems that plague all web-based systems. A real-time, mission-critical web-based transaction system is still hard to engineer reliably. The PIPCO system 100 is ideally for a domain that is not particularly time-critical. An outage of a few minutes for a participant 105 then is likely to cause minimal disruption.

Benefits of the PIPCO System 100

The PIPCO system 100 provides a unique and powerful new coordination architecture to permit businesses in a domain to work better with the external agents that they interact with. It has both top-down and bottom-up ideas in its design. The PIPCO system is designed with considerable top-down knowledge of an industry's process flow and how it might evolve in the future. Yet, its core implementation is completely bottom-up since the platform is initially designed to work to provide the most basic coordination across agents.

The PIPCO system 100 generates significant tangible benefits. From a theoretical perspective it reduces the number of required communications links across agents in a domain as well as the storage requirements dramatically. In practical terms it allows the various participant organizations to adopt the platform incrementally based on what they expect to save relative to what they need to spend to migrate more function to this structure. Over time, the PIPCO system 100 will radically transform every industry in which it takes hold. The PIPCO system provides the process framework of the future that can fortunately be made possible with the computer technology of today.

The features of the invention illustrated and described herein are the preferred embodiments. Therefore, it is understood that the appended claims are intended to cover the variations disclosed and unforeseeable embodiments with insubstantial differences that are within the spirit of the claims.

What I claim is:

1. A system for coordinating a process across at least two participants in a domain to allow interoperability of the participants that operate on different platforms, each participant having at least one resource and one agent, wherein an agent from a participant requests a resource from another participant, and said another participant provides the resource as requested, wherein the process from one participant to another participant includes at least one process step, comprising:
   a. a process specification language identifying at least one relevant terminology for each participant, resource, agent, and process step for the domain;
   b. a specification repository storing information of at least one participant, resource, agent, and process step using terminologies identified in said process specification language, wherein each process step is defined by at least one participant, resource and/or agent, and organized by transaction hierarchy;
   c. a process knowledge engine identifying and tracking the relevant process steps in said specification repository for the request from the agent of one participant for the resource from another participant and the provision of the resource as requested; and
   d. an execution engine performing the relevant process steps identified by said process knowledge engine, managing the agent requesting the resource with respect to the resource based on information stored in said specification repository for the agent and the resource, and updating the specification repository with the process steps tracked by said process knowledge engine.

2. The system of claim 1 wherein information of the resource stored in said specification repository includes the identity and/or location of the resource.

3. The system of claim 1 wherein information of the agent stored in said specification repository includes the credential, rights, and/or permission of the agent to have access to at least one resource.

4. The system of claim 1 wherein said specification repository includes at least one map of the resource of the participants organized by atomic resources and/or resource hierarchy.

5. The system of claim 1 wherein said specification repository includes at least one map of the agents of one or more participants organized by identity, role, credential, and/or agent hierarchy.

6. The system of claim 5 wherein said process knowledge engine includes at least one map of the process steps between participants organized by a process definition layer, a relationship layer, and an object hierarchy layer.

7. The system of claim 6 wherein said specification repository includes a knowledge/process state database for storing the update from said execution engine for the process steps tracked by said process knowledge engine using said relationship layer.

8. The system of claim 7 wherein said execution engine manages the agent with respect to the process steps with said relationship layer.

9. The system of claim 6 wherein an agent is assigned to an agent class and a process step is assigned to a transaction class, and said relationship layer is organized by said agent class and said transaction class.

10. The system of claim 6 wherein said process definition layer is organized by various sequencing of a plurality of process steps.

11. The system of claim 6 wherein said object hierarchy layer is organized by transaction hierarchy and agent hierarchy.

12. The system of claim 6 wherein the system includes a central system and a local system at at least one participant, and said local system maintains a copy of the identity map and process steps map from said central system relevant to the participant.

13. The system of claim 5 wherein said execution engine manages the agent with said credential map.

14. A method for coordinating a process across at least two participants in a domain to allow interoperability of the participants that operate on different platforms, each participant having at least one resource and one agent, wherein an agent from a participant requests a resource from another participant, and said another participant provides the resource as requested, wherein the process from one participant to another participant includes at least one process step, comprising the steps of:
   a. providing a process specification language that identifies at least one relevant terminology for each participant, resource, agent, and process step for the domain;
   b. providing a specification repository;
   c. storing information of at least one participant, resource, agent, and process step using the terminologies in said specification repository, wherein each process step is defined by at least one participant, resource and/or agent, and organized by transaction hierarchy;
   d. identifying the relevant process steps in said specification repository for the request from the agent of one participant for the resource from another participant and the provision of the resource as requested;
   e. performing the relevant process steps identified;
   f. managing the agent requesting the resource with respect to the resource based on information stored in said specification repository for the agent and the resource;
   g. tracking the relevant process steps;
   h. providing a knowledge/process state database; and
   i. updating said knowledge/process state database with the process steps tracked.

15. The method of claim 14 wherein information of the resource stored in said specification repository includes the identity and/or location of the resource.

16. The method of claim 15 further comprising the steps of:
   p. assigning an agent to an agent class; and
   q. assigning a process step to a transaction class;
wherein said relationship layer is organized by said agent class and said transaction class.

17. The method of claim 14 wherein information of the agent stored in said specification repository includes the credential, rights, and/or permission of the agent to have access to at least one resource.

18. The method of claim 14 further comprising the steps of:
   j. organizing the resource by atomic resources and/or resource hierarchy; and
   k. providing at least one resource map in said specification repository organized by said atomic resources and/or resource hierarchy.

19. The method of claim 14 further comprising the steps of:
   l. organizing the agents of one or more of the participants by identity, credential and/or agent hierarchy; and
   m. providing at least one map in said specification repository organized by said identity, role, credential, and/or agent hierarchy.

20. The method of claim 14 further comprising the steps of:
   n. organizing the process steps between participants by a process definition layer, a relationship layer, and an object hierarchy layer; and
   o. providing at least one map organized by said process definition layer, said relationship layer and said object hierarchy layer.

21. The method of claim 20 further comprising the step of:
   r. organizing various sequencing of a plurality of process steps in said process definition layer.

22. The method of claim 20 wherein said object hierarchy layer is organized by transaction hierarchy and agent hierarchy.

23. The method of claim 20 wherein said relationship layer is used for the tracking of the relevant process steps.

24. The method of claim 20 wherein said relationship layer is used for the managing of the agent.

\* \* \* \* \*